US012613335B2

(12) United States Patent
Shabtay et al.

(10) Patent No.: US 12,613,335 B2
(45) Date of Patent: Apr. 28, 2026

(54) RADAR APPARATUS, SYSTEM, AND METHOD

(71) Applicant: Intel Corporation, Santa Clara, CA (US)

(72) Inventors: Ophir Shabtay, Tsofit (IL); Oren Shalita, Tel-Aviv (IL)

(73) Assignee: INTEL CORPORATION, Santa Clara, CA (US)

( * ) Notice: Subject to any disclaimer, the term of this patent is extended or adjusted under 35 U.S.C. 154(b) by 109 days.

(21) Appl. No.: 18/574,723

(22) PCT Filed: Sep. 23, 2021

(86) PCT No.: PCT/US2021/051721
§ 371 (c)(1),
(2) Date: Dec. 27, 2023

(87) PCT Pub. No.: WO2023/048714
PCT Pub. Date: Mar. 30, 2023

(65) Prior Publication Data
US 2025/0093498 A1 Mar. 20, 2025

(51) Int. Cl.
*G01S 13/931* (2020.01)
*G01S 7/02* (2006.01)
(Continued)

(52) U.S. Cl.
CPC .......... *G01S 13/931* (2013.01); *G01S 7/0232* (2021.05); *G01S 7/356* (2021.05); *G01S 13/343* (2013.01);
(Continued)

(58) Field of Classification Search
CPC ...... G01S 13/931; G01S 7/356; G01S 7/0232; G01S 13/343; G01S 13/42; G01S 13/726;
(Continued)

(56) References Cited

U.S. PATENT DOCUMENTS

| 10,955,541 B2 | 3/2021 | Boutin et al. |
| 2007/0200747 A1 | 8/2007 | Okai et al. |

(Continued)

FOREIGN PATENT DOCUMENTS

| EP | 3828585 | 6/2021 |
| JP | 2005195450 | 7/2005 |

(Continued)

OTHER PUBLICATIONS

International Search Report and the Written Opinion for International Application No. PCT/US2021/051721, mailed on Jun. 21, 2022, 13 pages.

(Continued)

*Primary Examiner* — Sisay Yacob
(74) *Attorney, Agent, or Firm* — Shichrur & Co.

(57) ABSTRACT

Some demonstrative aspects include radar apparatuses, devices, systems and methods. In one example, a radar system may include a plurality of radar devices. For example, a radar device may include one or more Transmit (Tx) antennas to transmit radar Tx signals, one or more Receive (Rx) antennas to receive radar Rx signals, and a processor to generate radar information based on the radar Rx signals. In one example, the radar system may be implemented as part of a vehicle. In other aspects, the radar system may include any other additional or alternative elements and/or may be implemented as part of any other device or system.

29 Claims, 31 Drawing Sheets

(51) Int. Cl.

| | |
|---|---|
| *G01S 7/35* | (2006.01) |
| *G01S 13/34* | (2006.01) |
| *G01S 13/42* | (2006.01) |
| *G01S 13/72* | (2006.01) |
| *G01S 13/87* | (2006.01) |
| *G01S 13/88* | (2006.01) |
| *G01S 13/89* | (2006.01) |

(52) U.S. Cl.
CPC ............ *G01S 13/42* (2013.01); *G01S 13/726* (2013.01); *G01S 13/87* (2013.01); *G01S 13/881* (2013.01); *G01S 13/89* (2013.01); *G01S 2013/9316* (2020.01); *G01S 2013/9322* (2020.01); *G01S 2013/93271* (2020.01); *G01S 2013/93272* (2020.01); *G01S 2013/93274* (2020.01)

(58) Field of Classification Search
CPC ........ G01S 13/87; G01S 13/881; G01S 13/89; G01S 2013/9322; G01S 2013/9316; G01S 2013/93274; G01S 2013/93271; G01S 2013/93272; G01S 7/003; G01S 7/023; G01S 13/584
See application file for complete search history.

(56) References Cited

U.S. PATENT DOCUMENTS

| | | | | |
|---|---|---|---|---|
| 2019/0064335 | A1* | 2/2019 | Boutin | G01S 7/023 |
| 2019/0086509 | A1 | 3/2019 | Bilik et al. | |
| 2020/0107249 | A1 | 4/2020 | Stauffer et al. | |
| 2020/0393536 | A1 | 12/2020 | Stettiner | |
| 2021/0018588 | A1* | 1/2021 | Akamine | G01S 7/411 |
| 2022/0236368 | A1 | 7/2022 | Song et al. | |

FOREIGN PATENT DOCUMENTS

| | | |
|---|---|---|
| KR | 101925488 | 12/2018 |
| WO | 2019/106656 | 6/2019 |
| WO | 2021068522 | 4/2021 |

OTHER PUBLICATIONS

Search Report for Dutch Patent Application No. 2032819, mailed on Aug. 1, 2023, 28 pages.

Search Report for European Patent Application No. 21958560.1, mailed on Apr. 28, 2025, 19 pages.

F. Laghezza, "Radar to radar interference: real threat and opportunities", European Microwave Week, Jaarbeurs Utrecht, The Netherlands, Jan. 10-15, 2021, 17 pages.

Werner Sörgel et al., IMIKO Radar : Methods for Cooperative Interference Mitigation, European Microwave Week, Jaarbeurs Utrecht, The Netherlands, Jan. 10-15, 2021, 17 pages.

William Buller, "Estimating Impacts of Mutual Interference of Automotive Radars", SAE Government Industry Meeting Jan. 24-26, 2018, NHTSA (National Highway Traffic Safety Administration), 17 pages.

Buller, W., Wilson et al., "Radar Congestion Study", National Highway Traffic Safety Administration, Sep. 2018, 87 pages.

M. Alhumaidi et al., "Interference Avoidance and Mitigation in Automotive Radar", Proceedings of the 17th European Radar Conference, Jan. 13-15, 2021, Utrecht, The Netherlands, pp. 172-175, 4 pages.

Mate Toth et al., "Analysis of Automotive Radar Interference Mitigation for Real-World Environments", Proceedings of the 17th European Radar Conference, Jan. 13-15, 2021, Utrecht, The Netherlands, pp. 176-179, 4 pages.

International Preliminary Report on Patentability for International Application No. PCT/US2021/051721, mailed on Apr. 4, 2024, 9 pages.

* cited by examiner

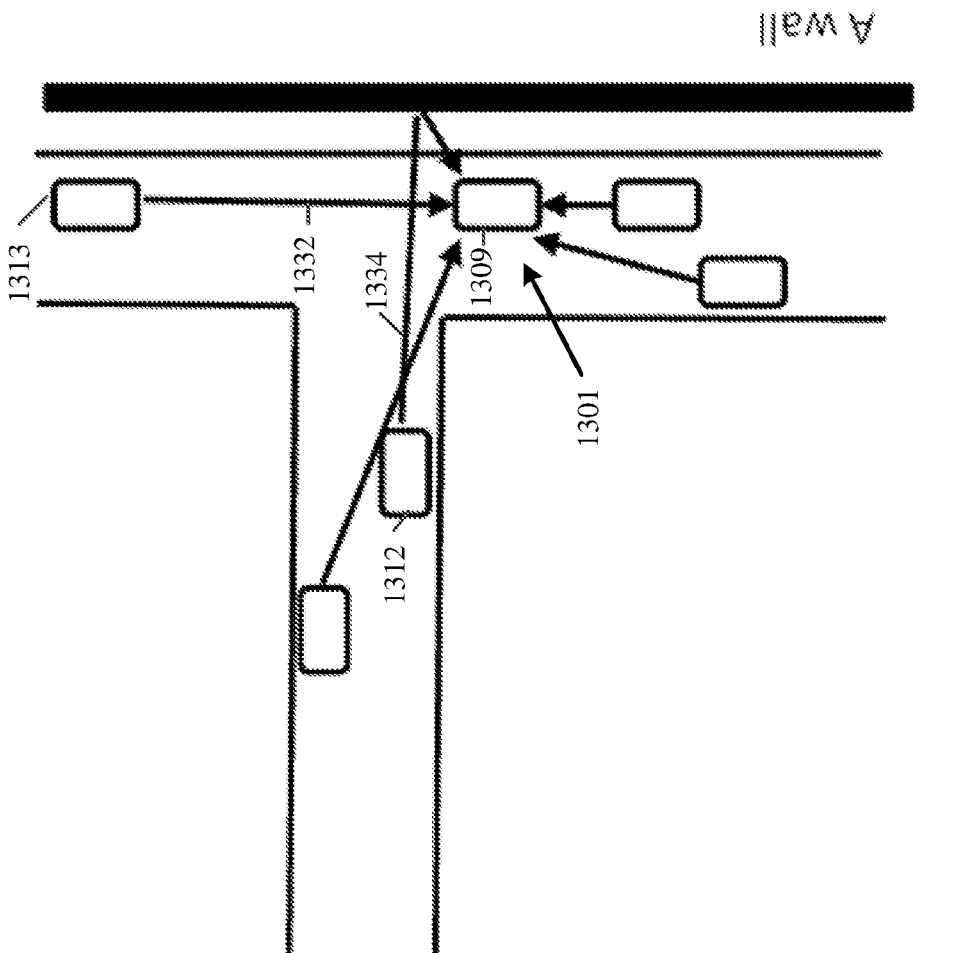
Fig. 13

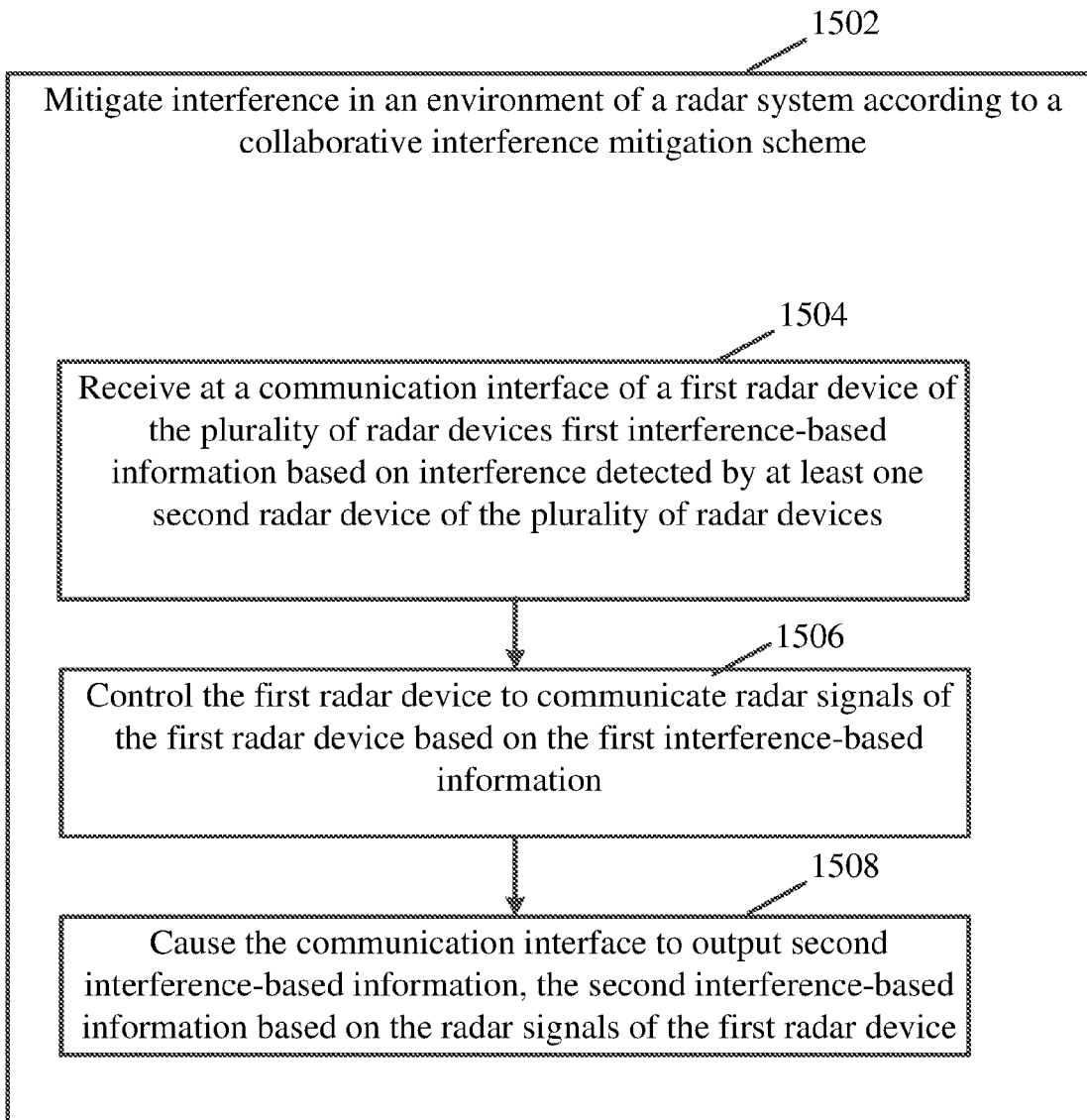

1502

Mitigate interference in an environment of a radar system according to a collaborative interference mitigation scheme

1504

Receive at a communication interface of a first radar device of the plurality of radar devices first interference-based information based on interference detected by at least one second radar device of the plurality of radar devices

1506

Control the first radar device to communicate radar signals of the first radar device based on the first interference-based information

1508

Cause the communication interface to output second interference-based information, the second interference-based information based on the radar signals of the first radar device

Fig. 15

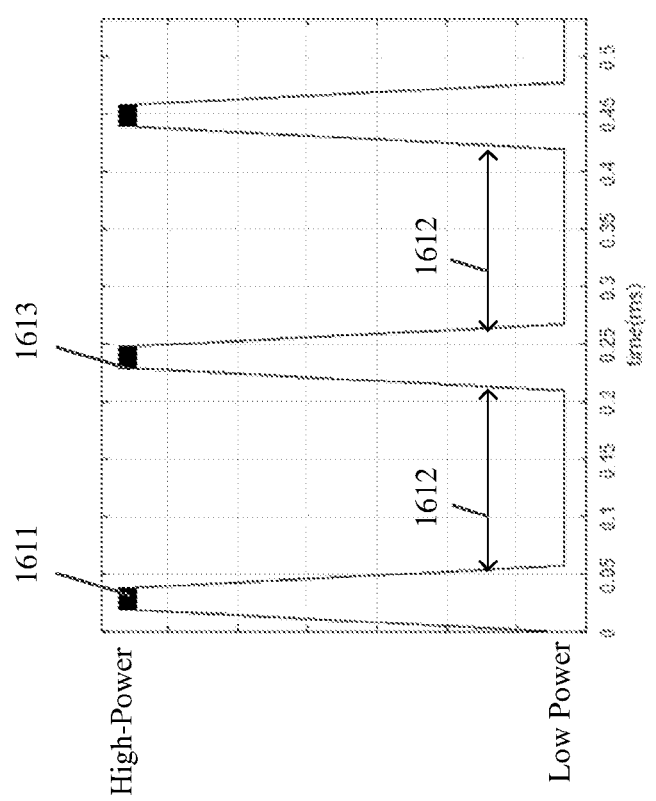
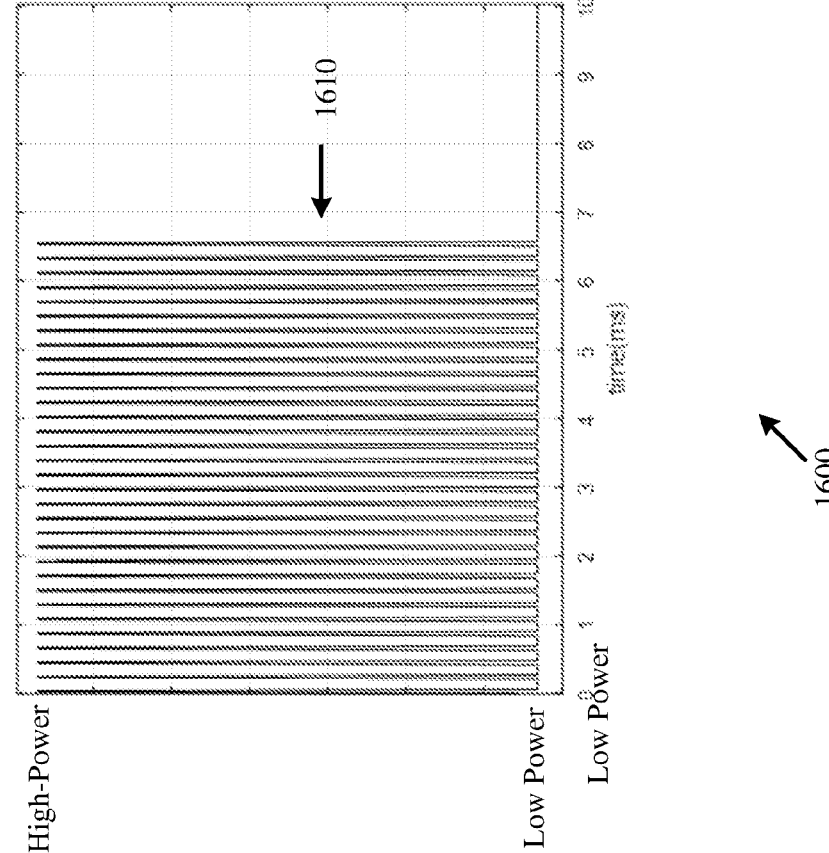
Fig. 16

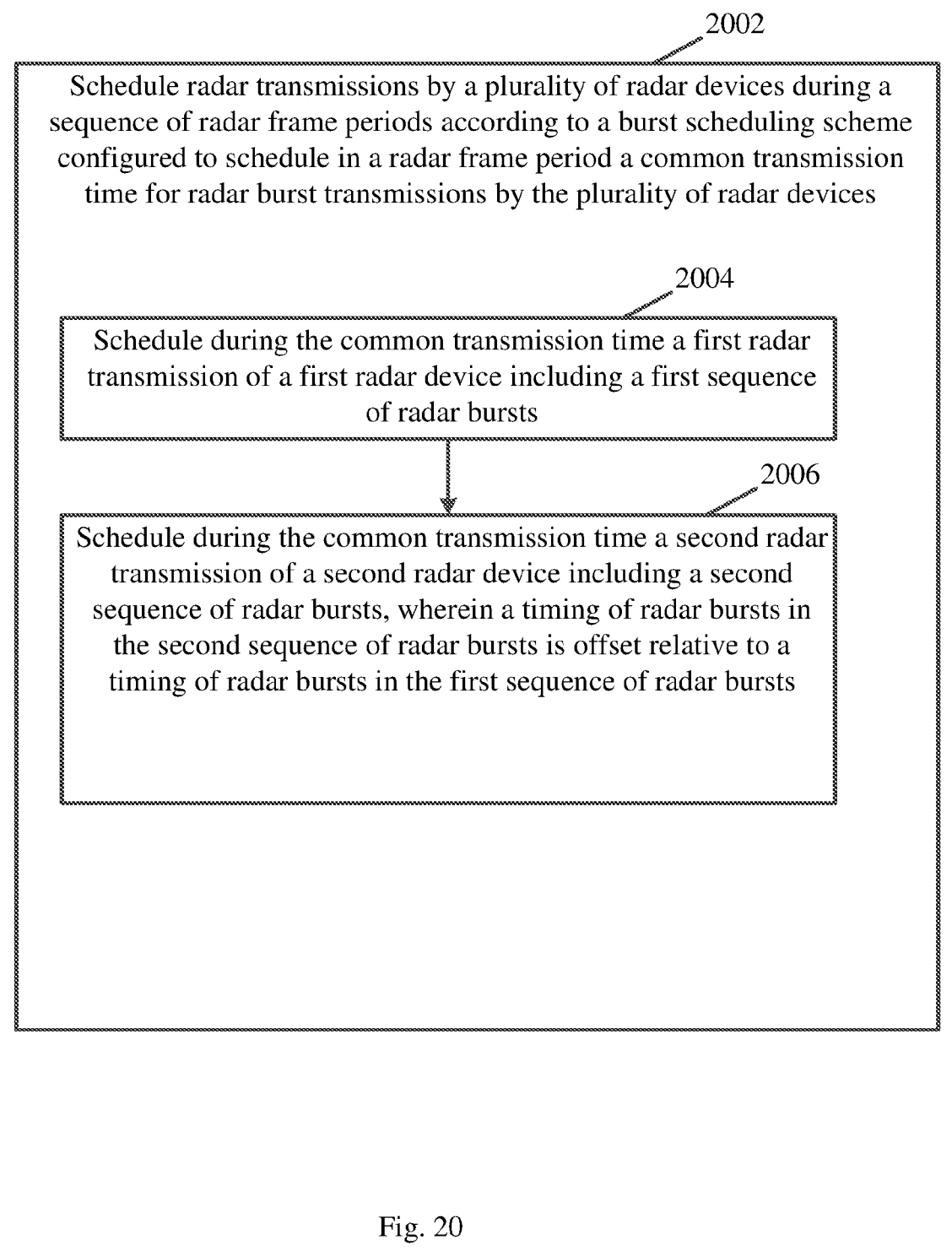

2002

Schedule radar transmissions by a plurality of radar devices during a sequence of radar frame periods according to a burst scheduling scheme configured to schedule in a radar frame period a common transmission time for radar burst transmissions by the plurality of radar devices

2004

Schedule during the common transmission time a first radar transmission of a first radar device including a first sequence of radar bursts

2006

Schedule during the common transmission time a second radar transmission of a second radar device including a second sequence of radar bursts, wherein a timing of radar bursts in the second sequence of radar bursts is offset relative to a timing of radar bursts in the first sequence of radar bursts

Fig. 20

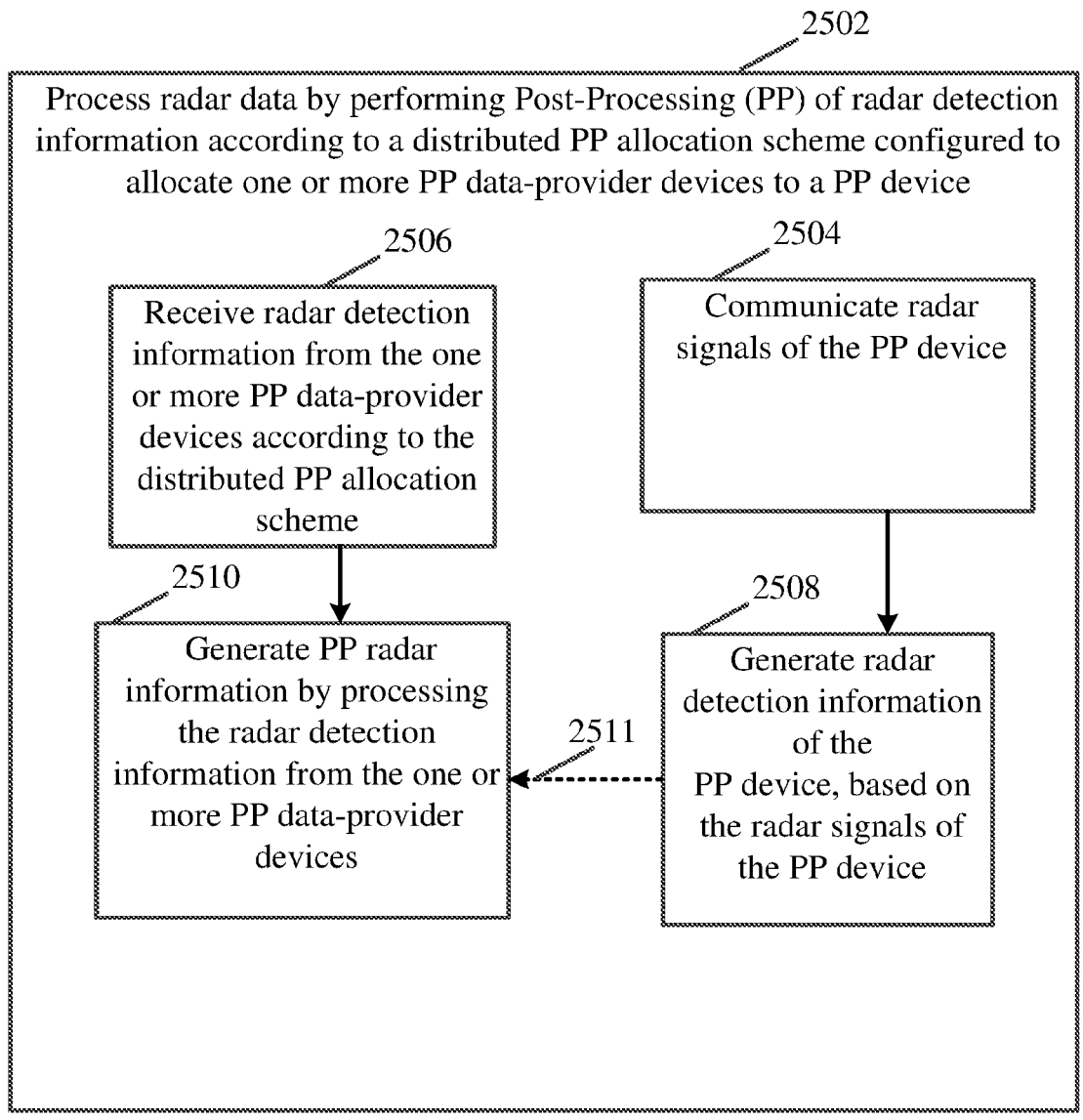

2502

Process radar data by performing Post-Processing (PP) of radar detection information according to a distributed PP allocation scheme configured to allocate one or more PP data-provider devices to a PP device

2506

Receive radar detection information from the one or more PP data-provider devices according to the distributed PP allocation scheme

2504

Communicate radar signals of the PP device

2510

Generate PP radar information by processing the radar detection information from the one or more PP data-provider devices

2511

2508

Generate radar detection information of the PP device, based on the radar signals of the PP device

Fig. 25

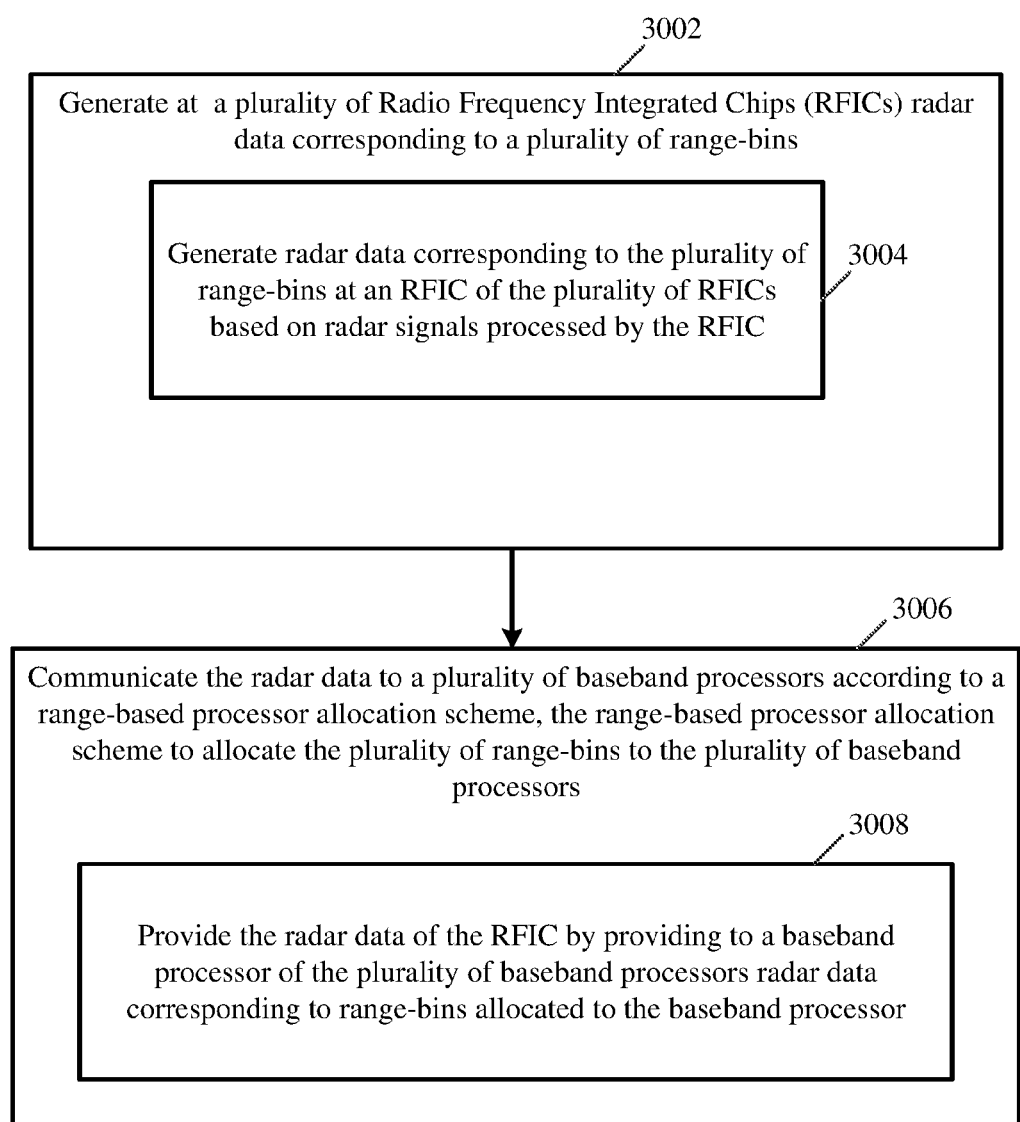

3002

Generate at a plurality of Radio Frequency Integrated Chips (RFICs) radar data corresponding to a plurality of range-bins Generate radar data corresponding to the plurality of range-bins at an RFIC of the plurality of RFICs based on radar signals processed by the RFIC    3004

3006

Communicate the radar data to a plurality of baseband processors according to a range-based processor allocation scheme, the range-based processor allocation scheme to allocate the plurality of range-bins to the plurality of baseband processors

3008

Provide the radar data of the RFIC by providing to a baseband processor of the plurality of baseband processors radar data corresponding to range-bins allocated to the baseband processor

Fig. 30

RADAR APPARATUS, SYSTEM, AND METHOD

TECHNICAL FIELD

Aspects described herein generally relate to radar devices and/or systems.

BACKGROUND

Various types of devices and systems, for example, assistance and/or autonomous systems, e.g., to be used in vehicles, airplanes and robots, may be configured to perceive and navigate through their environment using sensor data of one or more sensor types.

Conventionally, autonomous perception relies heavily on light-based sensors, such as image sensors, e.g., cameras, and/or Light Detection and Ranging (LIDAR) sensors. Such light-based sensors may perform poorly under certain conditions, such as, conditions of poor visibility, or in certain inclement weather conditions, e.g., rain, snow, hail, or other forms of precipitation, thereby limiting their usefulness or reliability.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 13 is a schematic illustration of a tracking scheme to track a plurality of interferers in an environment of a radar system in a vehicle, in in accordance with some demonstrative aspects.

FIG. 15 is a schematic flow-chart illustration of a method of mitigating interference in an environment of a radar system according to a collaborative interference mitigation scheme, in accordance with some demonstrative aspects.

FIG. 16 is a schematic illustration of a structure of a radar frame, which may be implemented in accordance with some demonstrative aspects.

FIG. 20 is a schematic flow-chart illustration of a method of processing radar data, in accordance with some demonstrative aspects.

FIG. 25 is a schematic flow-chart illustration of a method of processing radar data, in accordance with some demonstrative aspects.

FIG. 30 is a schematic flow-chart illustration of a method of processing radar data, in accordance with some demonstrative aspects.

DETAILED DESCRIPTION

Figure 1:
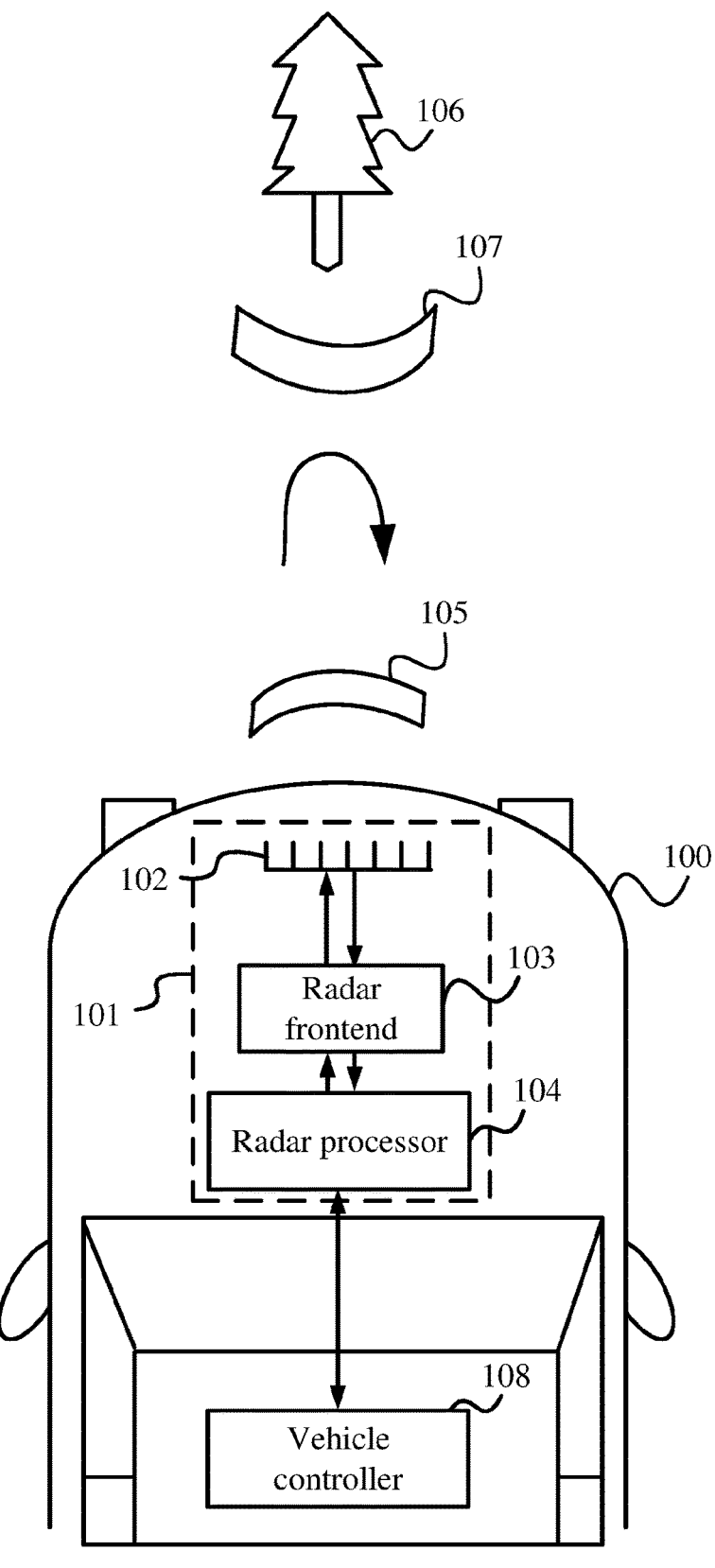
FIG. 1 is a schematic block diagram illustration of a vehicle implementing a radar, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The words "exemplary" and "demonstrative" are used herein to mean "serving as an example, instance, demonstration, or illustration". Any aspect, aspect, or design described herein as "exemplary" or "demonstrative" is not necessarily to be construed as preferred or advantageous over other aspects, aspects, or designs.

References to "one aspect", "an aspect", "demonstrative aspect", "various aspects" "one aspect", "an aspect", "demonstrative aspect", "various aspects" etc., indicate that the aspect(s) and/or aspects so described may include a particular feature, structure, or characteristic, but not every aspect or aspect necessarily includes the particular feature, structure, or characteristic. Further, repeated use of the phrase "in one aspect" or "in one aspect" does not necessarily refer to the same aspect or aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

A "vehicle" may be understood to include any type of driven object. By way of example, a vehicle may be a driven object with a combustion engine, an electric engine, a reaction engine, an electrically driven object, a hybrid driven object, or a combination thereof. A vehicle may be, or may include, an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, which is configured to traverse the ground, e.g., on a street, on a road, on a track, on one or more rails, off-road, or the like.

An "autonomous vehicle" may describe a vehicle capable of implementing at least one navigational change without driver input. A navigational change may describe or include a change in one or more of steering, braking, acceleration/deceleration, or any other operation relating to movement, of the vehicle. A vehicle may be described as autonomous even in case the vehicle is not fully autonomous, for example, fully operational with driver or without driver input. Autonomous vehicles may include those vehicles that can operate under driver control during certain time periods, and without driver control during other time periods. Additionally or alternatively, autonomous vehicles may include vehicles that control only some aspects of vehicle navigation, such as steering, e.g., to maintain a vehicle course between vehicle lane constraints, or some steering operations under certain circumstances, e.g., not under all circumstances, but may leave other aspects of vehicle navigation to the driver, e.g., braking or braking under certain circumstances. Additionally or alternatively, autonomous vehicles may include vehicles that share the control of one or more aspects of vehicle navigation under certain circumstances, e.g., hands-on, such as responsive to a driver input; and/or vehicles that control one or more aspects of vehicle navigation under certain circumstances, e.g., hands-off, such as independent of driver input. Additionally or alternatively, autonomous vehicles may include vehicles that control one or more aspects of vehicle navigation under certain circumstances, such as under certain environmental conditions, e.g., spatial areas, roadway conditions, or the like. In some aspects, autonomous vehicles may handle some or all aspects of braking, speed control, velocity control, steering, and/or any other additional operations, of the vehicle. An autonomous vehicle may include those vehicles that can operate without a driver. The level of autonomy of a vehicle may be described or determined by the Society of Automotive Engineers (SAE) level of the vehicle, e.g., as defined by the SAE, for example in SAE J3016 2018: Taxonomy and definitions for terms related to driving automation systems for on road motor vehicles, or by other relevant professional organizations. The SAE level may have a value ranging from a minimum level, e.g., level 0 (illustratively, substantially no driving automation), to a maximum level, e.g., level 5 (illustratively, full driving automation). In addition, systems described herein may be used for assistance purposes in vehicles, e.g., to provide information to a driver and/or other occupants of a vehicle.

The phrase "vehicle operation data" may be understood to describe any type of feature related to the operation of a vehicle. By way of example, "vehicle operation data" may describe the status of the vehicle, such as, the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, or the like. More generally, "vehicle operation data" may describe or include varying features or varying vehicle operation data (illustratively, time varying features or data).

Some aspects may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

Some aspects may be used in conjunction with Radio Frequency (RF) systems, radar systems, vehicular radar systems, autonomous systems, robotic systems, detection systems, or the like.

Some demonstrative aspects may be used in conjunction with an RF frequency in a frequency band having a starting frequency above 10 Gigahertz (GHz), for example, a frequency band having a starting frequency between 10 GHz and 120 GHz. For example, some demonstrative aspects may be used in conjunction with an RF frequency having a starting frequency above 30 GHz, for example, above 45 GHz, e.g., above 60 GHz. For example, some demonstrative aspects may be used in conjunction with an automotive radar frequency band, e.g., a frequency band between 76 GHz and 81 GHz. However, other aspects may be implemented utilizing any other suitable frequency bands, for example, a frequency band above 140 GHz, a frequency band of 300 GHz, a sub Terahertz (THz) band, a THz band, an Infra-Red (IR) band, and/or any other frequency band.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like. In one example, an antenna may be implemented as a separate element or an integrated element, for example, as an on-module antenna, an on-chip antenna, or according to any other antenna architecture.

Some demonstrative aspects are described herein with respect to RF radar signals. However, other aspects may be implemented with respect to, or in conjunction with, any other radar signals, wireless signals, IR signals, acoustic signals, optical signals, wireless communication signals, communication scheme, network, standard, and/or protocol. For example, some demonstrative aspects may be implemented with respect to systems, e.g., Light Detection Ranging (LiDAR) systems, and/or sonar systems, utilizing light and/or acoustic signals.

Reference is now made to FIG. 1, which schematically illustrates a block diagram of a vehicle 100 implementing a radar, in accordance with some demonstrative aspects.

In some demonstrative aspects, vehicle 100 may include a car, a truck, a motorcycle, a bus, a train, an airborne vehicle, a waterborne vehicle, a cart, a golf cart, an electric cart, a road agent, or any other vehicle.

In some demonstrative aspects, vehicle 100 may include a radar device 101, e.g., as described below. For example, radar device 101 may include a radar detecting device, a radar sensing device, a radar sensor, or the like, e.g., as described below.

In some demonstrative aspects, radar device 101 may be implemented as part of a vehicular system, for example, a system to be implemented and/or mounted in vehicle 100.

In one example, radar device 101 may be implemented as part of an autonomous vehicle system, an automated driving system, a driver assistance and/or support system, and/or the like.

For example, radar device 101 may be installed in vehicle 100 for detection of nearby objects, e.g., for autonomous driving.

In some demonstrative aspects, radar device 101 may be configured to detect targets in a vicinity of vehicle 100, e.g., in a far vicinity and/or a near vicinity, for example, using RF and analog chains, capacitor structures, large spiral transformers and/or any other electronic or electrical elements, e.g., as described below.

In one example, radar device 101 may be mounted onto, placed, e.g., directly, onto, or attached to, vehicle 100.

In some demonstrative aspects, vehicle 100 may include a plurality of radar devices 101. For example, radar device 101 may be implemented by a plurality of radar units, which may be at a plurality of locations, e.g., around vehicle 100. In other aspects, vehicle 100 may include a single radar device 101.

In some demonstrative aspects, vehicle 100 may include a plurality of radar devices 101, which may be configured to cover a field of view of 360 degrees around vehicle 100.

In other aspects, vehicle 100 may include any other suitable count, arrangement, and/or configuration of radar devices and/or units, which may be suitable to cover any other field of view, e.g., a field of view of less than 360 degrees.

In some demonstrative aspects, radar device 101 may be implemented as a component in a suite of sensors used for driver assistance and/or autonomous vehicles, for example, due to the ability of radar to operate in nearly all-weather conditions.

In some demonstrative aspects, radar device 101 may be configured to support autonomous vehicle usage, e.g., as described below.

In one example, radar device 101 may determine a class, a location, an orientation, a velocity, an intention, a perceptional understanding of the environment, and/or any other information corresponding to an object in the environment.

In another example, radar device 101 may be configured to determine one or more parameters and/or information for one or more operations and/or tasks, e.g., path planning, and/or any other tasks.

In some demonstrative aspects, radar device 101 may be configured to map a scene by measuring targets' echoes (reflectivity) and discriminating them, for example, mainly in range, velocity, azimuth and/or elevation, e.g., as described below.

In some demonstrative aspects, radar device 101 may be configured to detect, and/or sense, one or more objects, which are located in a vicinity, e.g., a far vicinity and/or a near vicinity, of the vehicle 100, and to provide one or more parameters, attributes, and/or information with respect to the objects.

In some demonstrative aspects, the objects may include other vehicles; pedestrians; traffic signs; traffic lights; roads, road elements, e.g., a pavement-road meeting, an edge line; a hazard, e.g., a tire, a box, a crack in the road surface; and/or the like.

In some demonstrative aspects, the one or more parameters, attributes and/or information with respect to the object may include a range of the objects from the vehicle 100, an angle of the object with respect to the vehicle 100, a location of the object with respect to the vehicle 100, a relative speed of the object with respect to vehicle 100, and/or the like.

In some demonstrative aspects, radar device 101 may include a Multiple Input Multiple Output (MIMO) radar device 101, e.g., as described below. In one example, the MIMO radar device may be configured to utilize "spatial filtering" processing, for example, beamforming and/or any other mechanism, for one or both of Transmit (Tx) signals and/or Receive (Rx) signals.

Some demonstrative aspects are described below with respect to a radar device, e.g., radar device 101, implemented as a MIMO radar. However, in other aspects, radar device 101 may be implemented as any other type of radar utilizing a plurality of antenna elements, e.g., a Single Input Multiple Output (SIMO) radar or a Multiple Input Single output (MISO) radar.

Some demonstrative aspects may be implemented with respect to a radar device, e.g., radar device 101, implemented as a MIMO radar, e.g., as described below. However, in other aspects, radar device 101 may be implemented as any other type of radar, for example, an Electronic Beam Steering radar, a Synthetic Aperture Radar (SAR), adaptive and/or cognitive radars that change their transmission according to the environment and/or ego state, a reflect array radar, or the like.

In some demonstrative aspects, radar device 101 may include an antenna arrangement 102, a radar frontend 103 configured to communicate radar signals via the antenna arrangement 102, and a radar processor 104 configured to generate radar information based on the radar signals, e.g., as described below.

In some demonstrative aspects, radar processor 104 may be configured to process radar information of radar device 101 and/or to control one or more operations of radar device 101, e.g., as described below.

In some demonstrative aspects, radar processor 104 may include, or may be implemented, partially or entirely, by circuitry and/or logic, e.g., one or more processors including circuitry and/or logic, memory circuitry and/or logic. Additionally or alternatively, one or more functionalities of radar processor 104 may be implemented by logic, which may be executed by a machine and/or one or more processors, e.g., as described below.

In one example, radar processor 104 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other aspects, radar processor 104 may be implemented by one or more additional or alternative elements of vehicle 100.

In some demonstrative aspects, radar frontend 103 may include, for example, one or more (radar) transmitters, and a one or more (radar) receivers, e.g., as described below.

In some demonstrative aspects, antenna arrangement 102 may include a plurality of antennas to communicate the radar signals. For example, antenna arrangement 102 may include multiple transmit antennas in the form of a transmit antenna array, and multiple receive antennas in the form of a receive antenna array. In another example, antenna arrangement 102 may include one or more antennas used both as transmit and receive antennas. In the latter case, the radar frontend 103, for example, may include a duplexer, e.g., a circuit to separate transmitted signals from received signals.

In some demonstrative aspects, as shown in FIG. 1, the radar frontend 103 and the antenna arrangement 102 may be controlled, e.g., by radar processor 104, to transmit a radio transmit signal 105.

In some demonstrative aspects, as shown in FIG. 1, the radio transmit signal 105 may be reflected by an object 106, resulting in an echo 107.

In some demonstrative aspects, the radar device 101 may receive the echo 107, e.g., via antenna arrangement 102 and radar frontend 103, and radar processor 104 may generate radar information, for example, by calculating information about position, radial velocity (Doppler), and/or direction of the object 106, e.g., with respect to vehicle 100.

In some demonstrative aspects, radar processor 104 may be configured to provide the radar information to a vehicle controller 108 of the vehicle 100, e.g., for autonomous driving of the vehicle 100.

In some demonstrative aspects, at least part of the functionality of radar processor 104 may be implemented as part of vehicle controller 108. In other aspects, the functionality of radar processor 104 may be implemented as part of any other element of radar device 101 and/or vehicle 100. In other aspects, radar processor 104 may be implemented, as a separate part of, or as part of any other element of radar device 101 and/or vehicle 100.

In some demonstrative aspects, vehicle controller 108 may be configured to control one or more functionalities, modes of operation, components, devices, systems and/or elements of vehicle 100.

In some demonstrative aspects, vehicle controller 108 may be configured to control one or more vehicular systems of vehicle 100, e.g., as described below.

In some demonstrative aspects, the vehicular systems may include, for example, a steering system, a braking system, a driving system, and/or any other system of the vehicle 100.

In some demonstrative aspects, vehicle controller 108 may configured to control radar device 101, and/or to process one or parameters, attributes and/or information from radar device 101.

In some demonstrative aspects, vehicle controller 108 may be configured, for example, to control the vehicular systems of the vehicle 100, for example, based on radar information from radar device 101 and/or one or more other sensors of the vehicle 100, e.g., Light Detection and Ranging (LIDAR) sensors, camera sensors, and/or the like.

In one example, vehicle controller 108 may control the steering system, the braking system, and/or any other vehicular systems of vehicle 100, for example, based on the information from radar device 101, e.g., based on one or more objects detected by radar device 101.

In other aspects, vehicle controller 108 may be configured to control any other additional or alternative functionalities of vehicle 100.

Some demonstrative aspects are described herein with respect to a radar device 101 implemented in a vehicle, e.g., vehicle 100. In other aspects a radar device, e.g., radar device 101, may be implemented as part of any other element of a traffic system or network, for example, as part of a road infrastructure, and/or any other element of a traffic network or system. Other aspects may be implemented with respect to any other system, environment and/or apparatus, which may be implemented in any other object, environment, location, or place. For example, radar device 101 may be part of a non-vehicular device, which may be implemented, for example, in an indoor location, a stationary infrastructure outdoors, or any other location.

In some demonstrative aspects, radar device 101 may be configured to support security usage. In one example, radar device 101 may be configured to determine a nature of an operation, e.g., a human entry, an animal entry, an environmental movement, and the like, to identity a threat level of a detected event, and/or any other additional or alternative operations.

Some demonstrative aspects may be implemented with respect to any other additional or alternative devices and/or systems, for example, for a robot, e.g., as described below.

In other aspects, radar device 101 may be configured to support any other usages and/or applications.

Figure 2:
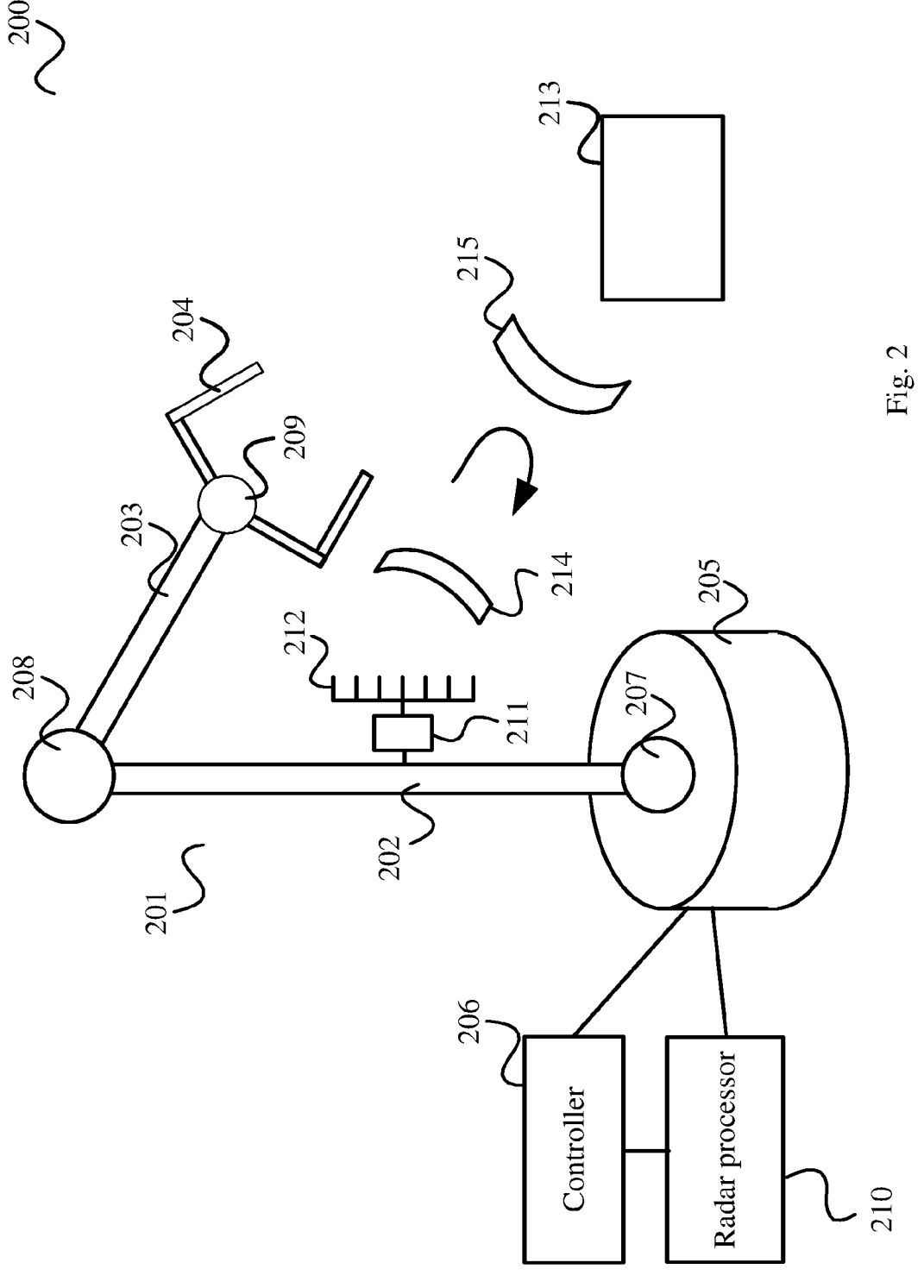
FIG. 2 is a schematic block diagram illustration of a robot implementing a radar, in accordance with some demonstrative aspects.

Reference is now made to FIG. 2, which schematically illustrates a block diagram of a robot 200 implementing a radar, in accordance with some demonstrative aspects.

In some demonstrative aspects, robot 200 may include a robot arm 201. The robot 200 may be implemented, for example, in a factory for handling an object 213, which may be, for example, a part that should be affixed to a product that is being manufactured. The robot arm 201 may include a plurality of movable members, for example, movable members 202, 203, 204, and a support 205. Moving the movable members 202, 203, and/or 204 of the robot arm 201, e.g., by actuation of associated motors, may allow physical interaction with the environment to carry out a task, e.g., handling the object 213.

In some demonstrative aspects, the robot arm 201 may include a plurality of joint elements, e.g., joint elements 207, 208, 209, which may connect, for example, the members 202, 203, and/or 204 with each other, and with the support 205. For example, a joint element 207, 208, 209 may have one or more joints, each of which may provide rotatable motion, e.g., rotational motion, and/or translatory motion, e.g., displacement, to associated members and/or motion of members relative to each other. The movement of the members 202, 203, 204 may be initiated by suitable actuators.

In some demonstrative aspects, the member furthest from the support 205, e.g., member 204, may also be referred to as the end-effector 204 and may include one or more tools, such as, a claw for gripping an object, a welding tool, or the like. Other members, e.g., members 202, 203, closer to the support 205, may be utilized to change the position of the end-effector 204, e.g., in three-dimensional space. For example, the robot arm 201 may be configured to function similarly to a human arm, e.g., possibly with a tool at its end.

In some demonstrative aspects, robot 200 may include a (robot) controller 206 configured to implement interaction with the environment, e.g., by controlling the robot arm's actuators, according to a control program, for example, in order to control the robot arm 201 according to the task to be performed.

In some demonstrative aspects, an actuator may include a component adapted to affect a mechanism or process in response to being driven. The actuator can respond to commands given by the controller 206 (the so-called activation) by performing mechanical movement. This means that an actuator, typically a motor (or electromechanical converter), may be configured to convert electrical energy into mechanical energy when it is activated (i.e. actuated).

In some demonstrative aspects, controller 206 may be in communication with a radar processor 210 of the robot 200.

In some demonstrative aspects, a radar fronted 211 and a radar antenna arrangement 212 may be coupled to the radar processor 210. In one example, radar fronted 211 and/or radar antenna arrangement 212 may be included, for example, as part of the robot arm 201. For example, a location and/or orientation of a radar signal transmission source and/or a radar signal reception sink may be physically moved within the reach of the robot arm. In another example, the source and/or the sink of radar signals may be attached to a non-movable, fixed part of the robot arm, e.g., a base of the robot arm or a stationary part of the arm, or installed in an environment, e.g., in a suitable vicinity of robot arm. In another example, the robot may be an autonomous robot with a robot arm.

In some demonstrative aspects, the radar frontend 211, the radar antenna arrangement 212 and the radar processor 210 may be operable as, and/or may be configured to form, a radar device. For example, antenna arrangement 212 may be configured to perform one or more functionalities of antenna arrangement 102 (FIG. 1), radar frontend 211 may be configured to perform one or more functionalities of radar frontend 103 (FIG. 1), and/or radar processor 210 may be configured to perform one or more functionalities of radar processor 104 (FIG. 1), e.g., as described above.

In some demonstrative aspects, for example, the radar frontend 211 and the antenna arrangement 212 may be controlled, e.g., by radar processor 210, to transmit a radio transmit signal 214.

In some demonstrative aspects, as shown in FIG. 2, the radio transmit signal 214 may be reflected by the object 213, resulting in an echo 215.

In some demonstrative aspects, the echo 215 may be received, e.g., via antenna arrangement 212 and radar frontend 211, and radar processor 210 may generate radar information, for example, by calculating information about position, speed (Doppler) and/or direction of the object 213, e.g., with respect to robot arm 201.

In some demonstrative aspects, radar processor 210 may be configured to provide the radar information to the robot controller 206 of the robot arm 201, e.g., to control robot arm 201. For example, robot controller 206 may be configured to control robot arm 201 based on the radar information, e.g., to grab the object 213 and/or to perform any other operation.

Figure 3:
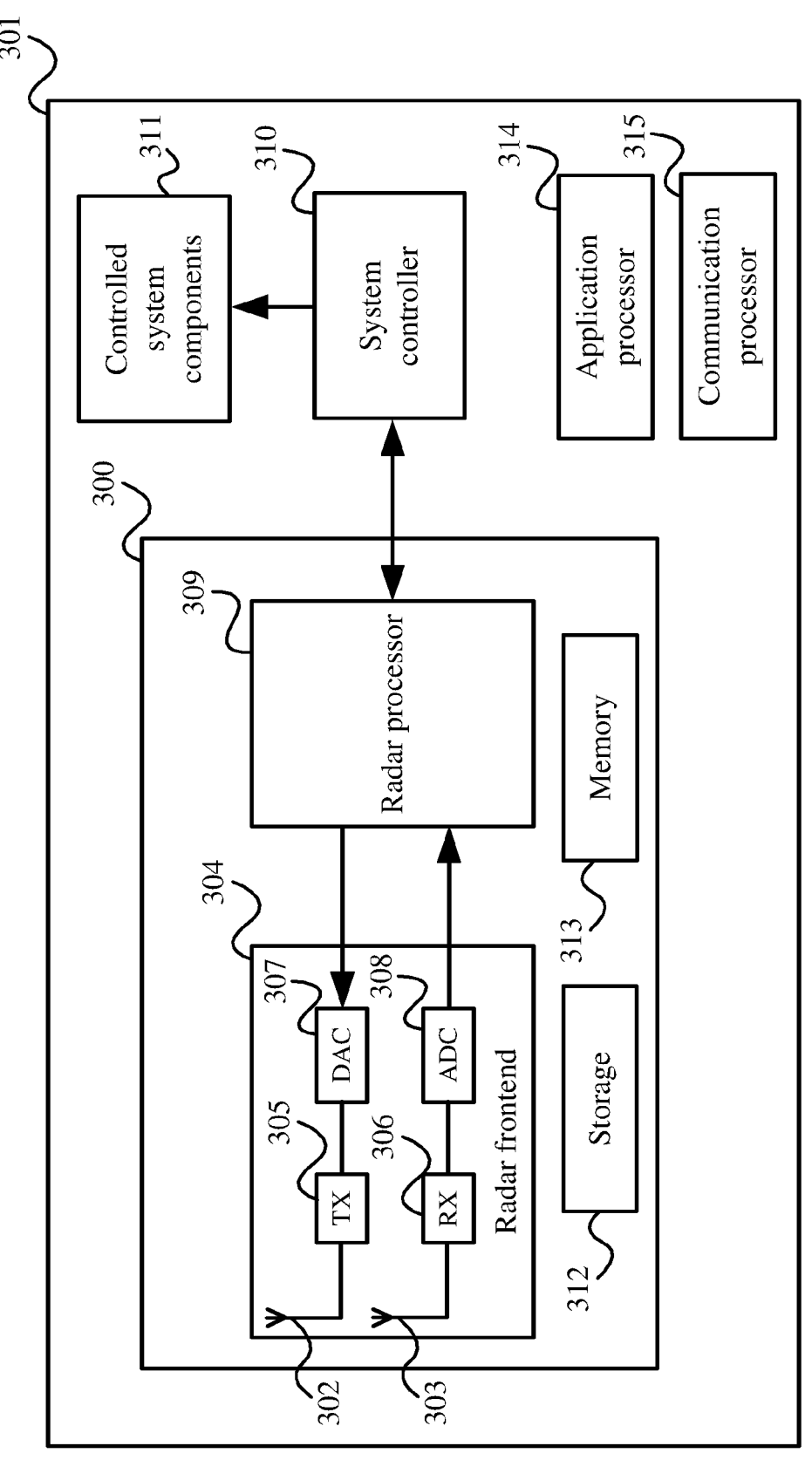
FIG. 3 is a schematic block diagram illustration of a radar apparatus, in accordance with some demonstrative aspects.

Reference is made to FIG. 3, which schematically illustrates a radar apparatus 300, in accordance with some demonstrative aspects.

In some demonstrative aspects, radar apparatus 300 may be implemented as part of a device or system 301, e.g., as described below.

For example, radar apparatus 300 may be implemented as part of, and/or may configured to perform one or more operations and/or functionalities of, the devices or systems described above with reference to FIG. 1 an/or FIG. 2. In other aspects, radar apparatus 300 may be implemented as part of any other device or system 301.

In some demonstrative aspects, radar device 300 may include an antenna arrangement, which may include one or more transmit antennas 302 and one or more receive antennas 303. In other aspects, any other antenna arrangement may be implemented.

In some demonstrative aspects, radar device 300 may include a radar frontend 304, and a radar processor 309.

In some demonstrative aspects, as shown in FIG. 3, the one or more transmit antennas 302 may be coupled with a transmitter (or transmitter arrangement) 305 of the radar frontend 304; and/or the one or more receive antennas 303 may be coupled with a receiver (or receiver arrangement) 306 of the radar frontend 304, e.g., as described below.

In some demonstrative aspects, transmitter 305 may include one or more elements, for example, an oscillator, a power amplifier and/or one or more other elements, configured to generate radio transmit signals to be transmitted by the one or more transmit antennas 302, e.g., as described below.

In some demonstrative aspects, for example, radar processor 309 may provide digital radar transmit data values to the radar frontend 304. For example, radar frontend 304 may include a Digital-to-Analog Converter (DAC) 307 to convert the digital radar transmit data values to an analog transmit signal. The transmitter 305 may convert the analog transmit signal to a radio transmit signal which is to be transmitted by transmit antennas 302.

In some demonstrative aspects, receiver 306 may include one or more elements, for example, one or more mixers, one or more filters and/or one or more other elements, configured to process, down-convert, radio signals received via the one or more receive antennas 303, e.g., as described below.

In some demonstrative aspects, for example, receiver 306 may convert a radio receive signal received via the one or more receive antennas 303 into an analog receive signal. The radar frontend 304 may include an Analog-to-Digital Converter (ADC) 308 to generate digital radar reception data values based on the analog receive signal. For example, radar frontend 304 may provide the digital radar reception data values to the radar processor 309.

In some demonstrative aspects, radar processor 309 may be configured to process the digital radar reception data values, for example, to detect one or more objects, e.g., in an environment of the device/system 301. This detection may include, for example, the determination of information including one or more of range, speed (Doppler), direction, and/or any other information, of one or more objects, e.g., with respect to the system 301.

In some demonstrative aspects, radar processor 309 may be configured to provide the determined radar information to a system controller 310 of device/system 301. For example, system controller 310 may include a vehicle controller, e.g., if device/system 301 includes a vehicular device/system, a robot controller, e.g., if device/system 301 includes a robot device/system, or any other type of controller for any other type of device/system 301.

In some demonstrative aspects, system controller 310 may be configured to control one or more controlled system components 311 of the system 301, e.g. a motor, a brake, steering, and the like, e.g. by one or more corresponding actuators.

In some demonstrative aspects, radar device 300 may include a storage 312 or a memory 313, e.g., to store information processed by radar 300, for example, digital radar reception data values being processed by the radar processor 309, radar information generated by radar processor 309, and/or any other data to be processed by radar processor 309.

In some demonstrative aspects, device/system 301 may include, for example, an application processor 314 and/or a communication processor 315, for example, to at least partially implement one or more functionalities of system controller 310 and/or to perform communication between system controller 310, radar device 300, the controlled system components 311, and/or one or more additional elements of device/system 301.

In some demonstrative aspects, radar device 300 may be configured to generate and transmit the radio transmit signal in a form, which may support determination of range, speed, and/or direction, e.g., as described below.

For example, a radio transmit signal of a radar may be configured to include a plurality of pulses. For example, a pulse transmission may include the transmission of short high-power bursts in combination with times during which the radar device listens for echoes.

For example, in order to more optimally support a highly dynamic situation, e.g., in an automotive scenario, a continuous wave (CW) may instead be used as the radio transmit signal. However, a continuous wave, e.g., with constant frequency, may support velocity determination, but may not allow range determination, e.g., due to the lack of a time mark that could allow distance calculation.

In some demonstrative aspects, radio transmit signal 105 (FIG. 1) may be transmitted according to technologies such as, for example, Frequency-Modulated continuous wave (FMCW) radar, Phase-Modulated Continuous Wave (PMCW) radar, Orthogonal Frequency Division Multiplexing (OFDM) radar, and/or any other type of radar technology, which may support determination of range, velocity, and/or direction, e.g., as described below.

Figure 4:
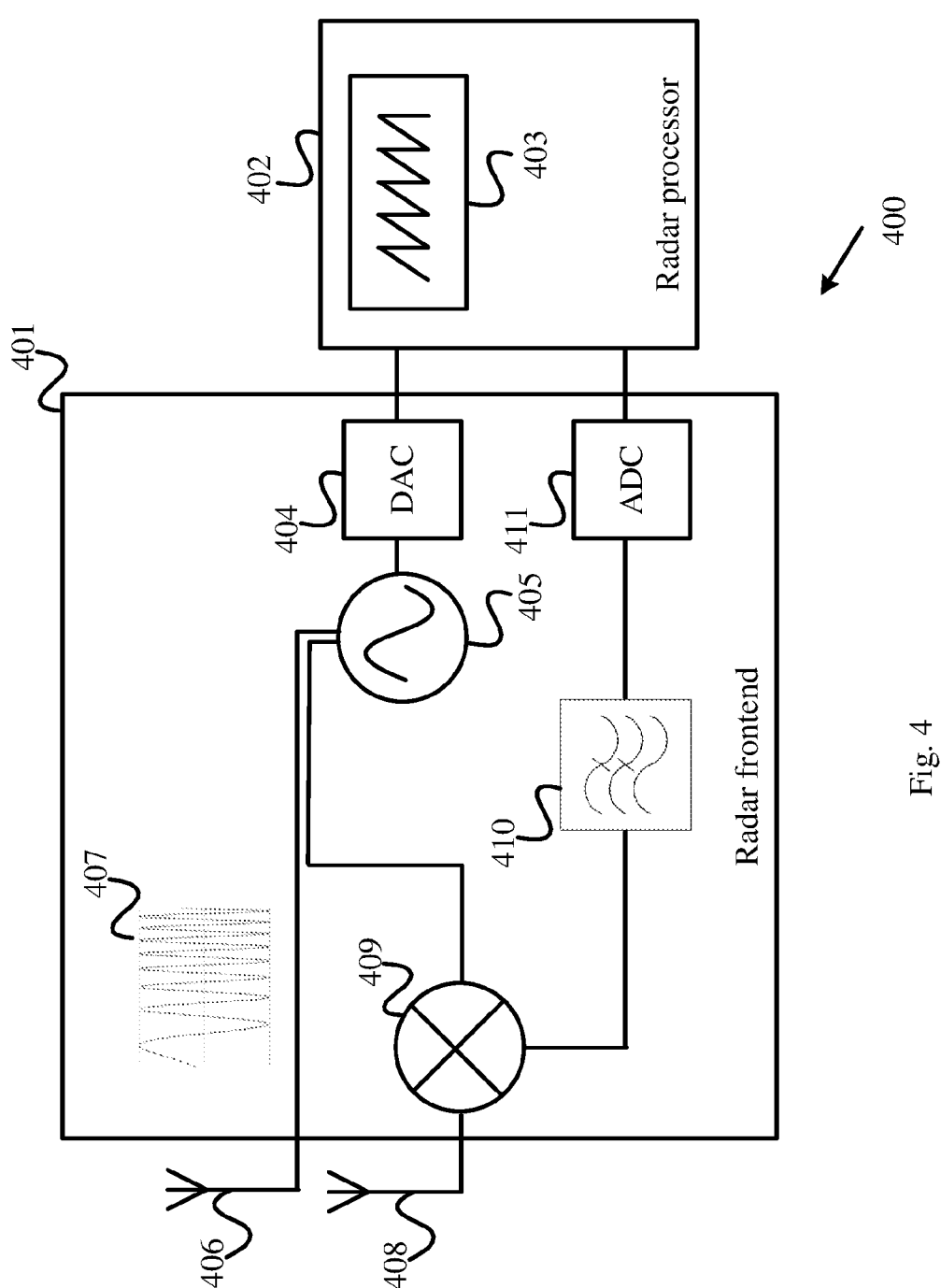
FIG. 4 is a schematic block diagram illustration of a Frequency-Modulated Continuous Wave (FMCW) radar apparatus, in accordance with some demonstrative aspects.

Reference is made to FIG. 4, which schematically illustrates a FMCW radar apparatus, in accordance with some demonstrative aspects.

In some demonstrative aspects, FMCW radar device 400 may include a radar frontend 401, and a radar processor 402. For example, radar frontend 304 (FIG. 3) may include one or more elements of, and/or may perform one or more operations and/or functionalities of, radar frontend 401; and/or radar processor 309 (FIG. 3) may include one or more elements of, and/or may perform one or more operations and/or functionalities of, radar processor 402.

In some demonstrative aspects, FMCW radar device 400 may be configured to communicate radio signals according to an FMCW radar technology, e.g., rather than sending a radio transmit signal with a constant frequency.

In some demonstrative aspects, radio frontend 401 may be configured to ramp up and reset the frequency of the transmit signal, e.g., periodically, for example, according to a saw tooth waveform 403. In other aspects, a triangle waveform, or any other suitable waveform may be used.

In some demonstrative aspects, for example, radar processor 402 may be configured to provide waveform 403 to frontend 401, for example, in digital form, e.g., as a sequence of digital values.

In some demonstrative aspects, radar frontend 401 may include a DAC 404 to convert waveform 403 into analog form, and to supply it to a voltage-controlled oscillator 405. For example, oscillator 405 may be configured to generate an output signal, which may be frequency-modulated in accordance with the waveform 403.

In some demonstrative aspects, oscillator 405 may be configured to generate the output signal including a radio transmit signal, which may be fed to and sent out by one or more transmit antennas 406.

In some demonstrative aspects, the radio transmit signal generated by the oscillator 405 may have the form of a sequence of chirps 407, which may be the result of the modulation of a sinusoid with the saw tooth waveform 403.

In one example, a chirp 407 may correspond to the sinusoid of the oscillator signal frequency-modulated by a "tooth" of the saw tooth waveform 403, e.g., from the minimum frequency to the maximum frequency.

In some demonstrative aspects, FMCW radar device 400 may include one or more receive antennas 408 to receive a radio receive signal. The radio receive signal may be based on the echo of the radio transmit signal, e.g., in addition to any noise, interference, or the like.

In some demonstrative aspects, radar frontend 401 may include a mixer 409 to mix the radio transmit signal with the radio receive signal into a mixed signal.

In some demonstrative aspects, radar frontend 401 may include a filter, e.g., a Low Pass Filter (LPF) 410, which may be configured to filter the mixed signal from the mixer 409 to provide a filtered signal. For example, radar frontend 401 may include an ADC 411 to convert the filtered signal into digital reception data values, which may be provided to radar processor 402. In another example, the filter 410 may be a digital filter, and the ADC 411 may be arranged between the mixer 409 and the filter 410.

In some demonstrative aspects, radar processor 402 may be configured to process the digital reception data values to provide radar information, for example, including range, speed (velocity/Doppler), and/or direction (AoA) information of one or more objects.

In some demonstrative aspects, radar processor 402 may be configured to perform a first Fast Fourier Transform (FFT) (also referred to as "range FFT") to extract a delay response, which may be used to extract range information, and/or a second FFT (also referred to as "Doppler FFT") to extract a Doppler shift response, which may be used to extract velocity information, from the digital reception data values.

In other aspects, any other additional or alternative methods may be utilized to extract range information. In one example, in a digital radar implementation, a correlation with the transmitted signal may be used, e.g., according to a matched filter implementation.

Figure 5:
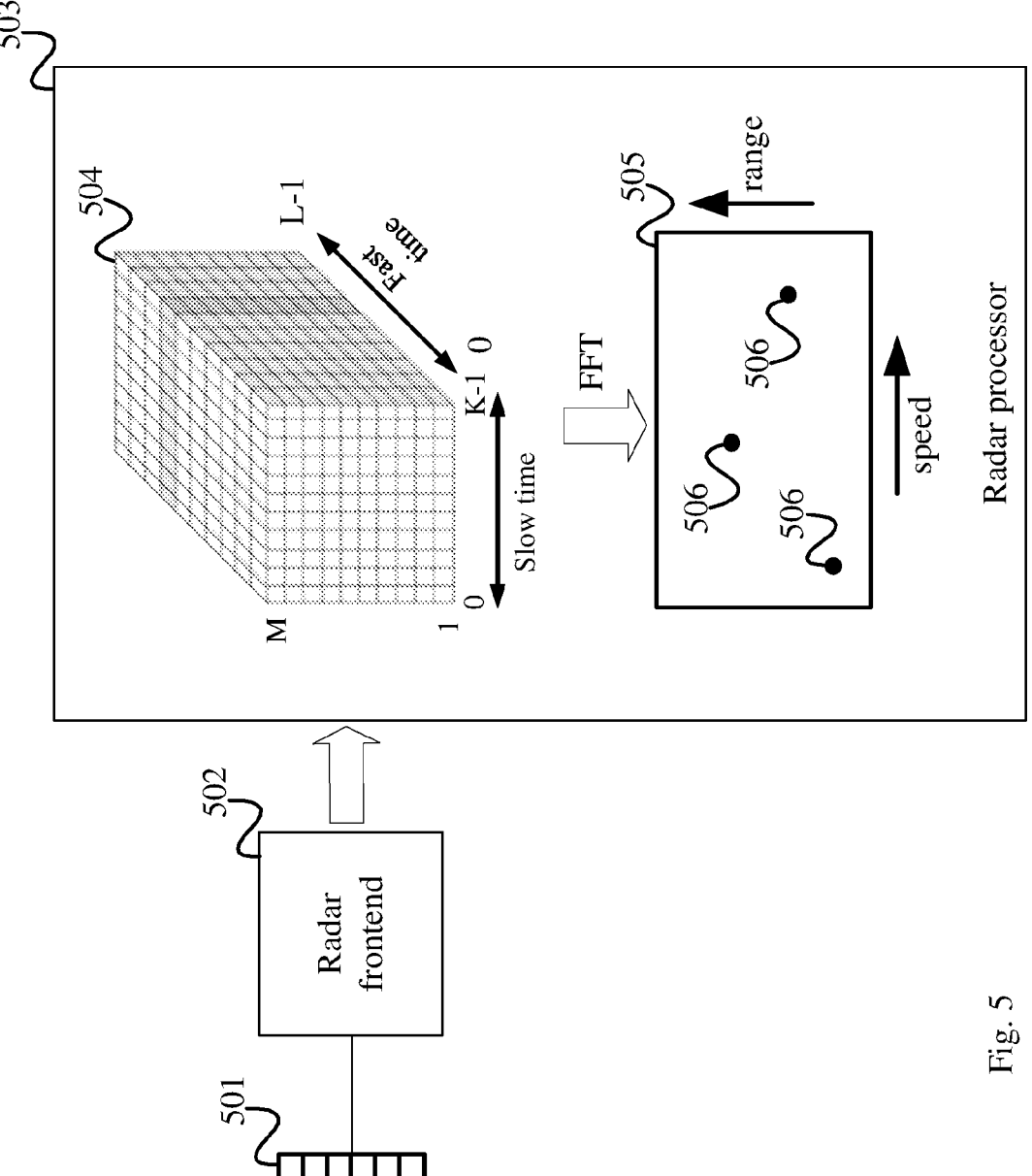
FIG. 5 is a schematic illustration of an extraction scheme, which may be implemented to extract range and speed (Doppler) estimations from digital reception radar data values, in accordance with some demonstrative aspects.

Reference is made to FIG. 5, which schematically illustrates an extraction scheme, which may be implemented to extract range and speed (Doppler) estimations from digital reception radar data values, in accordance with some demonstrative aspects. For example, radar processor 104 (FIG. 1), radar processor 210 (FIG. 2), radar processor 309 (FIG. 3), and/or radar processor 402 (FIG. 4), may be configured to extract range and/or speed (Doppler) estimations from digital reception radar data values according to one or more aspects of the extraction scheme of FIG. 5.

In some demonstrative aspects, as shown in FIG. 5, a radio receive signal, e.g., including echoes of a radio transmit signal, may be received by a receive antenna array 501. The radio receive signal may be processed by a radio radar frontend 502 to generate digital reception data values, e.g., as described above. The radio radar frontend 502 may provide the digital reception data values to a radar processor 503, which may process the digital reception data values to provide radar information, e.g., as described above.

In some demonstrative aspects, the digital reception data values may be represented in the form of a data cube 504. For example, the data cube 504 may include digitized samples of the radio receive signal, which is based on a radio signal transmitted from a transmit antenna and received by M receive antennas. In some demonstrative aspects, for example, with respect to a MIMO implementation, there may be multiple transmit antennas, and the number of samples may be multiplied accordingly.

In some demonstrative aspects, a layer of the data cube 504, for example, a horizontal layer of the data cube 504, may include samples of an antenna, e.g., a respective antenna of the M antennas.

In some demonstrative aspects, data cube 504 may include samples for K chirps. For example, as shown in FIG. 5, the samples of the chirps may be arranged in a so-called "slow time"-direction.

In some demonstrative aspects, the data cube 504 may include L samples, e.g., L=512 or any other number of samples, for a chirp, e.g., per each chirp. For example, as shown in FIG. 5, the samples per chirp may be arranged in a so-called "fast time"—direction of the data cube 504.

In some demonstrative aspects, radar processor 503 may be configured to process a plurality of samples, e.g., L samples collected for each chirp and for each antenna, by a first FFT. The first FFT may be performed, for example, for each chirp and each antenna, such that a result of the processing of the data cube 504 by the first FFT may again have three dimensions, and may have the size of the data cube 504 while including values for L range bins, e.g., instead of the values for the L sampling times.

In some demonstrative aspects, radar processor 503 may be configured to process the result of the processing of the data cube 504 by the first FFT, for example, by processing the result according to a second FFT along the chirps, e.g., for each antenna and for each range bin.

For example, the first FFT may be in the "fast time" direction, and the second FFT may be in the "slow time" direction.

In some demonstrative aspects, the result of the second FFT may provide, e.g., when aggregated over the antennas, a range/Doppler (R/D) map 505. The R/D map may have FFT peaks 506, for example, including peaks of FFT output values (in terms of absolute values) for certain range/speed combinations, e.g., for range/Doppler bins. For example, a range/Doppler bin may correspond to a range bin and a Doppler bin. For example, radar processor 503 may consider a peak as potentially corresponding to an object, e.g., of the range and speed corresponding to the peak's range bin and speed bin.

In some demonstrative aspects, the extraction scheme of FIG. 5 may be implemented for an FMCW radar, e.g., FMCW radar 400 (FIG. 4), as described above. In other aspects, the extraction scheme of FIG. 5 may be implemented for any other radar type. In one example, the radar processor 503 may be configured to determine a range/Doppler map 505 from digital reception data values of a PMCW radar, an OFDM radar, or any other radar technologies. For example, in adaptive or cognitive radar, the pulses in a frame, the waveform and/or modulation may be changed over time, e.g., according to the environment.

Referring back to FIG. 3, in some demonstrative aspects, receive antenna arrangement 303 may be implemented using a receive antenna array having a plurality of receive antennas (or receive antenna elements). For example, radar processor 309 may be configured to determine an angle of arrival of the received radio signal, e.g., echo 107 (FIG. 1) and/or echo 215 (FIG. 2). For example, radar processor 309 may be configured to determine a direction of a detected object, e.g., with respect to the device/system 301, for example, based on the angle of arrival of the received radio signal, e.g., as described below.

Figure 6:
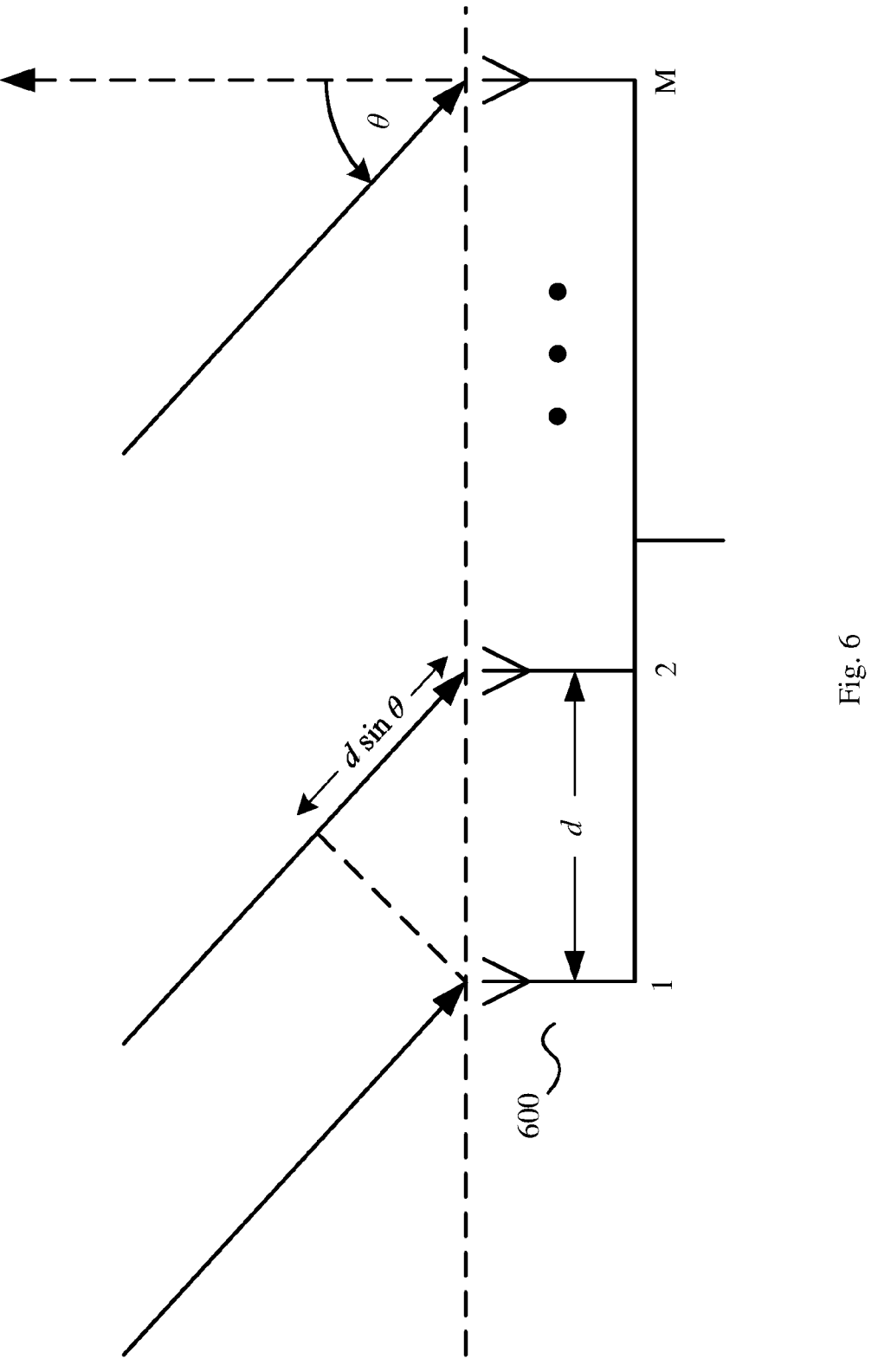
FIG. 6 is a schematic illustration of an angle-determination scheme, which may be implemented to determine Angle of Arrival (AoA) information based on an incoming radio signal received by a receive antenna array, in accordance with some demonstrative aspects.

Reference is made to FIG. 6, which schematically illustrates an angle-determination scheme, which may be implemented to determine Angle of Arrival (AoA) information based on an incoming radio signal received by a receive antenna array 600, in accordance with some demonstrative aspects.

FIG. 6 depicts an angle-determination scheme based on received signals at the receive antenna array. In some demonstrative aspects, for example, in a virtual MIMO array, the angle-determination may also be based on the signals transmitted by the array of Tx antennas.

FIG. 6 depicts a one-dimensional angle-determination scheme. Other multi-dimensional angle determination schemes, e.g., a two-dimensional scheme or a three-dimensional scheme, may be implemented.

In some demonstrative aspects, as shown in FIG. 6, the receive antenna array 600 may include M antennas (numbered, from left to right, 1 to M).

As shown by the arrows in FIG. 6, it is assumed that an echo is coming from an object located at the top left direction. Accordingly, the direction of the echo, e.g., the incoming radio signal, may be towards the bottom right. According to this example, the further to the left a receive antenna is located, the earlier it will receive a certain phase of the incoming radio signal.

For example, a phase difference, denoted $\Delta\varphi$, between two antennas of the receive antenna array 600 may be determined, e.g., as follows:

$$\Delta\varphi = \frac{2\pi}{\lambda} \cdot d \cdot \sin(\theta)$$

wherein $\lambda$ denotes a wavelength of the incoming radio signal, d denotes a distance between the two antennas, and $\theta$ denotes an angle of arrival of the incoming radio signal, e.g., with respect to a normal direction of the array.

In some demonstrative aspects, radar processor 309 (FIG. 3) may be configured to utilize this relationship between phase and angle of the incoming radio signal, for example, to determine the angle of arrival of echoes, for example by performing an FFT, e.g., a third FFT ("angular FFT") over the antennas.

In some demonstrative aspects, multiple transmit antennas, e.g., in the form of an antenna array having multiple transmit antennas, may be used, for example, to increase the spatial resolution, e.g., to provide high-resolution radar information. For example, a MIMO radar device may utilize a virtual MIMO radar antenna, which may be formed as a convolution of a plurality of transmit antennas convolved with a plurality of receive antennas.

Figure 7:
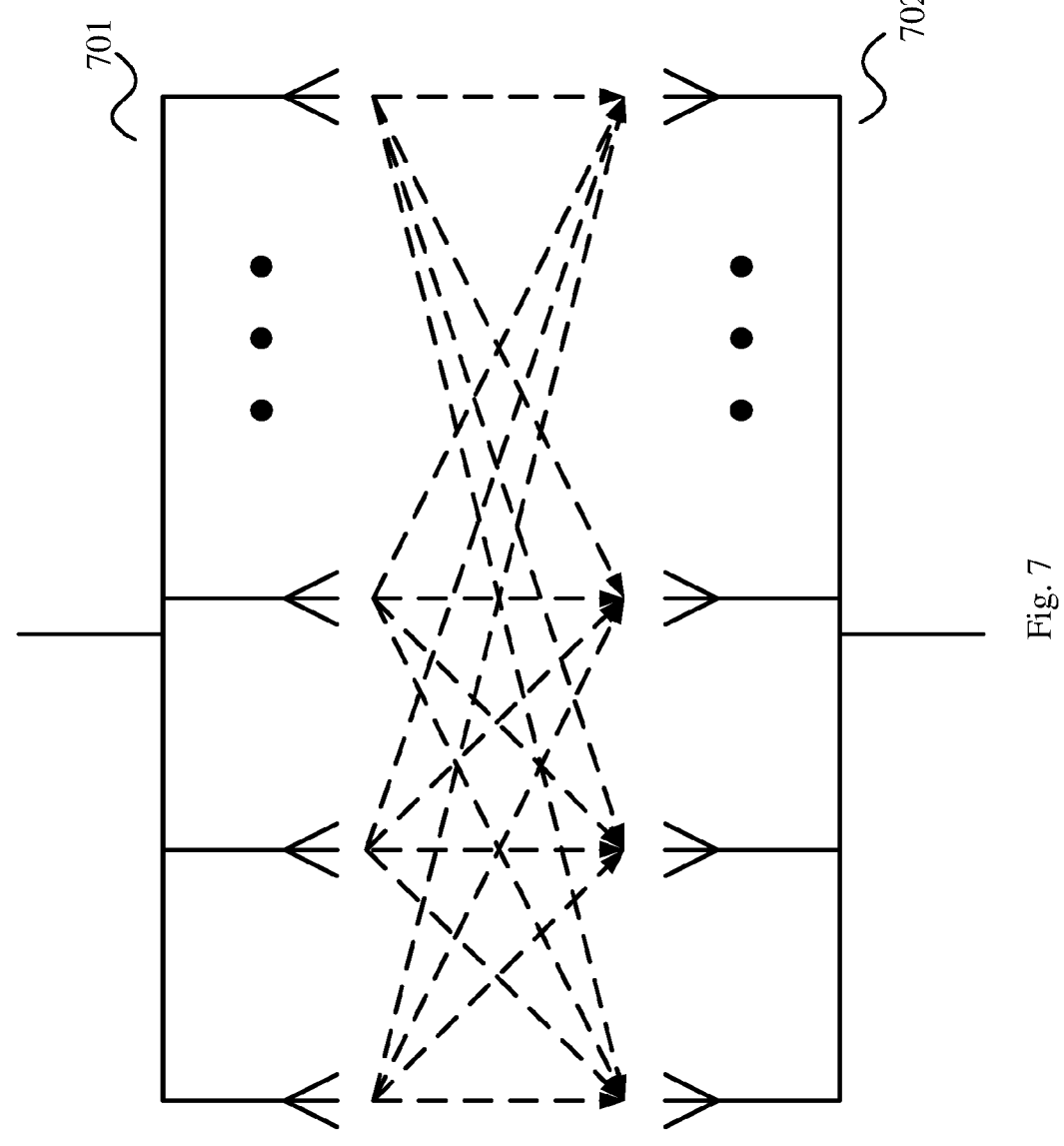
FIG. 7 is a schematic illustration of a Multiple-Input-Multiple-Output (MIMO) radar antenna scheme, which may be implemented based on a combination of Transmit (Tx) and Receive (Rx) antennas, in accordance with some demonstrative aspects.

Reference is made to FIG. 7, which schematically illustrates a MIMO radar antenna scheme, which may be implemented based on a combination of Transmit (Tx) and Receive (Rx) antennas, in accordance with some demonstrative aspects.

In some demonstrative aspects, as shown in FIG. 7, a radar MIMO arrangement may include a transmit antenna array 701 and a receive antenna array 702. For example, the one or more transmit antennas 302 (FIG. 3) may be implemented to include transmit antenna array 701, and/or the one or more receive antennas 303 (FIG. 3) may be implemented to include receive antenna array 702.

In some demonstrative aspects, antenna arrays including multiple antennas both for transmitting the radio transmit signals and for receiving echoes of the radio transmit signals, may be utilized to provide a plurality of virtual channels as illustrated by the dashed lines in FIG. 7. For example, a virtual channel may be formed as a convolution, for example, as a Kronecker product, between a transmit antenna and a receive antenna, e.g., representing a virtual steering vector of the MIMO radar.

In some demonstrative aspects, a transmit antenna, e.g., each transmit antenna, may be configured to send out an individual radio transmit signal, e.g., having a phase associated with the respective transmit antenna.

For example, an array of N transmit antennas and M receive antennas may be implemented to provide a virtual MIMO array of size N×M. For example, the virtual MIMO array may be formed according to the Kronecker product operation applied to the Tx and Rx steering vectors.

Figure 8:
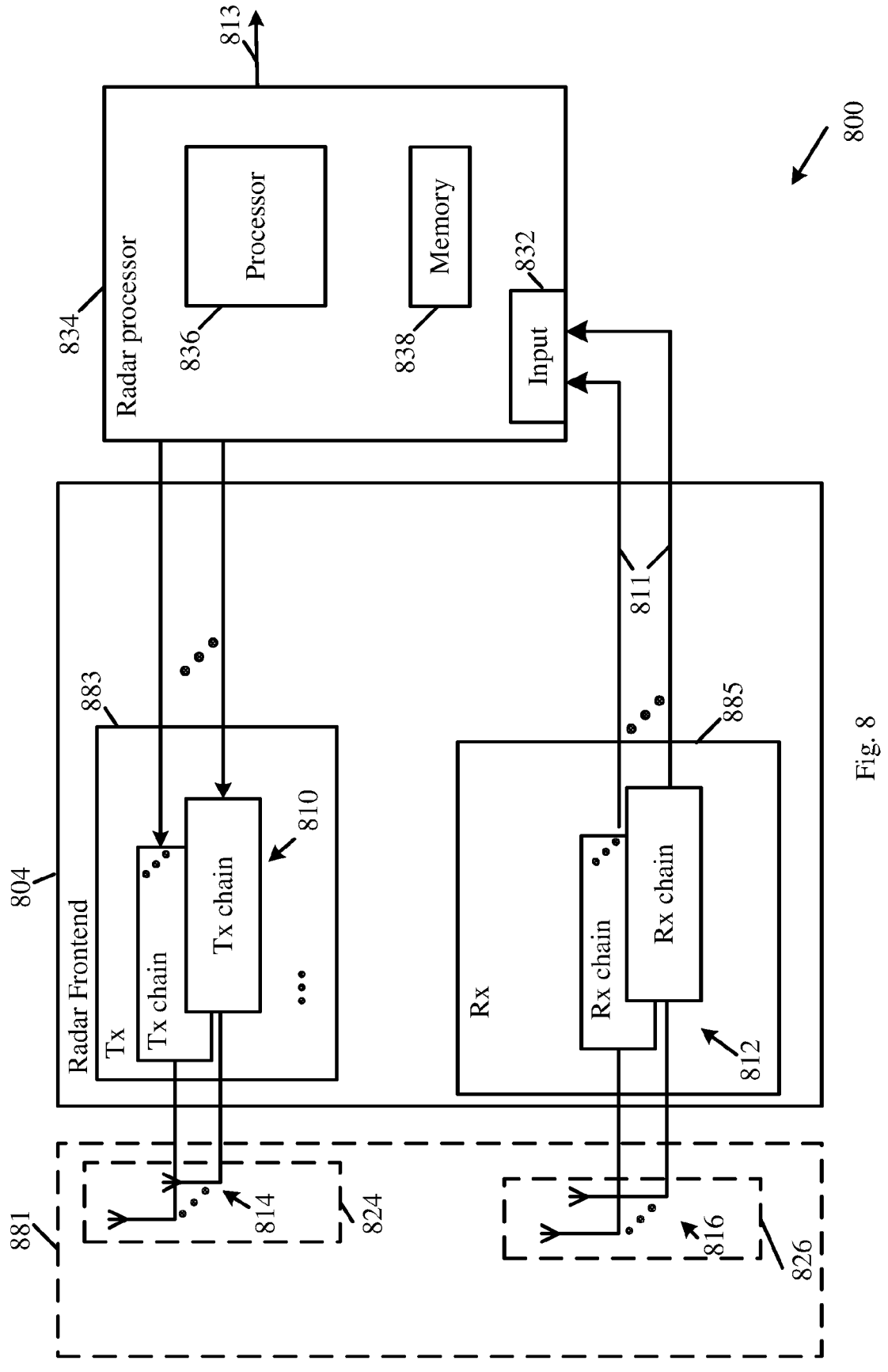
FIG. 8 is a schematic block diagram illustration of elements of a radar device including a radar frontend and a radar processor, in accordance with some demonstrative aspects.

FIG. 8 is a schematic block diagram illustration of elements of a radar device 800, in accordance with some demonstrative aspects. For example, radar device 101 (FIG. 1), radar device 300 (FIG. 3), and/or radar device 400 (FIG. 4), may include one or more elements of radar device 800, and/or may perform one or more operations and/or functionalities of radar device 800.

In some demonstrative aspects, as shown in FIG. 8, radar device 800 may include a radar frontend 804 and a radar processor 834. For example, radar frontend 103 (FIG. 1), radar frontend 211 (FIG. 1), radar frontend 304 (FIG. 3), radar frontend 401 (FIG. 4), and/or radar frontend 502 (FIG. 5), may include one or more elements of radar frontend 804, and/or may perform one or more operations and/or functionalities of radar frontend 804.

In some demonstrative aspects, radar frontend 804 may be implemented as part of a MIMO radar utilizing a MIMO radar antenna 881 including a plurality of Tx antennas 814 configured to transmit a plurality of Tx RF signals (also referred to as "Tx radar signals"); and a plurality of Rx antennas 816 configured to receive a plurality of Rx RF signals (also referred to as "Rx radar signals"), for example, based on the Tx radar signals, e.g., as described below.

In some demonstrative aspects, MIMO antenna array 881, antennas 814, and/or antennas 816 may include or may be part of any type of antennas suitable for transmitting and/or receiving radar signals. For example, MIMO antenna array 881, antennas 814, and/or antennas 816, may be implemented as part of any suitable configuration, structure, and/or arrangement of one or more antenna elements, components, units, assemblies, and/or arrays. For example, MIMO antenna array 881, antennas 814, and/or antennas 816, may be implemented as part of a phased array antenna, a multiple element antenna, a set of switched beam antennas, and/or the like. In some aspects, MIMO antenna array 881, antennas 814, and/or antennas 816, may be implemented to support transmit and receive functionalities using separate transmit and receive antenna elements. In some aspects, MIMO antenna array 881, antennas 814, and/or antennas 816, may be implemented to support transmit and receive functionalities using common and/or integrated transmit/receive elements.

In some demonstrative aspects, MIMO radar antenna 881 may include a rectangular MIMO antenna array, and/or curved array, e.g., shaped to fit a vehicle design. In other aspects, any other form, shape and/or arrangement of MIMO radar antenna 881 may be implemented.

In some demonstrative aspects, radar frontend 804 may include one or more radios configured to generate and transmit the Tx RF signals via Tx antennas 814; and/or to process the Rx RF signals received via Rx antennas 816, e.g., as described below.

In some demonstrative aspects, radar frontend 804 may include at least one transmitter (Tx) 883 including circuitry and/or logic configured to generate and/or transmit the Tx radar signals via Tx antennas 814.

In some demonstrative aspects, radar frontend 804 may include at least one receiver (Rx) 885 including circuitry and/or logic to receive and/or process the Rx radar signals received via Rx antennas 816, for example, based on the Tx radar signals.

In some demonstrative aspects, transmitter 883, and/or receiver 885 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, transmitter 883 may include a plurality of Tx chains 810 configured to generate and transmit the Tx RF signals via Tx antennas 814, e.g., respectively; and/or receiver 885 may include a plurality of Rx chains 812 configured to receive and process the Rx RF signals received via the Rx antennas 816, e.g., respectively.

In some demonstrative aspects, radar processor 834 may be configured to generate radar information 813, for example, based on the radar signals communicated by MIMO radar antenna 881, e.g., as described below. For example, radar processor 104 (FIG. 1), radar processor 210 (FIG. 2), radar processor 309 (FIG. 3), radar processor 402 (FIG. 4), and/or radar processor 503 (FIG. 5), may include one or more elements of radar processor 834, and/or may perform one or more operations and/or functionalities of radar processor 834.

In some demonstrative aspects, radar processor 834 may be configured to generate radar information 813, for example, based on radar Rx data 811 received from the plurality of Rx chains 812. For example, radar Rx data 811 may be based on the radar Rx signals received via the Rx antennas 816.

In some demonstrative aspects, radar processor 834 may include an input 832 to receive radar input data, e.g., including the radar Rx data 811 from the plurality of Rx chains 812.

In some demonstrative aspects, radar processor 834 may include, or may be implemented, partially or entirely, by circuitry and/or logic, e.g., one or more processors including circuitry and/or logic, memory circuitry and/or logic. Additionally or alternatively, one or more functionalities of radar processor 834 may be implemented by logic, which may be executed by a machine and/or one or more processors, e.g., as described below.

In some demonstrative aspects, radar processor 834 may include at least one processor 836, which may be configured, for example, to process the radar Rx data 811, and/or to perform one or more operations, methods, and/or algorithms.

In some demonstrative aspects, radar processor 834 may include at least one memory 838, e.g., coupled to the processor 836. For example, memory 838 may be configured to store data processed by radar processor 834. For example, memory 838 may store, e.g., at least temporarily, at least some of the information processed by the processor 836, and/or logic to be utilized by the processor 836.

In some demonstrative aspects, memory 838 may be configured to store at least part of the radar data, e.g., some of the radar Rx data or all of the radar Rx data, for example, for processing by processor 836, e.g., as described below.

In some demonstrative aspects, memory 838 may be configured to store processed data, which may be generated by processor 836, for example, during the process of generating the radar information 813, e.g., as described below.

In some demonstrative aspects, memory 838 may be configured to store range information and/or Doppler information, which may be generated by processor 836, for example, based on the radar Rx data, e.g., as described below. In one example, the range information and/or Doppler information may be determined based on a Cross-Correlation (XCORR) operation, which may be applied to the radar Rx data. Any other additional or alternative operation, algorithm and/or procedure may be utilized to generate the range information and/or Doppler information.

In some demonstrative aspects, memory 838 may be configured to store AoA information, which maybe generated by processor 836, for example, based on the radar Rx data, the range information and/or Doppler information, e.g., as described below. In one example, the AoA information may be determined based on an AoA estimation algorithm. Any other additional or alternative operation, algorithm and/or procedure may be utilized to generate the AoA information.

In some demonstrative aspects, radar processor 834 may be configured to generate the radar information 813 including one or more of range information, Doppler information, and/or AoA information, e.g., as described below.

In some demonstrative aspects, the radar information 813 may include Point Cloud 1 (PC1) information, for example, including raw point cloud estimations, e.g., Range, Radial Velocity, Azimuth and/or Elevation.

In some demonstrative aspects, the radar information 813 may include Point Cloud 2 (PC2) information, which may be generated, for example, based on the PC1 information. For example, the PC2 information may include clustering information, tracking information, e.g., tracking of probabilities and/or density functions, bounding box information, classification information, orientation information, and the like.

In some demonstrative aspects, radar processor 834 may be configured to generate the radar information 813 in the form of four Dimensional (4D) image information, e.g., a cube, which may represent 4D information corresponding to one or more detected targets.

In some demonstrative aspects, the 4D image information may include, for example, range values, e.g., based on the range information, velocity values, e.g., based on the Doppler information, azimuth values, e.g., based on azimuth AoA information, elevation values, e.g., based on elevation AoA information, and/or any other values.

In some demonstrative aspects, radar processor 834 may be configured to generate the radar information 813 in any other form, and/or including any other additional or alternative information.

In some demonstrative aspects, radar processor 834 may be configured to process the signals communicated via MIMO radar antenna 881 as signals of a virtual MIMO array formed by a convolution of the plurality of Rx antennas 816 and the plurality of Tx antennas 814.

In some demonstrative aspects, radar frontend 804 and/or radar processor 834 may be configured to utilize MIMO techniques, for example, to support a reduced physical array aperture, e.g., an array size, and/or utilizing a reduced number of antenna elements. For example, radar frontend 804 and/or radar processor 834 may be configured to transmit orthogonal signals via one or more Tx arrays 824 including a plurality of N elements, e.g., Tx antennas 814, and processing received signals via one or more Rx arrays 826 including a plurality of M elements, e.g., Rx antennas 816.

In some demonstrative aspects, utilizing the MIMO technique of transmission of the orthogonal signals from the Tx arrays 824 with N elements and processing the received signals in the Rx arrays 826 with M elements may be equivalent, e.g., under a far field approximation, to a radar utilizing transmission from one antenna and reception with N*M antennas. For example, radar frontend 804 and/or radar processor 834 may be configured to utilize MIMO antenna array 881 as a virtual array having an equivalent array size of N*M, which may define locations of virtual elements, for example, as a convolution of locations of physical elements, e.g., the antennas 814 and/or 816.

In some demonstrative aspects, a radar system may include a plurality of radar devices 800. For example, vehicle 100 (FIG. 1) may include a plurality of radar devices 800, e.g., as described below.

Figure 9:
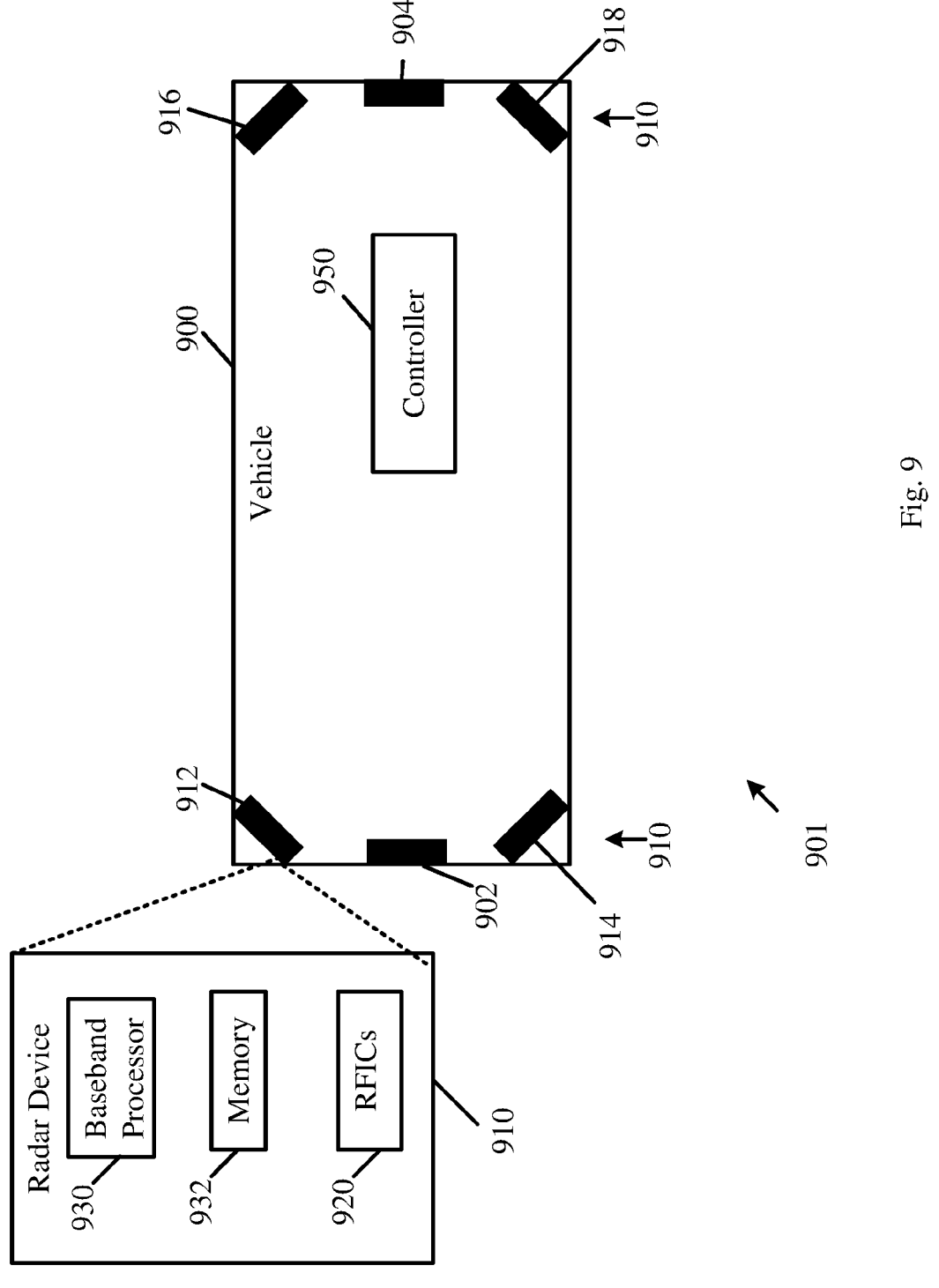
FIG. 9 is a schematic illustration of a radar system including a plurality of radar devices implemented in a vehicle, in accordance with some demonstrative aspects.

Reference is made to FIG. 9, which schematically illustrates a radar system 901 including a plurality of radar devices 910 implemented in a vehicle 900, in accordance with some demonstrative aspects.

In some demonstrative aspects, as shown in FIG. 9, the plurality of radar devices 910 may be located, for example, at a plurality of positions around vehicle 900, for example, to provide radar sensing at a large field of view around vehicle 900, e.g., as described below.

In some demonstrative aspects, as shown in FIG. 9, the plurality of radar devices 910 may include, for example, six radar devices 910, e.g., as described below.

In some demonstrative aspects, the plurality of radar devices 910 may be located, for example, at a plurality of positions around vehicle 900, which may be configured to support 360-degrees radar sensing, e.g., a field of view of 360 degrees surrounding the vehicle 900, e.g., as described below.

In one example, the 360-degrees radar sensing may allow to provide a radar-based view of substantially all surroundings around vehicle 900, e.g., as described below.

In other aspects, the plurality of radar devices 910 may include any other number of radar devices 910, e.g., less than six radar devices or more than six radar devices.

In other aspects, the plurality of radar devices 910 may be positioned at any other locations and/or according to any other arrangement, which may support radar sensing at any other field of view around vehicle 900, e.g., 360-degrees radar sensing or radar sensing of any other field of view.

For example, the plurality of radar devices 910 may be positioned at one or more locations, e.g., at one or more heights, for example, at different height locations, e.g., at a bumper height, a headlight height, a Facia center/top corners/roof height, and/or any other location.

In some demonstrative aspects, as shown in FIG. 9, vehicle 900 may include a first radar device 902, e.g., a front radar device, at a front-side of vehicle 900.

In some demonstrative aspects, as shown in FIG. 9, vehicle 900 may include a second radar device 904, e.g., a back radar device, at a back-side of vehicle 900.

In some demonstrative aspects, as shown in FIG. 9, vehicle 900 may include one or more of radar devices at one or more respective corners of vehicle 900. For example, vehicle 900 may include a first corner radar device 912 at a first corner of vehicle 900, a second corner radar device 914 at a second corner of vehicle 900, a third corner radar device 916 at a third corner of vehicle 900, and/or a fourth corner radar device 918 at a fourth corner of vehicle 900.

In some demonstrative aspects, vehicle 900 may include one, some, or all, of the plurality of radar devices 910 shown in FIG. 9. For example, vehicle 900 may include the front radar device 902 and/or back radar device 904.

In other aspects, vehicle 900 may include any other additional or alternative radar devices, for example, at any other additional or alternative positions around vehicle 900. In one example, vehicle 900 may include a side radar, e.g., on a side of vehicle 900.

In some demonstrative aspects, as shown in FIG. 9, vehicle 900 may include a radar system controller 950 configured to control one or more, e.g., some or all, of the radar devices 910.

In some demonstrative aspects, at least part of the functionality of radar system controller 950 may be implemented by a dedicated controller, e.g., a dedicated system controller or central controller, which may be separate from the radar devices 910, and may be configured to control some or all of the radar devices 910.

In some demonstrative aspects, at least part of the functionality of radar system controller 950 may be implemented as part of at least one radar device 910.

In one example, at least part of the functionality of system controller 950 may be implemented, e.g., in a centralized manner, for example, as part of a single radar device 910 of the plurality of radar devices 910.

In another example, at least part of the functionality of radar system controller 950 may be implemented, e.g., in a distributed manner, for example, as part of two or more radar device 910 of the plurality of radar devices 910. For example, at least part of the functionality of system controller 950 may be distributed between some or all of the radar devices 910.

In some demonstrative aspects, at least part of the functionality of radar system controller 950 may be implemented by a radar processor of at least one of the radar devices 910. For example, radar processor 834 (FIG. 8) may include one or more elements of radar system controller 950, and/or may perform one or more operations and/or functionalities of radar system controller 950.

In some demonstrative aspects, at least part of the functionality of radar system controller 950 may be implemented by a system controller of vehicle 900. For example, vehicle controller 108 (FIG. 1) may include one or more elements of radar system controller 950, and/or may perform one or more operations and/or functionalities of radar system controller 950.

In other aspects, one or more functionalities of system controller 950 may be implemented as part of any other element of vehicle 900.

In some demonstrative aspects, as shown in FIG. 9, a radar device 910 of the plurality of radar devices 910, e.g., each radar device 910, may include a baseband processor 930 (also referred to as a "Baseband Processing Unit (BPU) "), which may be configured to control communication of radar signals by the radar device 910, and/or to process radar signals communicated by the radar device 910. For example, baseband processor 930 may include one or more elements of radar processor 834 (FIG. 8), and/or may perform one or more operations and/or functionalities of radar processor 834 (FIG. 8).

In some demonstrative aspects, baseband processor 930 may include one or more components and/or elements configured for digital processing of radar signals communicated by the radar device 910, e.g., as described below.

In some demonstrative aspects, baseband processor 930 may include one or more FFT engines, matrix multiplication engines, DSP processors, and/or any other additional or alternative baseband, e.g., digital, processing components.

In some demonstrative aspects, as shown in FIG. 9, radar device 910 may include a memory 932, which may be configured to store data processed by, and/or to be processed by, baseband processor 910. For example, memory 932 may include one or more elements of memory 838 (FIG. 8), and/or may perform one or more operations and/or functionalities of memory 838 (FIG. 8).

In some demonstrative aspects, memory 932 may include an internal memory, and/or an interface to one or more external memories, e.g., an external Double Data Rate (DDR) memory, and/or any other type of memory.

In some demonstrative aspects, as shown in FIG. 9, radar device 910 may include one or more RF units, e.g., in the form of one or more RF Integrated Chips (RFICs) 920, which may be configured to communicate radar signals, e.g., as described below.

For example, an RFIC 920 may include one or more elements of front-end 804 (FIG. 8), and/or may perform one or more operations and/or functionalities of front-end 804 (FIG. 8).

In some demonstrative aspects, the plurality of RFICs 920 may be operable to form a radar antenna array including one or more Tx antenna arrays and one or more Rx antenna arrays.

For example, the plurality of RFICs 920 may be operable to form MIMO radar antenna 881 (FIG. 8) including Tx arrays 824 (FIG. 8), and/or Rx arrays 826 (FIG. 8).

In some demonstrative aspects, there may be a need to address one or more technical issues, for example, when implementing a radar system, e.g., a radar system in a vehicle, including a plurality of radar devices, for example, the plurality of radar devices 910, e.g., as described below.

In some demonstrative aspects, a number of vehicles, e.g., vehicle 900, equipped with radar devices may be expected to grow, for example, as importance of a radar sensor as an autonomous driving major sensor increases.

In some demonstrative aspects, radio interference between radar devices may be expected to grow as well, e.g., as a result of the increase in the number of autonomous vehicles utilizing radar devices.

In some demonstrative aspects, radio interference between radar devices may affect the performance of the radar devices, for example, in terms of a degraded radar effective range, reduced probability of detections, and/or an increase in a number of false alarm detections.

In some demonstrative aspects, there may be a need to provide a technical solution to mitigate radio interference between radar devices, e.g., as described below.

In some demonstrative aspects, for example, in some use cases, scenarios, and/or implementations, there may be one or more disadvantages, inefficiencies, and/or technical problems in implementing mitigation methods including interference detection and/or mitigation based on a single radar unit. For example, these mitigation methods may not consider interference detections by other radar units, which may degrade an accuracy and/or effectivity of the mitigation methods.

In some demonstrative aspects, a radar device, e.g., radar device 910, may be configured to mitigate interference in an environment of the radar system, e.g., radar system 901, for example, according to a collaborative interference mitigation scheme, e.g., as described below.

In some demonstrative aspects, the collaborative interference mitigation scheme may be configured to provide a technical solution of a vehicle holistic approach to mitigate the interference in the environment of the radar system 901, e.g., as described below.

In some demonstrative aspects, the collaborative interference mitigation scheme may be implemented to provide a technical solution, which may support a global perspective of optimization, which may improve the effectiveness and/or efficiency of mitigation methods including interference detection and/or mitigation based on a single radar unit, e.g., as described below.

In some demonstrative aspects, the collaborative interference mitigation scheme may be implemented to support a technical solution to share interference measurement tasks between several radar devices. This approach may provide a technical solution to reduce a load on a single radar device, e.g., radar device 910, e.g., as described below.

In some demonstrative aspects, the collaborative interference mitigation scheme may be implemented to support a technical solution, which may provide more information of a specific interferer, for example, when more than two radar devices 910 may have a same interferer, e.g., at different parts of their Field of Views (FoVs), e.g., as described below In some demonstrative aspects, the ability to share and/or use more information on the specific interferer may enhance the interference mitigation performance, for example, by supporting a use of more appropriate resources, suitable radar modes, dedicated modulation types, for example, that may be more suitable for a dense/interfered environment, and/or the like, e.g., as described below In some demonstrative aspects, the collaborative interference mitigation scheme may be implemented to support a technical solution for using sensing state information, for example, to improve predication probabilities of interferers. For example, the sensing state information may provide important side information, e.g., as described below.

In some demonstrative aspects, the collaborative interference mitigation scheme may be implemented to support a technical solution to detect and/or suggest areas having reduced interference, for example, due to blocking by buildings and/or terrain, for example, based on map information of the environment, e.g., as described below.

In some demonstrative aspects, the collaborative interference mitigation scheme may be implemented to support a technical solution to reduce a response time of radar system

901, for example, to react faster to blockers and/or interferences, e.g., as described below.

In some demonstrative aspects, the collaborative interference mitigation scheme may be implemented to support a technical solution, which may provide better co-existence with the environment and/or other vehicles. For example, a Tx power of a radar device may be reduced, e.g., in a dense environment, for example, to avoid contamination of adjacent vehicles. This approach may provide a technical solution to make an entire eco-system more "interference friendly", e.g., as described below.

In some demonstrative aspects, the plurality of radar devices 910 may be configured to mitigate interference in an environment of the radar system 901, for example, according to a collaborative interference mitigation scheme, e.g., as described below.

Figure 10:
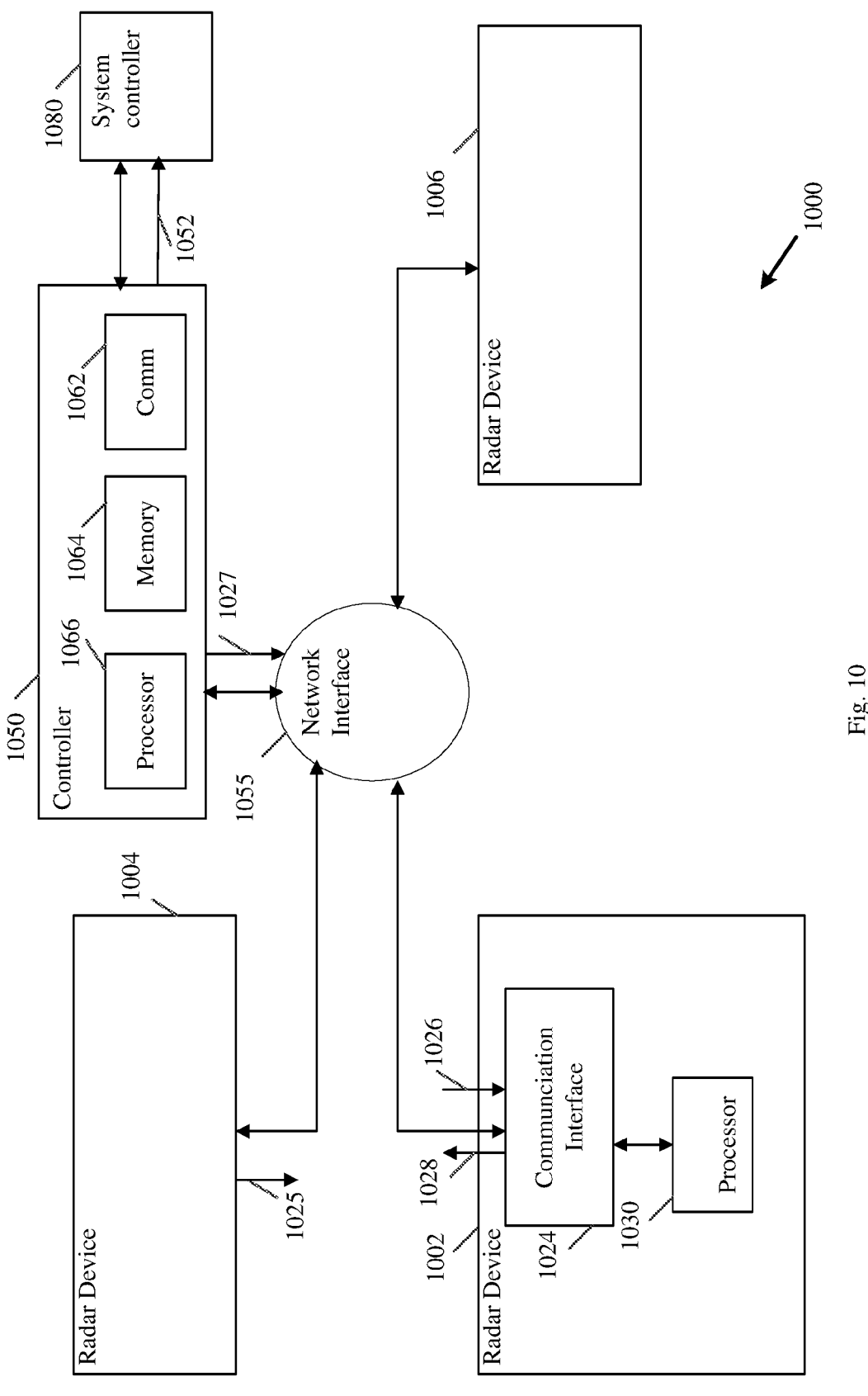
FIG. 10 is a schematic illustration of a radar system including a plurality of radar devices, in accordance with some demonstrative aspects.

Reference is made to FIG. 10, which schematically illustrates a radar system 1000 including a plurality of radar devices, in accordance with some demonstrative aspects. For example, radar system 901 (FIG. 9) may include one or more elements of radar system 1000, and/or may perform one or more operations and/or functionalities of radar system 1000.

In some demonstrative aspects, the plurality of radar devices of radar system 1000 may include a first radar device 1002, a second radar device 1004, and/or a third radar device 1006.

In some demonstrative aspects, radar system 1000 may include any other count of radar devices.

In some demonstrative aspects, the plurality of radar devices of radar system 1000 may be configured to mitigate interference in an environment of the radar system 1000, for example, according to a collaborative interference mitigation scheme, e.g., as described below.

In some demonstrative aspects, the plurality of radar devices of radar system 1000 may be configured to communicate via a network interface 1055.

In some demonstrative aspects, network interface 1055 may be implemented to support a centralized communication scheme, for example, to support communication between a central controller, e.g., a controller 1050, and the radar devices 1002, 1004, 1006 and/or 1008, e.g., as described below.

In some demonstrative aspects, network interface 1055 may be implemented to support a distributed communication scheme, for example, to support communication between the radar devices 1002, 1004, 1006 and/or 1008, and/or a controller, e.g., controller 1050, e.g., as described below.

In some demonstrative aspects, network interface 1055 may be implemented, for example, according to a switched topology, which may utilize a central switch to connect between the plurality of radar devices of radar system 1000.

In some demonstrative aspects, network interface 1055 may be implemented, for example, according to a ring topology, e.g., such that the plurality of radar devices of radar system 1000 may communicate as nodes on a same ring.

In some demonstrative aspects, network interface 1055 may include a combined topology including a combination of the ring topology and the switched topology.

In some demonstrative aspects, communication interface 1055 may include a Bus, and/or a communication lane connected to the plurality of radar devices of radar system 1000.

In some demonstrative aspects, network interface 1055 may include Ethernet cables, e.g., 1 Gbps Ethernet cables, connected via one or more central switches, and/or over dedicated interfaces.

In some demonstrative aspects, network interface 1055 may include any other additional and/or alternative elements and/or components.

In one example, network interface 1055 may be based on an existing networking infrastructure in a vehicle. e.g., vehicle 900 (FIG. 9).

In other aspects, network interface 1055 may be implemented according to any other additional or alternative topology, architecture, message formats, and/or components configured to support communication between elements of radar system 1000.

In some demonstrative aspects, radar devices of the radar system 1000, e.g., radar device 1002, radar device 1004, radar device 1006 and/or radar device 1008, may include a communication interface to communicate via network interface 1055, e.g., as described below.

In some demonstrative aspects, a radar device of the radar system 1000, e.g., radar device 1002, may include a communication interface 1024 to communicate via network interface 1055, e.g., as described below.

In some demonstrative aspects, the communication interface 1024 of radar device 1002 may be configured to receive first interference-based information 1026, for example, via network interface 1055, e.g., as described below.

In some demonstrative aspects, the first interference-based information 1026 may be based on interference detected by at least one second radar device of the plurality of radar devices of radar system 1000, for example, radar device 1004, e.g., as described below.

In some demonstrative aspects, radar device 1002 may include a processor 1030 configured to control the first radar device 1002 to communicate radar signals of the first radar device 1002, for example, based on the first interference-based information 1026, e.g., as described below.

For example, processor 1030 may include, or may be implemented by, a baseband processor of radar device 1002, one or more RF components of radar device 1002, and/or one or more Intermediate Frequency (IF) components of radar device 1002.

For example, processor 1030 may include one or more elements of baseband processor 930 (FIG. 9), and/or may perform one or more operations and/or functionalities of baseband processor 930 (FIG. 9).

In some demonstrative aspects, processor 1030 may be configured to cause the communication interface 1024 to output second interference-based information 1028, e.g., as described below.

In some demonstrative aspects, the second interference-based information 1028 may be based, for example, on the radar signals of the first radar device 1002, e.g., as described below.

In some demonstrative aspects, the first interference-based information 1026 may include interference information of one or more interferers to be mitigated by the first radar device 1002, e.g., as described below.

In some demonstrative aspects, the first interference-based information 1026 may include an expected interference map of one or more expected interferers to be mitigated by the first radar device 1002, e.g., as described below.

In some demonstrative aspects, processor 1030 may be configured to collaborate with one or more other radar devices in radar system 1000 to mitigate interference in an environment of the radar system 1000, e.g., as described below.

In some demonstrative aspects, processor 1030 may be configured to cause the radar device 1002 to communicate radar signals of the radar device 1002 based on the first interference-based information 1026 received by the communication interface 1024. For example, the first interference-based information may be based on interference detected by at least one other radar device in the radar system 1000, e.g., as described below.

In some demonstrative aspects, processor 1030 may be configured to cause the communication interface 1024 to output second interference-based information, e.g., interference-based information 1028, which may be based on the radar signals of the radar device 1022, e.g., as described below.

In some demonstrative aspects, the first interference-based information 1026 may be received from the controller 1050 of the radar system 1000, e.g., as described below.

In some demonstrative aspects, processor 1030 may be configured to cause the communication interface 1024 to send the second interference-based information 1028 to the controller 1050 of the radar system 1000, e.g., as described below.

In some demonstrative aspects, the communication interface 1024 may receive the first interference-based information 1026 from another radar device of radar system 1000. For example, the first interference-based information 1026 may identify interference detected by the other radar device, e.g., as described below. For example, the second interference-based information 1028 may identify interference detected by the radar device 1002, e.g., as described below.

In some demonstrative aspects, the first interference-based information 1026 may include interference measurement configuration information to configure interference measurements to be performed by the radar device 1002. For example, the processor 1030 may be configured to cause the radar device 1002 to perform the interference measurements based on the interference measurement configuration information, e.g., as descried below.

In some demonstrative aspects, the interference measurement configuration information may configure an in-band interference measurement to be performed by the radar device 1002 during a radar frame for communication of the radar signals of the radar device 1002, e.g., as described below.

In some demonstrative aspects, the interference measurement configuration information may configure an out-of-band interference measurement to be performed by the radar device 1002 in a listening mode between radar frames for communication of the radar signals of the radar device 1002, e.g., as described below.

In some demonstrative aspects, the first interference-based information 1026 may include one or more radar transmit (Tx) parameters. For example, the processor 1030 may configure radar transmissions by the radar device 1002 based on the one or more radar Tx parameters, e.g., as described below.

In some demonstrative aspects, the first interference-based information 1026 may include one or more radar Receive (Rx) parameters. For example, the processor 1030 may configure processing of radar Rx signals received by the radar device 1002 based on the one or more radar Rx parameters, e.g., as described below.

In some demonstrative aspects, the first interference-based information 1026 may include interference information of one or more interferers to be mitigated by the radar device 1002, e.g., as described below.

In some demonstrative aspects, the first interference-based information 1026 may include an expected interference map of one or more expected interferers to be mitigated by the radar device 1002, e.g., as described below.

In some demonstrative aspects, radar system 1000 may be configured according to a centralized collaborative mitigation scheme, e.g., as described below.

In some demonstrative aspects, radar system 1000 may include a controller 1050 configured to control one or more, e.g., some or all, of the plurality of radar devices. For example, radar system controller 950 (FIG. 9) may include one or more elements of controller 1050, and/or may perform one or more operations and/or functionalities of controller 1050.

In some demonstrative aspects, the collaborative interference mitigation scheme may include a centralized collaborative interference mitigation scheme, for example, in which controller 1050 may perform a role of, and/or one or more functionalities of, a master controller of the centralized collaborative interference mitigation scheme, e.g., as described below.

In some demonstrative aspects, controller 1050 may be configured to manage flow of information between the plurality of radar devices of radar system 1000, for example, in a connected network, e.g., via network interface 1055.

In some demonstrative aspects, controller 1050 may be configured to control one or more, e.g., some or all, of the plurality of radar devices of radar system 1000, for example, according to the collaborative interference mitigation scheme, e.g., as described below.

In some demonstrative aspects, controller 1050 may be configured to control the plurality of radar devices of radar system 1000, for example, to mitigate interference in an environment of the radar system 1000 according to a collaborative interference mitigation scheme, e.g., as described below.

In some demonstrative aspects, controller 1050 may include, or may be associated with, a communication interface 1062, which may be configured to communicate with some or all of the radar devices of system 1000, e.g., radar devices 1002, 1004 and/or 1006, for example, via network interface 1055.

In some demonstrative aspects, controller 1050 may include at least one processor 1066, which may be configured to process interference information from the plurality of radar devices of radar system 1000, and to control the plurality of radar devices according to the collaborative interference mitigation scheme based on the interference information from the plurality of radar devices, e.g., as described below.

In some demonstrative aspects, controller 1050 may include at least one memory 1064, which may be configured to store information processed by the processor 1066.

In some demonstrative aspects, memory 1064 may store interference mitigation information, for example, information of an interference mitigation may, e.g., as described below.

In some demonstrative aspects, processor 1066 may be configured to determine first interference-based information for a first radar device of the plurality of radar devices in radar system, 1000, for example, based on second interference-based information from at least one second radar device of the plurality of radar devices in the radar system 1000, e.g., as described below.

In some demonstrative aspects, processor 1066 may be configured to send the first interference-based information to the first radar device, e.g., as described below.

In some demonstrative aspects, controller 1050 may be configured to receive interference information from the plurality of radar devices of radar system 1000, and to control the plurality of radar devices of radar system 1000, for example, according to the collaborative interference mitigation scheme, e.g., as described below.

In some demonstrative aspects, controller 1050 may be configured to control the plurality of radar devices of radar system 1000, for example, based on the interference information from the plurality of radar devices of radar system 1000, e.g., as described below.

In some demonstrative aspects, controller 1050 may be configured to receive third interference-based information 1025 from the second radar device 1004, e.g., as described below.

In some demonstrative aspects, controller 1050 may be configured to determine the first interference-based information 1026 for radar device 1002, for example, based on the third interference-based information 1025, e.g., as described below.

In some demonstrative aspects, controller 1050 may be configured to provide the first interference-based information 1026 to the first radar device 1002, e.g., as described below.

In some demonstrative aspects, controller 1050 may be configured to receive the second interference-based information 1028 from the first radar device 1002, e.g., as described below.

In some demonstrative aspects, controller 1050 may be configured to determine fourth interference-based information 1027 based on the second interference-based information 1028, e.g., as described below.

In some demonstrative aspects, controller 1050 may be configured to provide the fourth interference-based information 1027 to at least one third radar device of the plurality of radar devices, e.g., as described below.

In some demonstrative aspects, the at least one third radar device of the plurality of radar devices may include, for example, the second radar device 1004, e.g., as described below.

In some demonstrative aspects, the at least one third radar device of the plurality of radar devices may be different from the second radar device 1004. For example, the at least one third radar device may include radar device 1006.

In some demonstrative aspects, controller 1050 may be configured to determine the first interference-based information 1026 for radar device 1002, for example, based on expected interference information representing expected interference in the environment of the radar system 1000, e.g., as described below.

In some demonstrative aspects, controller 1050 may be configured to determine the first interference-based information 1026 for radar device 1002, for example, based on driving trajectory information corresponding to planned driving trajectory of a vehicle, e.g., vehicle 900 (FIG. 9), including the radar system 1000, e.g., as described below. In one example, controller 1050 may be configured to receive the driving trajectory information from a system controller 1080 of the system including the radar system 1000, e.g., as described below.

In some demonstrative aspects, controller 1050 may be configured to determine the first interference-based information 1026 for radar device 1002, for example, based on map information corresponding to a map of the environment of the radar system 1000, e.g., as described below.

In some demonstrative aspects, controller 1050 may be configured to determine the first interference-based information 1026 for radar device 1002, for example, based on sensing state information corresponding to a state of the environment of the radar system 1000, e.g., as described below.

In some demonstrative aspects, the sensing state information may include interferer state information of a state of an interferer in the environment of the radar system 1000, e.g., as described below.

In some demonstrative aspects, the sensing state information may include object information of one or more objects in the environment of the radar system 1000, e.g., as described below.

In some demonstrative aspects, controller 1050 may be configured to determine the first interference-based information 1026 for radar device 1002, for example, based on one or more parameters of interferers in the environment of radar system 1000, e.g., as described below.

In some demonstrative aspects, controller 1050 may be configured to track one or more interferers in the environment of the radar system 1000, for example, based on the interference information from the plurality of radar devices of radar system 1000, e.g., as described below.

In some demonstrative aspects, controller 1050 may be configured to configure the first interference-based information 1026 for radar device 1002, for example, based on one or more parameters of the interferers in the environment of the radar system 1000, e.g., as described below.

In some demonstrative aspects, controller 1050 may be configured to generate the first interference-based information 1026 for radar device 1002, for example, to include interference information of one or more interferers to be mitigated by the radar device 1002, e.g., as described below.

In some demonstrative aspects, controller 1050 may be configured to generate the first interference-based information 1026 for radar device 1002, for example, to include one or more radar communication parameters to configure radar communications by the radar device 1002, e.g., as described below.

In some demonstrative aspects, controller 1050 may be configured to generate the first interference-based information 1026 for radar device 1002, for example, to include one or more radar Tx parameters to configure radar transmissions by the radar device 1002, e.g., as described below.

In some demonstrative aspects, the one or more radar Tx parameters may include, for example, a Tx power, a Tx spatial beam shape, a Tx time, a Tx frequency, a Tx polarization, a Tx waveform, a Tx resource Unit (RU), and/or a Tx code, e.g., as described below.

In other aspects, the one or more radar Tx parameters may include any other additional or alternative Tx parameters to configure radar transmissions by the radar device 1002.

In some demonstrative aspects, controller 1050 may be configured to generate the first interference-based information 1026 for radar device 1002, for example, to include one or more radar Rx parameters to configure processing of radar Rx signals received by the radar device 1002, e.g., as described below.

In some demonstrative aspects, the one or more radar Rx parameters may include, for example, an Rx threshold for radar detection, and/or a parameter of an interference mitigation mechanism utilized by the radar device 1002, e.g., as described below.

In other aspects, the one or more radar Rx parameters may include any other additional or alternative Rx parameters to configure processing of radar Rx signals received by the radar device 1002.

In some demonstrative aspects, controller 1050 may be configured to generate the first interference-based information 1026 for radar device 1002, for example, to include interference measurement configuration information to con-figure interference measurements to be performed by the radar device 1002, e.g., as described below.

In some demonstrative aspects, the interference measurement configuration information may configure an in-band interference measurement to be performed by the radar device 1002. For example, the in-band interference measurement may be performed by the radar device 1002 during a radar frame for communication of the radar signals of the radar device 1002, e.g., as described below.

In some demonstrative aspects, the interference measurement configuration information may configure an out-of-band interference measurement to be performed by the radar device 1002. For example, the out-of-band interference measurement may be performed by the radar device 1002 in a listening mode, for example, between radar frames for communication of the radar signals of the radar device 1002, e.g., as described below.

In some demonstrative aspects, controller 1050 may be configured to generate the first interference-based information 1026, for example, based on an interference map of the environment of the radar system 1000, e.g., as described below.

In some demonstrative aspects, the interference map of the environment of the radar system 1000 may include information of one or more detected interference sources (interferers) in the environment of the radar system 1000. For example, the information of detected interference of the one or more detected interferers may include, for example, an interference duty cycle of the detected interference, a frequency allocation of the detected interference, a polarization waveform of the detected interference, a velocity of the detected interference, and/or any other information corresponding to the detected interference.

In some demonstrative aspects, controller 1050 may be configured to manage and/or dynamically update the interference map of the environment of the radar system 1000, for example, based on the interference information from the plurality of radar devices of radar system 1000, e.g., as described below.

In some demonstrative aspects, controller 1050 may be configured to generate interference-based information for the radar devices of radar system 1000, e.g., the first interference-based information 1026 for radar device 1002, for example, based on the interference map, e.g., as described below.

In some demonstrative aspects, controller 1050 may be configured to determine a plurality of radar communication resources for the plurality of radar devices of the radar system 1000, for example, based on the interference map, e.g., as described below.

In some demonstrative aspects, controller 1050 may be configured to determine, and/or suggest to one or more radar devices of the radar system 1000, an interference mitigation method to be implemented for mitigating interference for the one or more radar devices of the radar system 1000, e.g., as described below.

In some demonstrative aspects, controller 1050 may be configured to determine the interference mitigation method, for example, based on analysis and/or estimation of the interference map, e.g., as described below.

In some demonstrative aspects, controller 1050 may be configured to determine the interference mitigation method, for example, based on analysis and/or estimation of an interferer duty cycle, an interferer frequency band selection, an interferer polarization waveform, an interferer relative velocity and/or any other information regarding the interferer.

In some demonstrative aspects, the plurality of radar communication resources may include a radar communication resource for a radar device, e.g., for the radar device 1002, and/or an out-of-band measurement resource for the radar device, e.g., the radar device 1002, e.g., as described below.

In some demonstrative aspects, a level of interference according to the interference map in the radar communication resource may be less than a level of interference according to the interference map in the out-of-band measurement resource, e.g., as described below.

In other aspects, the radar communication resource and/or the out-of-band measurement resource may be determined and/or configured abased on any other additional or alternative criteria and/or information.

In some demonstrative aspects, controller 1050 may be configured to control radar communications by the plurality of radar devices of radar system 1000, for example, according to one or more predefined radar control limitations of at least one radar standard or specification, e.g., as described below.

In some demonstrative aspects, controller 1050 may be configured to provide feedback information to the system controller 1080 of the system including the radar system 1000, e.g., as described below.

In one example, vehicle controller 108 (FIG. 1) may include one or more elements of system controller 1080, and/or may perform one or more operations and/or functionalities of system controller 1080.

In some demonstrative aspects, the feedback information may be based on the interference information from the plurality of radar devices of the radar system 1000, e.g., as described below.

In some demonstrative aspects, controller 1050 may be configured to generate radar information 1052 based on radar data from the plurality of radar devices of radar system 1000.

In some demonstrative aspects, system controller 1080 may control one or more systems of a vehicle, e.g., vehicle 900 (FIG. 9) based on the radar information 1052.

In some demonstrative aspects, radar system 1000 may be configured according to a centralized collaborative interference mitigation scheme, e.g., as described above.

In some demonstrative aspects, radar system 1000 may be configured according to a distributed collaborative interference mitigation scheme, e.g., as described below.

In some demonstrative aspects, the distributed collaborative interference mitigation scheme may be configured according to a distributed control scheme with an identified master. For example, one of the radar devices of radar system 1000, e.g., radar device 1002, may be identified as the master of the distributed control scheme. According to this example, the identified master, e.g., radar device 1002, may be configured to manage the flow of information between the radar devices of radar system 1000, e.g., via network interface 1055.

In some demonstrative aspects, the identified master, e.g., radar device 1002, may be configured to perform the role of, one or more operations of, and/or one or more functionalities of, the controller 1050.

In some demonstrative aspects, a radar device of the radar system 1000, e.g., radar device 1002, may be preconfigured or preset as the identified master. In other aspects, the role of the identified master may be determined in a dynamic manner.

In some demonstrative aspects, the distributed collaborative interference mitigation scheme may be configured according to a distributed control scheme without an identified master. For example, no entity of the radar system 1000 may be identified as a master, e.g., as described below.

In some demonstrative aspects, according to the distributed control scheme without an identified master, a radar device, e.g., each radar device, of the plurality of radar devices of the radar system 1000, may communicate with its neighbor radar devices, e.g., via network interface 1055, and/or may receive from the neighbor radar devices interference measurement results and/or information of intended transmission configurations and/or parameters.

In some demonstrative aspects, according to the distributed control scheme without an identified master, a radar device, e.g., each radar device, of the plurality of radar devices of the radar system 1000, may perform interference mitigation according to the collaborative interference mitigation scheme, for example, based on the information received from the other radar devices of radar system 1000, e.g., as described below.

In some demonstrative aspects, a conflict management entity may be defined, for example, to resolve conflicts and/or work assignments. For example, the conflict management may be defined according to assigned priorities, which may be changed, for example, according to a task and/or any other criteria.

In some demonstrative aspects, the communication interface 1024 of radar device 1002 may be configured to receive the first interference-based information 1026 from at least one second radar device, for example, radar device 1004 and/or any other radar device in radar system 1000, e.g., as described below.

In some demonstrative aspects, the first interference-based information 1026 may include first interference information to identify interference detected by the at least one second radar device, for example, radar device 1004, e.g., as described below.

In some demonstrative aspects, processor 1030 may be configured to control the radar device 1002 to communicate radar signals of the radar device 1002, for example, based on the interference-based information 1026 from the at least one second radar device, for example, radar device 1004, e.g., as described below.

In some demonstrative aspects, the communication interface 1024 may be configured to provide the second interference-based information 1028 of radar device 1002 to one or more other radar devices, e.g., radar devices 1004, 1006 and/or 1008.

In some demonstrative aspects, the second interference-based information 1028 may be configured to identify interference detected by the first radar device 1002 e.g., as described below.

Figure 11:
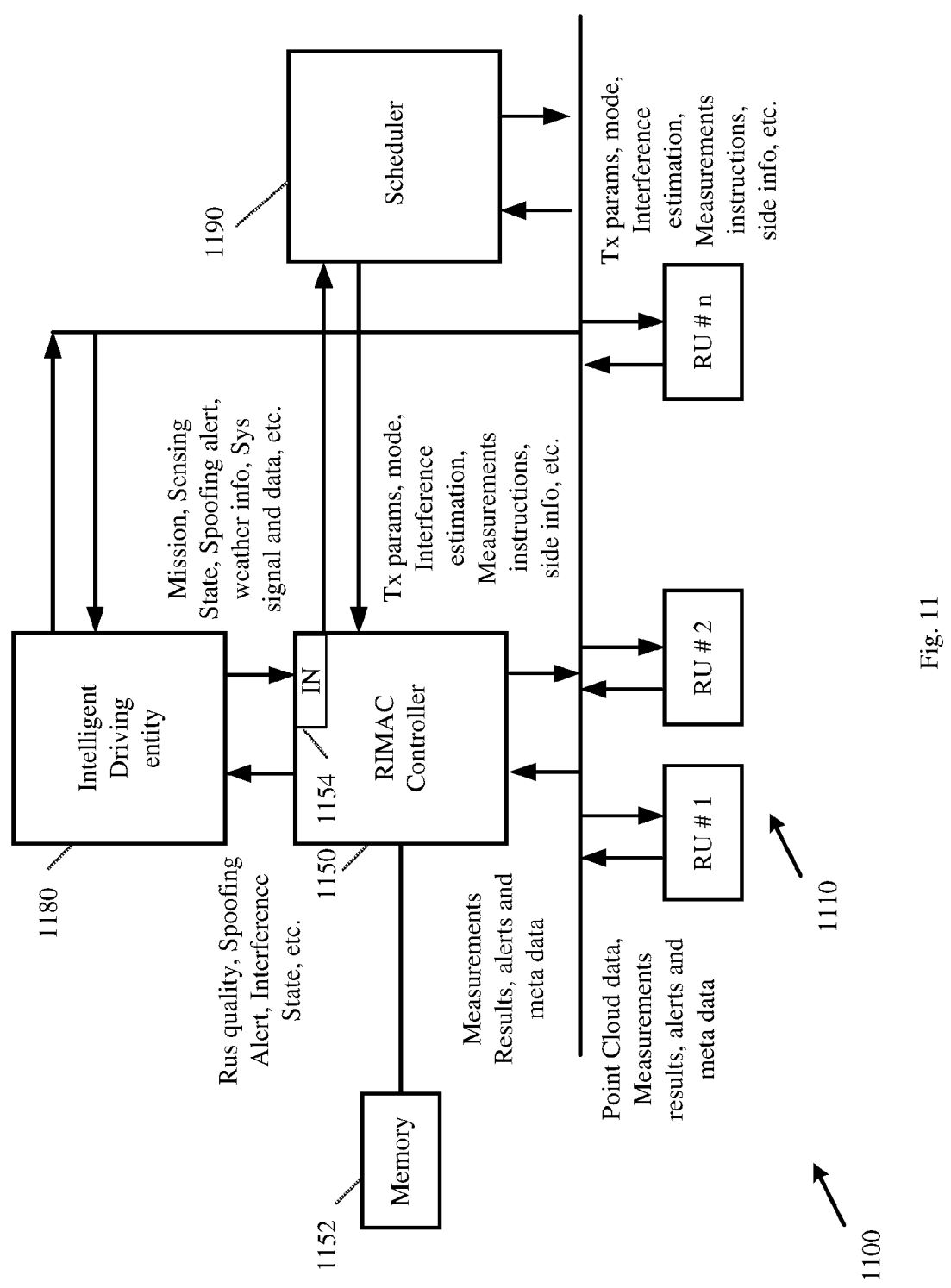
FIG. 11 is a schematic illustration of a radar system including a plurality of radar devices, in accordance with some demonstrative aspects.

Reference is made to FIG. 11, which schematically illustrates a radar system 1100 including a plurality of radar devices, in accordance with some demonstrative aspects. For example, radar system 1000 (FIG. 10) may include one or more elements of radar system 1100, and/or may perform one or more operations and/or functionalities of radar system 1100.

In some demonstrative aspects, radar system 1100 may include a plurality of radar devices 1110 (also referred to as "Radar Units (RUs)").

In some demonstrative aspects, the plurality of radar devices 1110 may be operated, for example, in a Short Range Radar (SRR) mode.

In other aspects, the plurality of radar devices 1110 may be operated, for example, in any other radar mode, e.g., a Medium Range Radar (MRR) mode, a Long Range Radar (LRR) mode, and/or any other mode.

In some demonstrative aspects, radar system 1100 may include a controller 1150 (also referred to as a "Radar Interference Management Controller (RIMC)"), which may be configured to control one or more, e.g., some or all, of the plurality of radar devices 1110. For example, controller 1050 (FIG. 10) may include one or more elements of RIMC 1150, and/or may perform one or more operations and/or functionalities of RIMC 1150.

In some demonstrative aspects, the controller 1150 may be implemented, for example, as part of a Domain Controller Unit (DCU), a Zone Controller Unit (ZCU), and/or an Electronic Controller Unit (ECU), for example, based on an Electrical and Electronics (E/E) Architecture of a vehicle, e.g., vehicle 900 (FIG. 9), including radar system 1100.

In some demonstrative aspects, controller 1150 may be implemented according to a centralized scheme, e.g., as a controller separate from, and/or independent from, the radar devices 1110.

In other aspects, controller 1150 may be implemented according to a distributed scheme. For example, controller 1150 may be implemented as part of a radar processor of one or more, e.g., some or all, of the plurality of radar devices 1110.

In some demonstrative aspects, radar system 1100 may include a memory 1152 associated with controller 1150.

In some demonstrative aspects, memory 1152 may be configured to store data to be processed by controller 1150, and/or data processed by controller 1150.

In some demonstrative aspects, radar system 1100 may include a system controller 1180 (also referred to as an "intelligent driving entity") configured to control driving of a vehicle. For example, system controller 1080 (FIG. 10) may include one or more elements of system controller 1180, and/or may perform one or more operations and/or functionalities of controller 1180.

In some demonstrative aspects, controller 1150 may be configured to receive one or more inputs, for example, from one or more, e.g., some or all, of the plurality of radar devices 1110, and/or from system controller 1180, e.g., as described below.

In some demonstrative aspects, controller 1150 may be configured to receive interference indications, e.g., interference information, for example, from one or more, e.g., some or all, of the plurality of radar devices 1110, e.g., as described above with reference to FIG. 10.

In some demonstrative aspects, controller 1150 may be configured to receive sensing state information, for example, from system controller 1180.

In some demonstrative aspects, controller 1150 may be configured to receive map data, e.g., high definition map data, for example, from system controller 1180.

In some demonstrative aspects, controller 1150 may be configured to receive weather data, for example, from system controller 1180.

In some demonstrative aspects, controller 1150 may be configured to receive installation information, e.g., corresponding to locations and/or orientations of the plurality of radar devices 1110, for example, from system controller 1180.

In some demonstrative aspects, controller 1150 may be configured to receive trajectory information defining a planned driving trajectory of a vehicle, e.g., vehicle 900 (FIG. 9), including the radar system 1100, for example, from system controller 1180.

In some demonstrative aspects, controller 1150 may be configured to receive status information, for example, from one or more, e.g., some or all, of the plurality of radar devices 1110, and/or from system controller 1180. For example, the status information may define a status of radar resources allocated to the plurality of radar devices 1110. For example, the status information for a radar device may include energy detections in radar resources allocated to the radar device, e.g., in the form of a 2D map of detections in terms of frequency versus time.

In some demonstrative aspects, controller 1150 may be configured to generate an interference map of interferers in an environment of the radar system 1100, for example, based on the one or more inputs.

In some demonstrative aspects, the interference map of interferers in the environment of the radar system 1100 may represent, for example, a current state of interferers in the environment of the radar system 1100.

In some demonstrative aspects, controller 1150 may be configured to generate an expected interference map of interferers in an environment of the radar system 1100, for example, based on the one or more inputs.

In some demonstrative aspects, the expected interference map of interferers in the environment of the radar system 1100 may represent, for example, an expected state of interferers in the environment of the radar system 1100.

In one example, the expected interference map may be utilized for planning and/or controlling a next frame transmission by radar devices 1110.

In some demonstrative aspects, controller 1150 may be configured to output one or more instructions, control signals, radio settings and/or parameters, and/or the like, for example, to control the plurality of radar devices 1110, e.g., as described below.

In some demonstrative aspects, the output of the controller 1150 may be configured to effect operation of the plurality of radar devices 1110, and/or an automatic driver functionally, which may be implemented, for example, as part of system controller 1180.

In some demonstrative aspects, controller 1150 may be configured to output, for example, towards one or more, e.g., some or all, of the plurality of radar devices 1110, and/or towards a scheduler 1190 of the plurality of radar devices 1110, in-band measurement instructions, e.g., for in-band interference measurements, e.g., as described below.

In some demonstrative aspects, controller 1150 may be configured to output, for example, towards one or more, e.g., some or all, of the plurality of radar devices 1110, and/or towards the scheduler 1190 of the plurality of radar devices 1110, out of band measurement instructions, e.g., for out of band interference measurements, e.g., as described below.

In some demonstrative aspects, controller 1150 may be configured to output, for example, towards one or more, e.g., some or all, of the plurality of radar devices 1110, and/or towards the scheduler 1190 of the plurality of radar devices 1110, indications of one or more Tx radio resources, e.g., suggested next Tx radio resources to be used by the radar devices 1110. For example, the one or more Tx radio resources may include, time, frequency, polarization, space, code and/or waveform parameters, e.g., modulation type, phase, slope, and/or the like.

In some demonstrative aspects, controller 1150 may be configured to output, for example, towards one or more, e.g., some or all, of the plurality of radar devices 1110, and/or towards the scheduler 1190 of the plurality of radar devices 1110, position information of an interferer, for example, in the form of position state information, e.g., including a 3D location of the interferer, an orientation of the interferer, a velocity (e.g., Doppler) of the interferer, and/or an acceleration of the interferer. In other aspects, the position information of the interferer may be provided in any other format.

In some demonstrative aspects, controller 1150 may be configured to output, for example, towards one or more, e.g., some or all, of the plurality of radar devices 1110, and/or towards the scheduler 1190 of the plurality of radar devices 1110, interferer information of one or more interferers in a field of view of a radar device 1110. For example, the interferer information may include strength and/or waveform information, and/or any other information, of the interferer.

In some demonstrative aspects, controller 1150 may be configured to output, for example, towards one or more, e.g., some or all, of the plurality of radar devices 1110, and/or towards the scheduler 1190 of the plurality of radar devices 1110, an indication of a spoofing attempt. For example, the indication of the spoofing attempt may include max Rx gain limits, and/or any other information.

In some demonstrative aspects, controller 1150 may be configured to output, for example, towards the system controller 1180, estimations on one or more aggressors and/or interferers, which may be super imposed on the sensing state information.

In some demonstrative aspects, controller 1150 may be configured to output, for example, towards the system controller 1180, an expected RU degradation per unit of one or more, e.g., some or all, of the plurality of radar devices 1110. For example, the expected RU degradation may be related to detected interference from one or more interferers, one or more weather conditions, and/or any other source of RU degradation.

In some demonstrative aspects, controller 1150 may be configured to output, for example, towards the system controller 1180, one or more recommendations, for example, on preferred radar modes for a radar device 1110. For example, a recommendation for a radar device 1110 may include a recommendation on an operation mode of the radar device. In one example, the recommendation may include a recommendation to operate the radar device at a medium range detection mode, e.g., instead of a long range detection mode. Such a recommendation may imply, for example, on a maximal speed limitation.

In some demonstrative aspects, controller 1150 may be configured to output, for example, towards the system controller 1180, an indication of a spoofing attempt.

In some demonstrative aspects, radar system 1100 may be configured to perform one or more interference mitigation operations, for example, to mitigate interference in an environment of the radar system 1100.

In some demonstrative aspects, the one or more interference mitigation operations may include, for example, listening to one or more interferences and/or mapping the one or more interferences and/or interferers.

In some demonstrative aspects, the one or more interference mitigation operations may include collecting statistics with respect to the one or more interferences, e.g., in the form of energy detections of the one or more interferences in a 2D map of frequency versus time, or any other form.

In some demonstrative aspects, the one or more interference mitigation operations may be based on processing external information, form one or more higher AV levels, e.g., information representing expected hazards from other communications in the vehicle, and/or or any other information. In one example, the one or more interference mitigation operations may include, and/or may be based on, one or more adaptive filtering mechanisms, and/or any other interference mitigation mechanism.

In some demonstrative aspects, the one or more interference mitigation operations may include tracking of one or more aggressors, e.g., as described below.

In some demonstrative aspects, the one or more interference mitigation operations may include providing side information, e.g., information on radar regulation, radar standards and/or the like, to the plurality of radar devices 1110, e.g., as described below.

In some demonstrative aspects, the one or more interference mitigation operations may include processing information from an Intelligent Driving Function (I/F), e.g., as described below.

In some demonstrative aspects, the one or more interference mitigation operations may include controlling the plurality of radar devices 1110.

In some demonstrative aspects, memory 1152 may be configured to store state information of a current state of radar system 1100. For example, the state information may include, or may be based on, statistical information with respect to one or more interferers, side information, and/or any other information.

In some demonstrative aspects, controller 1150 may be configured to manage and/or maintain the current state of the environment, to manage and/or maintain interfaces to the plurality of radar devices 1110, to plan next activities and/or operations, to track execution of operations and/or instructions, and/or to react to asynchronous events and/or alerts, e.g., as described below.

In some demonstrative aspects, controller 1150 may be configured to manage inputs/outputs between the system controller 1180 and the plurality of radar devices 1110.

In some demonstrative aspects, controller 1150 may be configured to listen and/or to map interferences in the environment of radar system 1100, e.g., as described below.

In one example, an automotive radar band may span over a relatively large frequency band, e.g., a frequency band from 76 GHz up to 81 GHz, or any other frequency band. Analyzing such a large band may require long time.

In some demonstrative aspects, controller 1150 may be configured to detect and/or to map interferences, for example, according to in-band interference detections and/or out of band interference detections, e.g., as described below.

In some demonstrative aspects, a radar device 1110 may perform in-band interference detection, for example, by measuring interference through transmission and reception of a radar frame. For example, the radar device 1110 may measure the interference, for example, utilizing a noise floor level inspection, e.g., relative to other bins or a reference level, by point cloud analysis, or by any other method.

In some demonstrative aspects, a radar device 1110 may measure interference before transmission, for example, as part of the in-band interference detection, for example, as this listening stage may be regarded as an integral part of the radar frame and may use a same frequency allocation.

In some demonstrative aspects, the out of band interference detection may be performed by an out-of-band interference measurement, in which a radar device 1110 may "open" its receiver and listen to the environment, for example, in a certain band for a period of time.

In one example, the out-of-band interference measurement may be implemented by a match filter processing method, for example, if aggressors are known or have been estimated. Additionally or alternatively, the out-of-band interference measurement may be implemented by processing received inputs in time-Frequency windows, and/or any other mechanism. For example, the match filter processing method may be suitable, for example, to detect strong and/or medium interferers.

In some demonstrative aspects, controller 1150 may be configured to allocate communication resources, e.g., frequency bands, and/or schedule out-of-band interference measurements, for the radar devices 1110.

In some demonstrative aspects, controller 1150 may be configured to instruct one or more radar devices 1110 to perform out-of-band interference measurement, e.g., using out of band listening frames, for example, in gaps between in-band interference measurements.

In one example, this implementation may provide a technical solution to gain a major efficiency, e.g., compared to an efficiency of single radar measurement. For example, assuming four radar devices 1110 installed on a vehicle, performing out-of-band interference measurement in different frequencies may provide environment sensing, which may be even four times than a coverage of environment sensing by a single radar measurement.

In some demonstrative aspects, controller 1150 may be configured to track aggressors in the environment of radar system 1100, e.g., in its vicinity, for example, using out-of-band interference measurements.

In some demonstrative aspects, controller 1150 may be configured to instruct the plurality of radar devices 1110 to transmit radar signals in a specific frequency band, e.g., a most clean frequency band, for example, based on the aggressors in the environment.

In some demonstrative aspects, controller 1150 may be configured to allocate one or more out-of-band measurement resources to one or more radar devices 1110, for example, based on its knowledge of the environment, aggressors in the environment, and/or installation positions and orientations of the plurality of radar devices 1110.

In some demonstrative aspects, controller 1150 may be configured to allocate, e.g., efficiently allocate, one or more out-of-band measurement resources to the one or more radar devices 1110, for example, to increase reception of aggressors signals.

Figure 12:
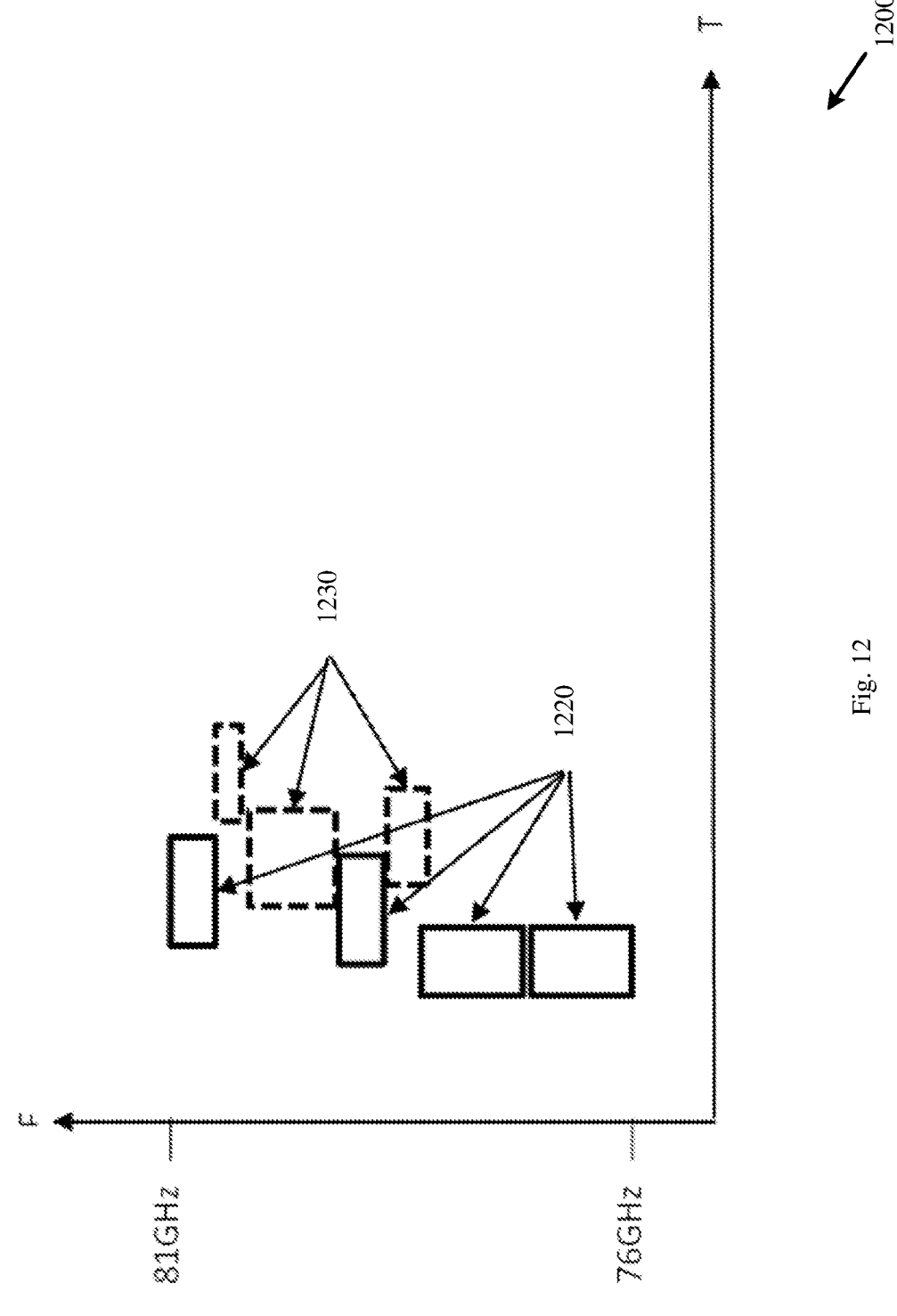
FIG. 12 is a schematic illustration of an allocation scheme to allocate a plurality of in-band interference measurements and a plurality of out of band interference measurements to a plurality of radar devices of a radar system, in accordance with some demonstrative aspects.

Reference is made to FIG. 12, which schematically illustrates an allocation scheme 1200 to allocate a plurality of in-band interference measurements 1220 and a plurality of out of band interference measurements 1230 to a plurality of radar devices of a radar system, in accordance with some demonstrative aspects.

In some demonstrative aspects, a controller, e.g., controller 1150 (FIG. 11), may allocate the plurality of in-band interference measurements 1220 and/or the plurality of out of band interference measurements 1230, for example, for the plurality of radar devices 1110 (FIG. 11) of radar system 1100 (FIG. 11).

In one example, allocation scheme 1200 may allocate the plurality of out of band interference measurements 1230, for example, even without tracking one or more interferers in an environment of the radar system.

In some demonstrative aspects, a controller, e.g., controller 1150 (FIG. 11) may assign one or more attributes, e.g., a waveform, a modulation type, and/or any other attribute and/or resource, to be used for in-band interference measurements 1220, e.g., for each of, or for some of, the in-band interference measurements 1220. For example, some modulation types may be more suitable for different environments, e.g., for a dense environment. For example, the controller may assign the modulation type to the radar devices, for example, in an implementation utilizing radar devices, e.g., SW based radars, which may be capable of operating several different modulation types.

In some demonstrative aspects, a controller, e.g., controller 1150 (FIG. 11), may assign one or more radar parameters for an in-band interference measurement 1220, e.g., for each of, or for some of, the in-band interference measurements 1220. For example, the one or more radar parameters may include Tx-related parameters for transmission of radar signals, e.g., Tx power or the like. For example, the Tx related parameters may support a technical solution to implement advances protocols configured to minimize a collateral interference of radars to other vehicles. For example, Tx power may be reduced to avoid blocking other cars. For example, a high Tx power may not be needed, for example, when the environment is dense. In another example, the one or more radar parameters may include Rx-related parameters for processing of Rx radar signals.

Reference is made to FIG. 13, which schematically illustrates a tracking scheme 1300 to track a plurality of interferers in an environment of a radar system 1301 in a vehicle 1309, in in accordance with some demonstrative aspects.

In some demonstrative aspects, a controller, e.g., controller 1150 (FIG. 11), may track the plurality of interferers by a respective plurality of radar devices of the radar system 1301 in the vehicle 1309, for example, using a plurality of out of band interference measurements.

For example, the controller, e.g., controller 1150 (FIG. 11), may track a first vehicle 1312 by a first radar device of the radar system 1301 in vehicle 1309, for example using out of band interference measurements 1334. For example, the controller, e.g., controller 1150 (FIG. 11), may track a second vehicle 1314 by a second radar device of the radar system 1301 in vehicle 1309, for example, using out of band interference measurements 1332.

In one example, a sensing state of the radar system 1301 may be determined, for example, according to radar only perception or according to a sensor fusion scheme. Therefore, one or more specific radar frames for out of band interference measurements may be generated, for example, to improve sensing state quality.

In some demonstrative aspects, a controller, e.g., controller 1150 (FIG. 11), may consider one or more weather conditions, for example, in planning and/or execution of tracking scheme 1300.

Referring back to FIG. 11, in some demonstrative aspects, controller 1150 may be configured to track interference from one or more other vehicles, for example, based on sensing state information corresponding to the state of the environment of the radar system 1100, e.g., as described below.

In one example, the sensing state information may include a perceived environment model, which may include, for example, a road topology, occupancy information, one or more classified objects with their position, orientation and/or velocity of objects in 3D, semantic information, allowed driving trajectories, and/or the like.

In some demonstrative aspects, controller 1150 may track interference from one or more other vehicles, for example, based on sensing state information from the plurality of radar devices 11101, and/or based on fusion of the sensing state information from the plurality of radar devices 1110.

In some demonstrative aspects, controller 1150 may be configured to track interference from the one or more other vehicles, for example, in a way which may be similar to assigning bounding boxes to road agents, with added features such as radar information of radar units 1110 and their activity, and/or an estimated frame structure of the radar units 1110, e.g., within each road agent.

In some demonstrative aspects, this radar information may be used to enhance and/or improve tracking and/or listening to one or more interferers. For example, 1150 may track and/or listen to the one or more interferers more accurately, for example, based on the radar information collected from the radar units 1110.

In some demonstrative aspects, the radar information collected by controller 1150 may be used to assist the plurality of radar devices 1110 in mitigation in an accurate manner, e.g., to mitigate a specific interference from an interferer.

In some demonstrative aspects, controller 1150 may be configured to track interference form the one or more other vehicles, for example, based on a Kalman filter, a Particles' Filter, Probability Hypothesis Density (PHD) based filter, Maximum Likelihood (ML) artificial intelligence (AI) based method, and/or any other filter, which may be used for sensing state information, detection and/or tracking.

In some demonstrative aspects, controller 1150 may be configured to track the one or more interferers, for example, based on side information, e.g., as described below.

In some demonstrative aspects, controller 1150 may be configured to utilize the side information to identify a type of a radar device of an interferer.

In one example, the type of the radar device of the interferer may be identified, for example, based on messages from the radar device of the interferer, e.g., vehicle to vehicle (V2V) messages, vehicle to everything (V2X) messages, and/or any other messages from the radar device of the interferer.

In another example, the type of the radar device of the interferer may be identified, for example, based on integrated radar and communications within the vehicle, a vehicle vendor, and/or the like.

In some demonstrative aspects, controller 1150 may be configured to utilize the side information to identify a subset of the radio resources and/or one or more scheduling patterns, which may be utilized by one or more interferers. For example, the subset of the radio resources and/or one or more scheduling patterns may be defined according to an industry wide agreement or a standard, e.g., according to a compass method.

In some demonstrative aspects, the side information may be configured to provide a vendor convention, a frame type, a behavior of the radar device, and/or an priory knowledge.

In some demonstrative aspects, controller 1150 may be configured to utilize the side information to identify any other side information with respect to an aggressor frame structure, a scheduling scheme, and/or a waveform attributes.

In some demonstrative aspects, the side information may include, for example, a map of the environment, semantic information such as regulatory information and/or standards, and/or information with respect to trajectories of one or more road agents.

In some demonstrative aspects, the side information may include, for example, map information with respect to blockers and/or infrastructure radars.

In some demonstrative aspects, the side information may include, for example, regulatory and standard rules, and/or dynamic related environmental information.

In some demonstrative aspects, the side information may include any other additional and/or alternative information.

In some demonstrative aspects, controller 1150 may be configured to provide the side information, and/or information based on the side information, to the plurality of radar devices 1110.

In some demonstrative aspects, controller 1150 may provide the side information to the plurality of radar devices 1110, for example, in a manner, which may be configured to improve and/or enhance operations of the plurality of radar devices 1110, e.g., as described below.

In one example, controller 1150 may provide the side information to the plurality of radar devices 1110, for example, in a manner, which may be configured to improve receive operation of the plurality of radar devices 1110, for example, in an environment including one or more interferers.

In another example, controller 1150 may provide the side information to the plurality of radar devices 1110, for example, in a manner, which may be configured to help "cognitive" operation of the plurality of radar devices 1110.

In another example, controller 1150 may provide the side information to the plurality of radar devices 1110, for example, in a manner, which may be configured to assist the radar devices 1110 in scheduling operations, and/or configuring Tx frames and/or waveform parameters.

In some demonstrative aspects, controller 1150 may provide to a radar device 1110, e.g., radar device 1002 (FIG. 10), interference-based information, e.g., interference-based information 1026 (FIG. 10), which may include, for example, instructions with respect to the one or more radar parameters to configure radar operations by the radar device. For example, controller 1150 may provide to the radar device 1110 interference-based information, which may include, for example, instructions with respect to Tx parameters to configure radar transmissions of the radar device 1110, and/or to configure radio resources of communications to be performed by the radar device 1110. For example, controller 1150 may provide to the radar device 1110 interference-based information, which may include, for example, instructions with respect to Rx parameters to configure radar processing of the radar device 1110 with respect to Rx signals received by the radar device 1110.

In some demonstrative aspects, a radar device 1110, e.g., radar device 1002 (FIG. 10), may configure and/or build a next radar frame to be transmitted, for example, according to the instructions from the controller 1150. For example, controller 1150 may be configured to manage radar device 1110, and/or may be implemented as part of an RU management function to manage radar device 1110.

In some demonstrative aspects, the interference-based information may include an expected SNR level, and/or specific interference source estimated parameters, e.g., a strength, a position in space, a velocity, waveform and/or Tx parameters, radio resources utilization, e.g., time, frequency, polarization, and/or the like. For example, the interference-based information for a RU 1110 may be relevant to its next frame/s.

In one example, radar device 1110 may tune its statistics assigned to expected aggressors, for example, based the interference-based information from controller 1150.

In some demonstrative aspects, controller 1150 may instruct the plurality of radar devices 1110, e.g., to set one or more frame parameters of one or more next frames, for example, in a way that may minimize interference to others, and/or may maximize a Signal to Interference Noise Ratio (SINR) of one or more, e.g., some or all, of the plurality of radar devices 1110. In one example, higher SINR may be configured for "more critical" radar devices 1110.

In some demonstrative aspects, controller 1150 may instruct the plurality of radar devices 1110 to set the one or more frame parameters of one or more next frames, for example, based on the planned trajectory of the vehicle, sensing state of other road users, a topology of the environment, and/or any kind of higher level agreement or standard between the ego vehicle and other road agents, and/or any other information.

In some demonstrative aspects, controller 1150 may be configured to instruct the plurality of radar devices 1110 to change and/or set one or more Tx/Rx parameters to be utilized for radar communication and/or radar processing, e.g., as described below.

In one example, controller 1150 may instruct the plurality of radar devices 1110 to reduce the Tx power for transmissions of radar signals, for example, when there are one or more blockers and/or reflectors in a near vicinity to the vehicle, e.g., walls, metal fence, cars, trucks, and/or the like.

In another example, controller 1150 may instruct front radar devices, e.g., radar device 902 (FIG. 9), to reduce the Tx power for transmissions of radar signals in one or more scenarios, for example, while a vehicle including radar system 1100 is standing in front of a pedestrian crossing.

In another example, controller 1150 may instruct the plurality of radar devices 1110 to reduce the Tx power for transmissions of radar signals, for example, when a vehicle including radar system 1100 is driving in a slow traveling velocity during a traffic jam, and/or when standing in line waiting for a green light.

In some demonstrative aspects, controller 1150 may be configured to provide first radar communication resources to a first radar device 1110, and/or second radar communication resources to a second radar device 1110, which are different from the first radar communication resources.

In one example, controller 1150 may be configured provide a front center radar device, e.g., radar device 902 (FIG. 9), for example, a best frequency/time slot, e.g., in terms of SINR, and/or radio resources.

In another example, controller 1150 may be configured provide priority, e.g., in terms of radio resources and/or expected SINR, to a left-front radar device and/or a left-rear radar device, e.g., radar devices 914 and/or 918 (FIG. 9), for example, before a vehicle including radar system 1100 changes a lane to the left.

In some demonstrative aspects, controller 1150 may be configured to instruct an RU 1110 to tune statistics and/or compute only a subset of point cloud information, for example, according to one or more conditions, e.g., weather conditions, and/or SINR conditions.

In some demonstrative aspects, a radar device 1110 may be configured to determine Tx/Rx parameters independently, for example, based on interference-based information from controller 1150. For example, the interference-based information from controller 1150 may include assistance information to assist the radar device 1110 in interference mitigation.

In some demonstrative aspects, radar device 1110 may be configured to receive an interference map from controller 1150, and to determine Tx and Rx parameters to be utilized by the radar device 1110, for example, based on the interference map from controller 1150.

In some demonstrative aspects, radar device 1110 may be configured to receive from controller 1150 information, e.g., limited information, with respect to a current scenario, and/or to estimate the current scenario independently, for example, based on analysis of received frames of the radar device 1110. For example, radar device 1110 may detect a scenario of waiting for a green light or a traffic jam, for example, based on its own perception and/or side information, e.g., weather condition, a map of the environment, and/or the like.

In some demonstrative aspects, controller 1150 may receive from system controller 1180, e.g., via an input 1154, Geographic (Geo) map data, which may be used by controller 1150, for example, for assessment of blockers and/or occlusions, road topology assessment, and/or the like.

In some demonstrative aspects, controller 1150 may receive from system controller 1180, e.g., via input 1154, weather information, which may be used by controller 1150, for example, to calculate and/or determine propagation coefficients, rain reflections, and/or the like.

In some demonstrative aspects, controller 1150 may receive from system controller 1180, e.g., via input 1154, sensing state information, which may be used by controller 1150, for example, to determine an environmental perception, e.g., object positions, object orientations, object velocities, and/or the like.

In some demonstrative aspects, controller 1150 may receive from system controller 1180, e.g., via input 1154, information on a planned maneuverer, which may be used by controller 1150, for example, to track interferers.

In some demonstrative aspects, controller 1150 may receive from system controller 1180, e.g., via input 1154, priorities of radar devices 1110, and/or sensing instructions of radar devices 1110.

In some demonstrative aspects, controller 1150 may receive from system controller 1180, e.g., via input 1154, indications of a spoofing hazard.

In some demonstrative aspects, controller 1150 may receive from system controller 1180, e.g., via input 1154, one or more configuration parameters of a configuration of radar system 1100.

In one example, the one or more configuration parameters of the configuration of radar system 1100 may include, or may be in the form of, system signals, configuration and data, e.g., a time tick, power consumption, and/or an indication of a thermal load related configuration, e.g., number of RUs that can work simultaneously in a zone or in the entire vehicle.

In some demonstrative aspects, controller 1150 may be configured to control one or more parameters, resources, and/or settings of one or more, e.g., some or all, of the plurality of radar devices 1110.

In some demonstrative aspects, controller 1150 may be configured to control a radar device 1110, for example, based on a level of independence of the radar device 1110.

In one example, controller 1150 may be configured to provide to a radar device 1110 a full set of parameters to configure one or more next frames to be communicated and/or processed by the radar device 1110, e.g., including Tx and/or Rx parameters, scheduling and/or waveform parameters, for example, when these parameters of the radar may be controlled by controller 1150.

In one example, controller 1150 may be configured to provide to the radar device 1110*a* sub-set of the parameters of the one or more next frames to be communicated and/or processed by the radar device 1110, for example, when the radar device is controlled in a less-tight manner by controller 1150.

In some demonstrative aspects, controller 1150 may be configured to provide to a radar device 1110 information of one or more radio resources to be utilized by the radio device 1110 for a next radar frame.

In some demonstrative aspects, the one or more radio resources may include one or more time parameters, e.g., when to transmit a next frame, a frame duration, a fine resolution time offset, and/or the like.

In some demonstrative aspects, the one or more radio resources may include one or more frequency parameters, e.g., a starting frequency, a bandwidth, and/or the like.

In some demonstrative aspects, the one or more radio resources may include a chirp duration. For example, the chirp duration in FMCW may impact a slope, which may be relevant for an interference impact.

In some demonstrative aspects, the one or more radio resources may include a radar mode of operation, e.g., LRR, MRR, SRR or any other mode of operation.

In some demonstrative aspects, the one or more radio resources may include a polarization mode for the next frames.

In some demonstrative aspects, the one or more radio resources may include a code type, e.g., a fast code or a slow code.

In some demonstrative aspects, the one or more radio resources may include a Tx beam space matrix, a Tx Beamforming (BF) setting, and/or the like.

In some demonstrative aspects, controller 1150 may be configured to provide to a radar device 1110 information of one or more frame and/or waveform parameters to be utilized by the radio device 1110 for a next radar frame.

In some demonstrative aspects, the frame and/or waveform parameters may include a waveform configuration in a pulse, e.g., a modulation specification, and/or the like.

In some demonstrative aspects, the frame and/or waveform parameters may include a frame configuration, e.g., a number of pulses, a duration of the pulses, and/or the like.

In some demonstrative aspects, controller 1150 may be configured to provide to a radar device 1110 information of one or more processing parameters for processing radar data of the radar device 1110.

In some demonstrative aspects, the one or more processing parameters may include a range of a 4D point cloud, a mitigation level to mitigate an interferer, a trading rate with compute, and/or any other processing parameters.

In some demonstrative aspects, In some demonstrative aspects, controller 1150 may be configured to provide to a radar device 1110 information of any other additional and/or alternative parameters.

In some demonstrative aspects, system 1100 may include four radar zones, e.g., a front zone, a rear zone, a left zone and/or a right zone. In a zone, e.g., in each zone, a subset of the plurality of radar devices 1110 may collaborate to coordinate their sensing activity and/or to share information with respect to one or more interferers and/or interferences.

According to one example, there may be different types and/or different levels of importance assigned to, or temporality assigned to, the plurality of radar devices 1110. For example, a front side of a vehicle may be equipped with a high-end forward-facing (e.g., "central-front") radar unit, e.g., radar device 902 (FIG. 9); and/or front corners of the vehicle may be equipped with smaller unites, radar device 912 and/or 914 (FIG. 9). For example, one or more parameters and/or attributes may be different for sensing and perception at the front side of the vehicle, for example, compared to the front corners of the vehicle.

In one example, a forward-facing radar unit may likely get priority over the corner radar units, for example, in a high-way scenario, e.g., at a high driving speed.

In another example, a rear radar unit, e.g., radar device 904 (FIG. 9), may form an independent sensing unit.

In another example, rear-corner radar units and/or front-corner radar units may collaborate, for example, with respect to a same side of the vehicle, for example, in a dense urban environment, e.g., where pedestrians and cyclists may travel near a side of the vehicle.

Figure 14:
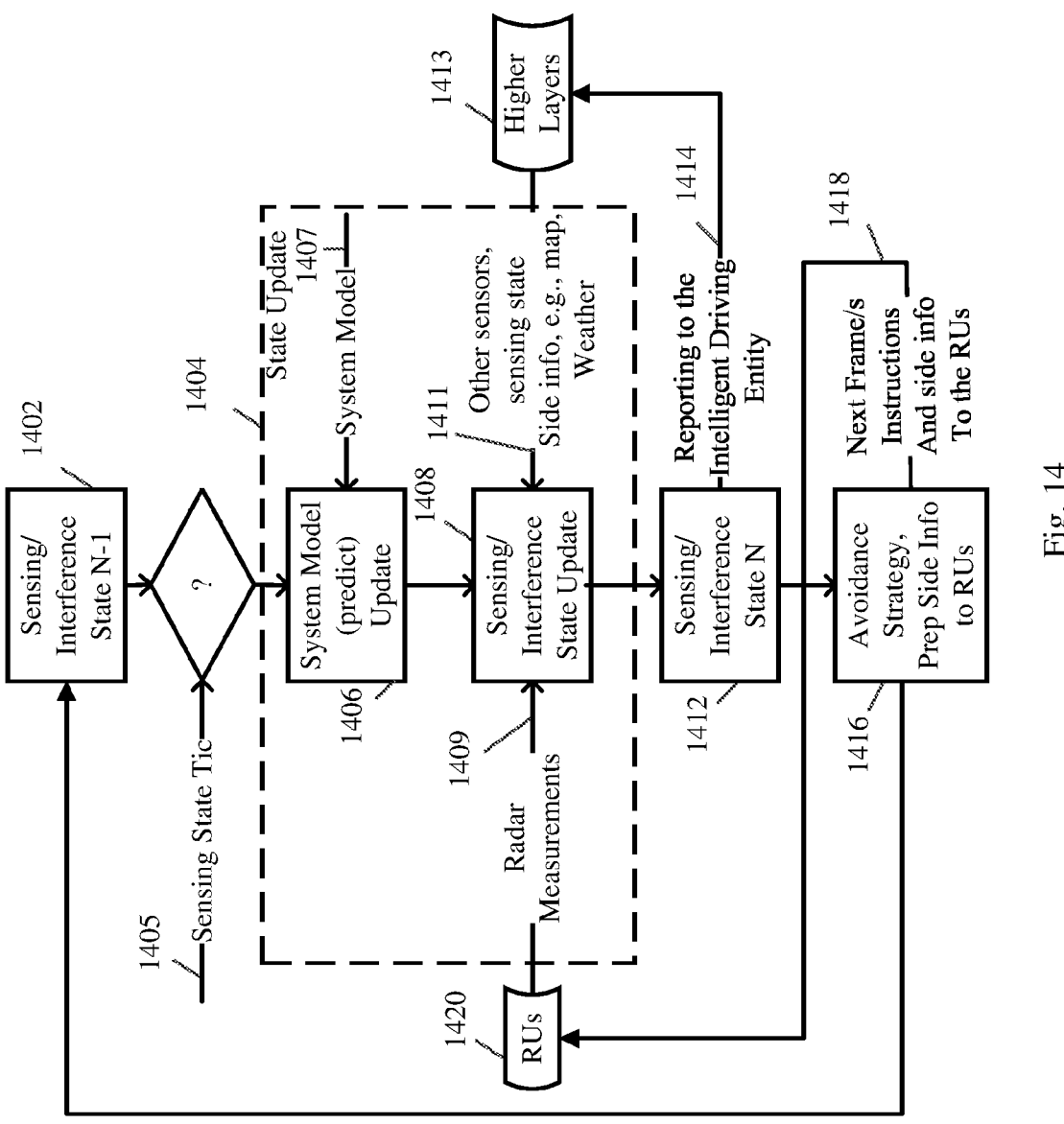
FIG. 14 is a schematic flow-chart illustration of a method of mitigating interference in an environment of a radar system, in accordance with some demonstrative aspects.

Reference is made to FIG. 14, which schematically illustrates a method of mitigating interference in an environment of a radar system, in accordance with some demonstrative aspects. For example, one or more of the operations of the method of FIG. 14 may be performed by a controller, e.g., controller 950 (FIG. 9), controller 1050 (FIG. 10), and/or controller 1150 (FIG. 11).

In some demonstrative aspects, as indicated at block 1402, the method may include determining an initial interference map of the environment of the radar system. For example, controller 1050 (FIG. 10) may determine the initial interference map of the environment of the radar system 1000 (FIG. 10).

In one example, controller 1050 (FIG. 10) may determine the initial interference map based on sensing state information. For example, the sensing state information may be based on radar information only, or on a fusion of several multimodality inputs. For example, the interference map may be an interference layer, which may be added on top of an AV sensing state of a vehicle including the radar system 1000 (FIG. 10).

In some demonstrative aspects, as indicated at block 1404, the method may include updating the interference map, for example, based on a sensing state tic 1405 of the radar system.

In some demonstrative aspects, as indicated at block 1406 updating the interference map may include determining an expected interference map, for example, based on a system model 1407 of the radar system. For example, controller 1050 (FIG. 10) may determine the expected interference map of the one or more expected interferers to be mitigated by radar device 1002 (FIG. 10).

In some demonstrative aspects, as indicated at block 1408 updating the interference map may include updating the expected interference map, for example, based on radar measurements 1409 from a plurality of radar devices 1420 of the radar system, and/or based on side information 1411, e.g., from a system controller 1413 and/or any other devices and/or sensors of the radar system. For example, controller 1050 (FIG. 10) may update the expected interference map of the one or more expected interferers to be mitigated by radar device 1002 (FIG. 10), based on the radar measurements 1409, and/or based on the side information 1411.

In one example, updating the expected interference map may be based on one or more radar measurements 1409, e.g., including in-band and/or out of band interference measurements, which may be used to update the interference map.

In some demonstrative aspects, as indicated at block 1412, the method may include determining a current interference map of the environment of the radar system, for example, based on an updated expected interference map. For example, controller 1050 (FIG. 10) may determine the current interference map of the environment of the radar system 1000 (FIG. 10), for example, based on the update to the expected interference map.

In some demonstrative aspects, as indicated by arrow 1414, the method may include reporting the current interference map to the system controller 1413. For example, controller 1050 (FIG. 10) may report the current interference map to the system controller 1080 (FIG. 10).

In some demonstrative aspects, as indicated at block 1416, the method may include determining one or more operations and/or a strategy to mitigate one or more interferers, for example, based on the current interference map. For example, controller 1050 (FIG. 10) may generate the interference-based information 1026 (FIG. 10) including one or more operations and/or a strategy to mitigate one or more interferers, for example, by the radar device 1002 (FIG. 10).

In some demonstrative aspects, as indicated by arrow 1418, the method may include providing instructions and/or side information to the plurality of radar devices 1420. For example, controller 1050 (FIG. 10) may provide the interference-based information 1026 (FIG. 10) including one or more operations and/or a strategy to mitigate one or more interferers, for example, by the radar device 1002 (FIG. 10).

In one example, controller 1050 (FIG. 10) may determine and/or build an avoidance strategy for different radar devices 1110 (FIG. 11), and/or may schedule a next frame or a sequence of frames for radar devices 1110 (FIG. 11). For example, controller 1050 (FIG. 10) may provide one or more interference packets for the different radar devices based on the avoidance strategy for each different radar device, and/or the schedule for the next frame.

In some demonstrative aspects, controller 1050 (FIG. 10) may perform one or more, e.g., some or all, of the operations of the method of FIG. 14. For example, controller 1050 (FIG. 10) may manage a flow of information between the radar devices, e.g., in a connected network.

In other aspects, e.g., in an implementation without an identified master, a radar device 1420, e.g., each radar device 1420, may communicate with one or more neighbor radar devices, and may receive from the one or more neighbor radar devices, their measurement results and/or intended transmission configuration and parameters, e.g., representing their current interference map and/or their avoidance strategy. According to these aspects, a radar device, e.g., each radar device, may perform one or more, e.g., some or all, of the operations of the method of FIG. 14, e.g., independently.

Reference is made to FIG. 15, which schematically illustrates a method of mitigating interference in an environment of a radar system according to a collaborative interference mitigation scheme, in accordance with some demonstrative aspects. For example, one or more of the operations of the method of FIG. 15 may be performed by a radar system, e.g., radar system 900 (FIG. 9), radar system 1000 (FIG. 10), and/or radar system 1100 (FIG. 11); a radar device, e.g., radar device 101 (FIG. 1), radar device 800 (FIG. 8), radar device 910 (FIG. 9), radar devices 1002, 1004, and/or 1006 (FIG. 10), radar devices 1110 (FIG. 11); a processor, e.g., processor 1030 (FIG. 10), baseband processor 930 (FIG. 9); and/or a controller, e.g., controller 950 (FIG. 9), controller 1050 (FIG. 10), and/or controller 1150 (FIG. 11).

As indicated at block 1502, the method may include mitigating interference in an environment of a radar system according to a collaborative interference mitigation scheme. For example, the plurality of radar devices of radar system 1000 (FIG. 10) may be configured to mitigate interference in an environment of the radar system 1000 (FIG. 10) according to the collaborative interference mitigation scheme, e.g., as described above.

As indicated at block 1504, mitigating the interference according to a collaborative interference mitigation scheme may include receiving at a communication interface of a first radar device of the plurality of radar devices first interference-based information based on interference detected by at least one second radar device of the plurality of radar devices. For example, communication interface 1024 (FIG. 10) of radar device 1002 (FIG. 10) may receive first interference-based information 1026 (FIG. 10) based on interference detected by radar device 1004 (FIG. 10), e.g., as described above.

As indicated at block 1506, mitigating the interference according to a collaborative interference mitigation scheme may include controlling the first radar device to communicate radar signals of the first radar device based on the first interference-based information. For example, controller 1050 (FIG. 10) may control the radar device 1002 (FIG. 10) to communicate radar signals of the radar device 1002 (FIG. 10) based on the interference-based information 1026 (FIG. 10), e.g., as described above.

As indicated at block 1508, mitigating the interference according to a collaborative interference mitigation scheme may include causing the communication interface of the first radar device to output second interference-based information, the second interference-based information based on the radar signals of the first radar device. For example, controller 1050 (FIG. 10) may cause communication interface 1024 (FIG. 10) of radar device 1002 (FIG. 10) to output the interference-based information 1028 (FIG. 10) based on the radar signals of the radar device 1002 (FIG. 10), e.g., as described above.

Referring to FIG. 9, in some demonstrative aspects, spectrum/radio resources of radar system 901 may be limited, for example, by one or more regulatory constraints, e.g., as described below.

For example, in some geographic locations, only part of a frequency bandwidth, which is allocated for radar operations, may be available for use by some radar systems, e.g., for Long Range (LR) vehicular radar operation.

In one example, in some geographic locations, a frequency bandwidth of 5 Ghz, e.g., from 76 GHz to 81 GHz, may be generally allocated for radar communication, while a frequency bandwidth from 76 GHz to 77 GHz may be reserved, e.g., for LR operation.

In another example, in some geographic locations, a bandwidth of only 1 GHZ, e.g., from 76 GHz to 77 GHz, may be allocated for radar operations.

In some demonstrative aspects, spectrum resources of radar system 901 may be shared with radar systems of other vehicles, which may use some or all of the same spectrum resources.

In some demonstrative aspects, there may be a need to provide a technical solution to support efficient, e.g., optimal, utilization and/or reusability of the spectrum resources utilized by radar system 901 within vehicle 900, e.g., as described below.

In some demonstrative aspects, there may be a need to provide a technical solution to reduce, e.g., minimize, interference between the plurality of radar devices 910, for example, while reducing fragmentation of the spectrum resources and/or increasing spectrum reuse, e.g., as described below.

In some demonstrative aspects, for example, in some use cases, scenarios, and/or implementations, there may be one or more disadvantages, inefficiencies, and/or technical problems in an implementation configured to schedule radar frames in non-overlapping time frequency slices, for example, to increase a utilization of the spectrum resources, e.g., as described below.

In one example, a size, denoted s, of radio resources for a non-overlapping time frequency slice may be based, for example, on a bandwidth of a transmitted signal, e.g., a chirp signal, in the radar frame, e.g., as follows:

$$s = T_f \times BW$$

wherein $T_f$ denotes a frame time of the radar frame, and BW denotes the bandwidth of the transmitted signal.

According to this example, scheduling N radar devices may require utilization of N times the radio resources, e.g., $s \times N = N \times T_f \times BW$. Therefore, this implementation may result in a linear increase in the radio resources, for example, when a number of radar devices increases. Accordingly, this implementation may not be optimal, as it may not achieve optimal spectrum utilization, and/or may lead to a waste of spectrum resources, e.g., which other vehicles may not be able to use.

In some demonstrative aspects, radar system 901 may be configured to communicate radar signals according to a scheduling scheme, which may be configured to support a technical solution, for example, to reduce the spectrum resources utilized by radar system 901, e.g., as described below.

In some demonstrative aspects, radar system 901 may be configured to communicate radar signals according to a scheduling scheme, which may be configured to support a technical solution, for example, to efficiently reuse some or all of the spectrum resources of radar system 901, for example, as much as possible, e.g., as described below.

In some demonstrative aspects, radar system 901 may be configured to communicate radar signals according to a scheduling scheme, which may be configured to support a technical solution, for example, minimize interference between radar devices 910 within vehicle 900, e.g., as described below.

In some demonstrative aspects, radar system 901 may be configured to communicate radar signals according to a scheduling scheme, which may be configured to support a technical solution to control, optimize, and/or reduce, power drawn by radar system 901, e.g., in a desirable manner. For example, the scheduling scheme may be configured to provide a technical solution to reduce a peak to average power draw (PAPD) of radar system 901, e.g., as described below.

In some demonstrative aspects, radar system 901 may be configured to communicate radar signals according to a scheduling scheme, which may be based on, and/or configured to accommodate, a structure of a radar frame, e.g., as described below.

Reference is made to FIG. 16, which schematically illustrates a structure of a radar frame 1600, which may be implemented in accordance with some demonstrative aspects.

As shown in FIG. 16, radar frame 1600 may include a burst-mode radar frame including a sequence of burst transmissions 1610, which may be transmitted by a radar device, e.g., radar device 910 (FIG. 9).

In one example, a controller and/or scheduler, e.g., controller 950 (FIG. 9), controller 1050 (FIG. 10), controller 1150 (FIG. 11), and/or scheduler 1190 (FIG. 11), may be configured to control one or more radar devices, e.g., radar devices 910 (FIG. 9), to communicate radar signals according to the radar frame 1600.

In one example, radar frame 1600 may include a Short Range Radar (SRR) radar frame, which may be communicated, for example, in a SRR mode. In other aspects, the radar frame 1600 may include any other radar frame for any other mode.

In one example, the sequence of burst transmissions 1610 may be defined as a subset of pulses of radar frame 1600, e.g., which may be transmitted continuously.

In one example, a burst transmission (pulse) in the sequence of burst transmissions 1610 may include a chirp signal, a phase modulated signal, an OFDM signal, and/or any other signal.

As shown in FIG. 16, the sequence of burst transmissions 1610 may be separated by a plurality of burst gaps 1612.

In one example, there may be a burst gap 1612 between a first burst transmission 1611 and a second burst transmission 1613, which may be consecutive to the first burst transmission 1611 in the sequence of burst transmissions 1610.

As shown in FIG. 16, the burst gap 1612 may be configured to be long enough, for example, to allow to compensate a time delay for digital radar processing of the sequence of burst transmissions 1610, e.g., as described below.

In one example, a radar device, e.g., radar device 910 (FIG. 9), may include a digital radar device. The digital radar device may include a matched filter and/or a "pulse-compression" function, which may be performed digitally, e.g., after an Analog-Digital-Convert (ADC) sampling of received radar signals. In some cases, e.g., wide band transmissions, this implementation may result in a time delay (gap) between an ADC data rate and a system link, e.g., between an analog portion of the radar device and a digital portion of the radar device. For example, the time delay may from an implementation of the analog portion including the ADC and the memory buffer, e.g., using a relatively small memory buffer, while the digital portion may be implemented using a fast link and a fast-access memory, e.g., DRAM.

As shown in FIG. 16, a sparse comb-like structure of radar frame 1600 may be configured to compensate for the time delay. For example, the sparse comb-like structure of radar frame 1600 may include built-in gaps 1612, which may be configured to allow a radar device, e.g., radar device 910, to "clean up" the memory buffer in the analog portion, for example, before new data arrives.

In some demonstrative aspects, one or more burst gaps 1612 in the sequence of burst transmissions 1610 of a radar device may be utilized, for example, to schedule one or more burst-mode radar transmissions from one or more other radar devices, e.g., as described below.

Referring back to FIG. 9, in some demonstrative aspects, radar system 901 may be configured to communicate radar signals according to a scheduling scheme, which may be configured to utilize the plurality of burst gaps 1612 (FIG. 16), e.g., some or all of the burst gaps 1612 (FIG. 16), for example, to increase utilization of the spectrum resources utilized by radar system 901, e.g., as described below.

In some demonstrative aspects, radar system 901 may be configured to communicate radar signals according to a scheduling scheme, which may be configured to exploit the sparse comb-like structure of radar frame 1600 (FIG. 16), for example, to reduce the spectrum resources utilized by radar system 901 (FIG. 9), e.g., as described below.

In some demonstrative aspects, radar system 901 may be configured to communicate radar signals according to a scheduling scheme, which may be configured to utilize the burst gap 1612 (FIG. 16) of a radar device, e.g., a first radar device 910, for communication of one or more burst transmissions from one or more other radar devices, for example, one or more second radar devices 910, e.g., as described below.

In some demonstrative aspects, controller 950 may be configured to schedule radar transmissions by the plurality of radar devices 910, for example, during a sequence of radar frame periods, for example, according to a burst scheduling scheme, e.g., as described below.

For example, a radar frame period of the sequence of radar frame periods may include the radar frame 1600 (FIG. 16). In other aspects, any other radar frame period may be implemented.

In some demonstrative aspects, the burst scheduling scheme may support a technical solution, for example, to reduce the spectrum resources utilized by radar system 901, e.g., as described below.

In some demonstrative aspects, the burst scheduling scheme may support a technical solution, for example, to optimize the utilization of spectrum resources of radar system 901, e.g., as described below.

In some demonstrative aspects, the burst scheduling scheme may support a technical solution, for example, to reduce fragmentation of the spectrum resources of the plurality of radar devices 910. This technical solution may allow, for example, other vehicles to share available radar spectrums, e.g., as described below.

In some demonstrative aspects, the burst scheduling scheme may support scheduling of a plurality of burst mode radar frames from the plurality of radar devices 910, for example, in an overlapping time-frequency slot, e.g., as described below.

In some demonstrative aspects, the burst scheduling scheme may support offsetting and/or shifting timings of the plurality of burst mode radar frames by a burst width. For example, transmit times of the plurality of burst mode radar frames from the plurality of radar devices 910 may have no substantial overlap in time. This technical solution may avoid interferences between the plurality of radar devices, and/or reduce the PAPD of radar system 901, e.g., as described below.

In some demonstrative aspects, having the plurality of radar devices 910 may be on a same vehicle, e.g., vehicle 900, may allow synchronizing between the plurality of radar devices 910 in order to support the offsetting and/or shifting timings of the plurality of burst mode frames from the plurality of radar devices 910, e.g., as described below.

In some demonstrative aspects, the burst scheduling scheme may support a technical solution, which may avoid an inefficient increase, e.g., a liner increase, of usage of the spectrum resources, for example, when the number of radar devices increases, e.g., as described below. For example, the burst scheduling scheme may support a technical solution, which may maintain the spectrum use substantially constant, for example, for an increasing number of a plurality of radar devices. For example, the spectrum use may increase, when the gaps between bursts, e.g., burst gaps 1612 (FIG. 16), are exhausted, e.g., as described below.

In some demonstrative aspects, the burst scheduling scheme may support a technical solution to maintain a low PAPD of radar system 901, which may improve a power management of radar system 901, e.g., as described below.

In some demonstrative aspects, the burst scheduling scheme may be configured to schedule in a radar frame period a common transmission time for radar burst transmissions by the plurality of radar devices 910, e.g., as described below.

In some demonstrative aspects, the burst scheduling scheme may be configured to schedule during the common transmission time a first radar transmission of a first radar device including a first sequence of radar bursts, e.g., as described below.

In some demonstrative aspects, the burst scheduling scheme may be configured to schedule during the common transmission time a second radar transmission of a second radar device including a second sequence of radar bursts, e.g., as described below.

In some demonstrative aspects, a timing of radar bursts in the second sequence of radar bursts may be offset and/or shifted relative to a timing of radar bursts in the first sequence of radar bursts, e.g., as described below.

In some demonstrative aspects, the burst scheduling scheme may be configured to schedule during the common transmission time a third radar transmission of a third radar device including a third sequence of radar bursts, e.g., as described below.

In some demonstrative aspects, timing of radar bursts in the third sequence of radar bursts may be offset and/or shifted relative to the timing of radar bursts in the first sequence of radar bursts, and/or relative to the timing of radar bursts in the second sequence of radar bursts, e.g., as described below.

In one example, the burst scheduling scheme may be configured to schedule during the common transmission time a first radar transmission of radar device 912 including a first sequence of radar bursts, a second radar transmission of radar device 914 including a second sequence of radar bursts, and/or a third radar transmission of radar device 916 including a third sequence of radar bursts. According to this example, the timing of the second sequence of radar bursts of radar device 914 may be offset relative to the timing of radar bursts in the first sequence of radar bursts of radar device 912. According to this example, the timing of the radar bursts in the third sequence of radar bursts of radar device 916 may be offset and/or shifted relative to a timing of radar bursts in the second sequence of radar bursts of radar device 914, and/or relative to a timing of radar bursts in the first sequence of radar bursts.

In some demonstrative aspects, a time offset between the second sequence of radar bursts and the first sequence of radar bursts may be based on a burst duration of a radar burst in the first sequence of radar bursts, e.g., as described below.

In some demonstrative aspects, a time offset between the third sequence of radar bursts and the first sequence of radar bursts may be based on a burst duration of a radar burst in the first sequence of radar bursts, e.g., as described below.

In some demonstrative aspects, the radar burst transmissions may be configured, for example, according to a comb-like structure defining a repetitive sequence of identical radar bursts separated by a constant burst gap, e.g., as described below.

In some demonstrative aspects, a radar frame duration of the radar frame period may be more than 25 milliseconds, e.g., as described below.

In other aspects, any other radar frame duration of the radar frame period may be implemented.

In some demonstrative aspects, a common transmission duration of the common transmission time may be less than 10 milliseconds (ms), e.g., as described below.

In other aspects, any other common transmission duration of the common transmission time may be implemented.

In some demonstrative aspects, a radar burst in the first sequence of radar bursts may have a first burst duration, a radar burst in the second sequence of radar bursts may have a second burst duration, and/or a radar burst in the third sequence of radar bursts may have a third burst duration, e.g., as described below.

In some demonstrative aspects, each of the first burst duration, the second burst duration, and/or the third burst duration may be less than 1000 microseconds (us), e.g., as described below.

In other aspects, any other burst duration may be implemented.

In some demonstrative aspects, the first burst duration may be equal to the second burst duration, and/or the second burst duration may be equal to the first burst duration.

In some demonstrative aspects, any other qual or different burst durations may be implemented.

In some demonstrative aspects, a time offset between the second sequence of radar bursts and the first sequence of radar bursts may be based, for example, on a burst duration of a radar burst in the first sequence of radar bursts, e.g., as described below.

In some demonstrative aspects, consecutive radar bursts in the first sequence of radar bursts may be separated by a first burst gap, and/or consecutive radar bursts in the second sequence of radar bursts may be separated by a second burst gap, e.g., as described below.

In some demonstrative aspects, the second burst gap may be based on the first burst gap, e.g., as described below.

In other aspects, the first and second burst gaps may be unrelated and/or independent.

In some demonstrative aspects, the burst scheduling scheme may be configured to schedule the second sequence of radar bursts to be non-overlapping with the first sequence of radar bursts, e.g., as described below.

In some demonstrative aspects, the burst scheduling scheme may be configured to schedule the third sequence of radar bursts to be non-overlapping with the first and/or second sequences of radar bursts, e.g., as described below.

In some demonstrative aspects, the burst scheduling scheme may be configured to schedule non-overlapping sequences of radar bursts for two or more radar devices based, for example, on an interference between the two or more radar devices, e.g., as described below.

In one example, the burst scheduling scheme may schedule the first sequence of radar bursts for radar device 912, and/or the second sequence of radar bursts for radar device 914. According to this example, the burst scheduling scheme may be configured to schedule the second sequence of radar bursts to be non-overlapping with the first sequence of radar bursts, for example, when there is at least a predefined level of interference between radar device 912 and radar device 914.

In some demonstrative aspects, the burst scheduling scheme may be configured to schedule the first sequence of radar bursts to partially overlap the second sequence of radar bursts, e.g., as described below.

In some demonstrative aspects, the burst scheduling scheme may be configured to schedule the second sequence of radar bursts to partially overlap the third sequence of radar bursts, e.g., as described below.

In some demonstrative aspects, a burst end portion of a radar burst in the first sequence of radar bursts may overlap a burst beginning portion of a radar burst in the second sequence of radar bursts, e.g., as described below.

In some demonstrative aspects, the burst end portion of the radar burst in the first sequence of radar bursts may be after a peak of the radar burst in the first sequence of radar bursts, and/or the burst beginning portion of the radar burst in the second sequence of radar bursts may be before a peak of the radar burst in the second sequence of radar bursts, e.g., as described below.

In some demonstrative aspects, a burst end portion of a radar burst in the second sequence of radar bursts may overlap a burst beginning portion of a radar burst in the third sequence of radar bursts, e.g., as described below.

In some demonstrative aspects, the burst end portion of the radar burst in the second sequence of radar bursts may be after a peak of the radar burst in the second sequence of radar bursts, and/or the burst beginning portion of the radar burst in the third sequence of radar bursts may be before a peak of the radar burst in the third sequence of radar bursts, e.g., as described below.

In some demonstrative aspects, an overlap between radar burst transmissions may be configured, for example, based on FoVs of the plurality of radar devices, based on a criterion corresponding to interferences between the plurality of radar devices, and/or based on any other criteria. For example, an overlap between radar burst transmissions may be based on vehicle geometry, radar placements, radar orientations, interference mitigation capabilities and/or waveform attributes, which may allow the overlap in time.

In some demonstrative aspects, the burst scheduling scheme may be configured to schedule partially overlapping sequences of radar bursts for at least two radar devices having non-overlapping radar Fields of View (FoVs), e.g., as described below.

In one example, the burst scheduling scheme may schedule the first sequence of radar bursts for radar device 912, and/or the second sequence of radar bursts for radar device 914. According to this example, the burst scheduling scheme may be configured to schedule the first sequence of radar bursts to partially overlap the second sequence of radar bursts, for example, if radar device 912 and radar device 914, have non-overlapping radar FoVs.

In some demonstrative aspects, the burst scheduling scheme may be configured to schedule partially overlapping sequences of radar bursts for at least two radar devices based on an interference between the at least two radar devices, e.g., as described below.

In one example, the burst scheduling scheme may schedule the first sequence of radar bursts for radar device 912, and/or the second sequence of radar bursts to radar device 914. According to this example, the burst scheduling scheme may be configured to schedule the first sequence of radar bursts to partially overlap the second sequence of radar bursts, for example, when there is no interference, or there is a slight interference, between radar device 912 and radar device 914.

In some demonstrative aspects, the burst scheduling scheme may be configured to schedule partially overlapping sequences of radar bursts for at least two radar devices based on a criterion ("interference criterion") corresponding to an interference between the at least two radar devices, e.g., as described below.

In one example, the interference criterion may be based on a geometry of vehicle 900, positions of the two radar devices, orientations of the two radar devices, interference mitigation capabilities of the two radar devices, and/or waveform attributes, which may allow the partially overlapping sequences of radar bursts for two radar devices. In other aspects, any other interference criteria may be implemented.

In one example, the burst scheduling scheme may schedule the first sequence of radar bursts for radar device 912, and/or the second sequence of radar bursts for radar device 914. According to this example, the burst scheduling scheme may be configured to schedule the first sequence of radar bursts to partially overlap the second sequence of radar bursts, for example, when the interference criterion corresponding to the interference between radar device 912 and radar device 914 is met.

In some demonstrative aspects, controller 950 may be configured to synchronize between clocks of the plurality of radar devices 910, for example, to schedule the first sequence of radar bursts, the second sequence of radar bursts, and/or the third sequence of radar bursts, e.g., as described below.

In some demonstrative aspects, the plurality of radar devices 910 may be synchronized according to a Precision Time Protocol (PTP), and/or any other additional or alternative synchronization scheme.

Figure 17:
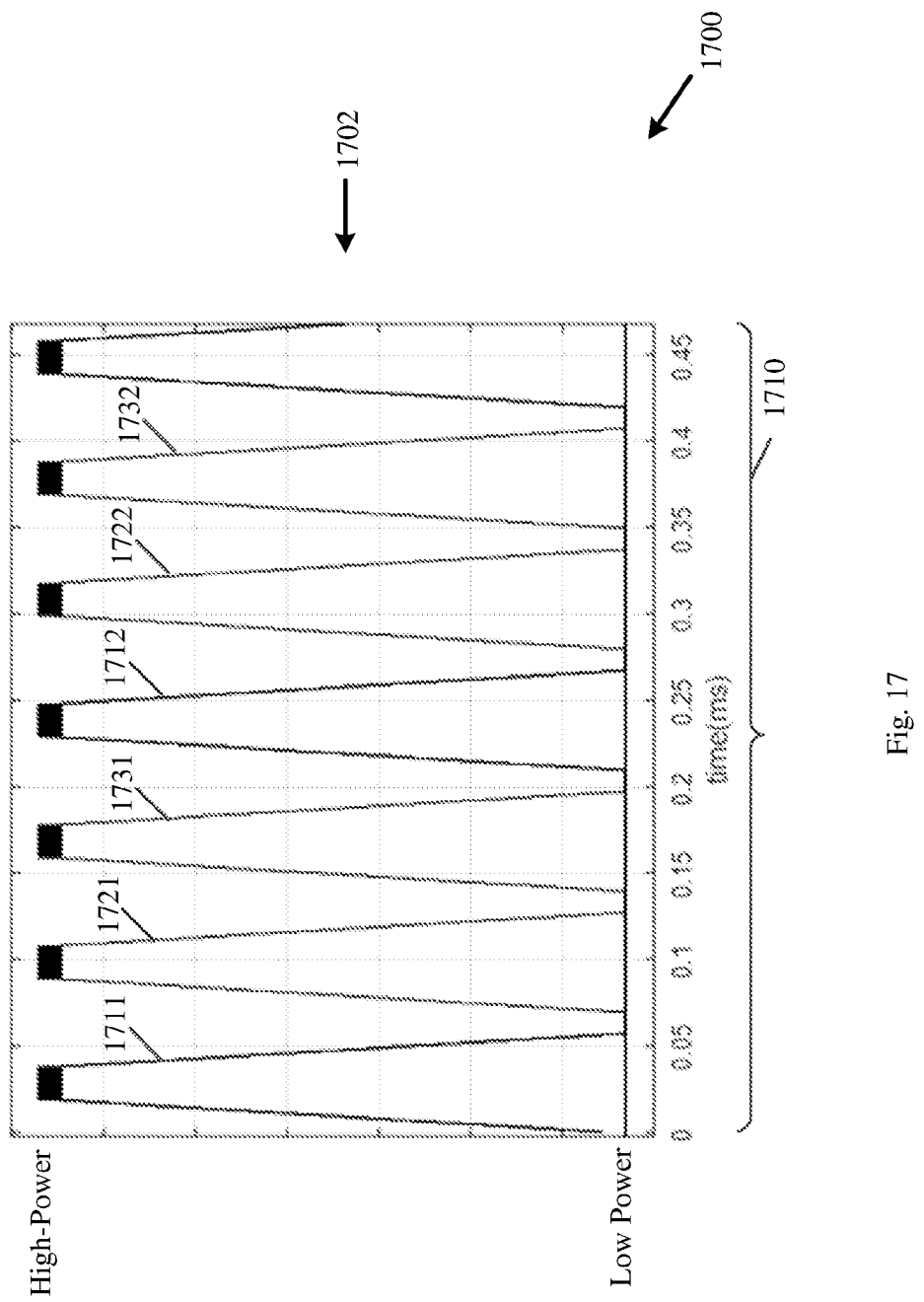
FIG. 17 is a schematic illustration of a common transmission time in a radar frame period according to a burst scheduling scheme, in accordance with some demonstrative aspects.

Reference is made to FIG. 17, which schematically illustrates a common transmission time 1710 in a radar frame period according to a burst scheduling scheme 1700, in accordance with some demonstrative aspects.

In some demonstrative aspects, common transmission time 1710 may be scheduled in a radar frame, for example, radar frame 1600 (FIG. 16).

In some demonstrative aspects, a radar frame duration of the radar frame period of radar frame 1600 (FIG. 16) may be more than 25 milliseconds, while a common transmission duration of the common transmission time 1710 (FIG. 17) may be less than 10 milliseconds.

In some demonstrative aspects, the burst scheduling scheme 1700 may be configured to schedule common transmission time 1710 for radar burst transmissions 1702 by a plurality of radar devices, e.g., as described below.

In some demonstrative aspects, a controller and/or scheduler, e.g., controller 950 (FIG. 9), controller 1050 (FIG. 10), controller 1150 (FIG. 11), and/or scheduler 1190 (FIG. 11), may be configured to schedule radar transmissions by the plurality of radar devices 910 (FIG. 9) during a sequence of radar frame periods, e.g., a sequence of radar frame periods 1600 (FIG. 16), according to burst scheduling scheme 1700, which may schedule transmissions during common transmission time 1710, e.g., as described below.

In some demonstrative aspects, as shown in FIG. 17, burst scheduling scheme 1700 may schedule during the common transmission time 1710 a first radar transmission of a first radar device, e.g., radar device 912 (FIG. 9), including a first sequence of radar bursts, for example, including a radar burst 1711 and a radar burst 1712.

In some demonstrative aspects, as shown in FIG. 17, burst scheduling scheme 1700 may schedule during the common transmission time 1710 a second radar transmission of a second radar device, e.g., radar device 914 (FIG. 9), including a second sequence of radar bursts, for example, including a radar burst 1721 and a radar burst 1722.

In some demonstrative aspects, as shown in FIG. 17, burst scheduling scheme 1700 may schedule during the common transmission time 1710 a third radar transmission of a third radar device, e.g., radar device 916 (FIG. 9), including a third sequence of radar bursts, for example, including a radar burst 1731 and a radar burst 1732.

In some demonstrative aspects, radar bursts in the first sequence of radar bursts, e.g., radar bursts 1711 and 1712, may be separated by a first burst gap, e.g., about 0.15 ms.

In some demonstrative aspects, radar bursts in the second sequence of radar bursts, e.g., radar bursts 1721 and 1722, may be separated by a second burst gap, e.g., about 0.15 ms.

In some demonstrative aspects, radar bursts in the third sequence of radar bursts, e.g., radar bursts 1731 and 1732, may be separated by a third burst gap, e.g., about 0.15 ms.

In some demonstrative aspects, a time offset between the second sequence of radar bursts and the first sequence of radar bursts, e.g., a time offset between radar burst 1711 and radar burst 1721, may be based, for example, on a burst duration of a radar burst in the first sequence of radar bursts, e.g., the burst duration of radar burst 1711, as described below.

In some demonstrative aspects, as shown in FIG. 17, a burst duration of a radar burst of burst transmissions 1702, e.g., radar burst 1711, radar burst 1721, radar burst 1731, radar burst 1712, radar burst 1722, and/or radar burst 1732, may be less than 1000 us. In other aspects, any other burst duration may be implemented.

In some demonstrative aspects, as shown in FIG. 17, the burst scheduling scheme 1700 may support a technical solution to allow increasing a number of transmissions from different radar devices in a radar frame, for example, even without increasing the spectrum resources.

In some demonstrative aspects, as shown in FIG. 17, the burst scheduling scheme 1700 may schedule the third sequence of radar bursts, the second sequence of radar bursts, and/or the first sequence of radar bursts during non-overlapping periods.

In some demonstrative aspects, as shown in FIG. 17, the burst scheduling scheme 1700 may schedule radar transmissions of three radar devices, e.g., radar devices 912, 914 and/or 916 (FIG. 9), during the common transmission time 1710.

In other aspects, the burst scheduling scheme 1700 may schedule radar transmissions of any other number of radar devices during the common transmission time 1710.

In some demonstrative aspects, a count of the plurality of radar devices scheduled for transmission during the common transmission time 1710 may be based, for example, on a burst duration of a radar burst transmission 1702, and/or a duration of a burst gap between burst in a burst sequence, e.g., the burst gap 1612 (FIG. 16).

In some demonstrative aspects, the count of the plurality of radar devices scheduled for transmission during the common transmission time 1710 may be based, for example, on alignment of a timing between the plurality of radar devices, and/or an overlap level allowed between radar burst transmissions 1702.

In other aspects, the count of the plurality of radar devices scheduled for transmission during the common transmission time 1710 may be based on any other additional or alternative criteria.

In some demonstrative aspects, as shown in FIG. 17, there may be substantially no overlap between radar burst transmissions 1702, which may allow sharing of spectrum resources between three radar devices.

In some demonstrative aspects, the alignment of timing between the plurality of radar devices, and/or the overlap level allowed between the radar burst transmissions 1702 may be part of a system design and/or configuration of a radar system, e.g., radar system 901 (FIG. 9).

In some demonstrative aspects, as shown in FIG. 17, the burst scheduling scheme 1700 may schedule radar transmissions of the three radar devices, for example, using spectrum resources of a time-frequency resource block, for example, a single time-frequency resource block, e.g., $(N \times T_f)$.

In some demonstrative aspects, the burst scheduling scheme 1700 may use the time-frequency resource block for the three radar devices, for example, even without increasing a peak power of a radar system, e.g., radar system 901 (FIG. 9), and/or even while avoiding substantially any interference between the three radar devices.

In some demonstrative aspects, as shown in FIG. 17, the burst scheduling scheme 1700 may implement a synchronization level of about 10 us or lower between the plurality of radar devices, for example, in order to maintain synchronization between the radar burst transmissions 1702. For example, the plurality of radar devices of radar system 901 (FIG. 9) may be synchronized according to a time grid of 10 us or lower, for example, to implement the burst scheduling scheme 1700.

Figure 18:
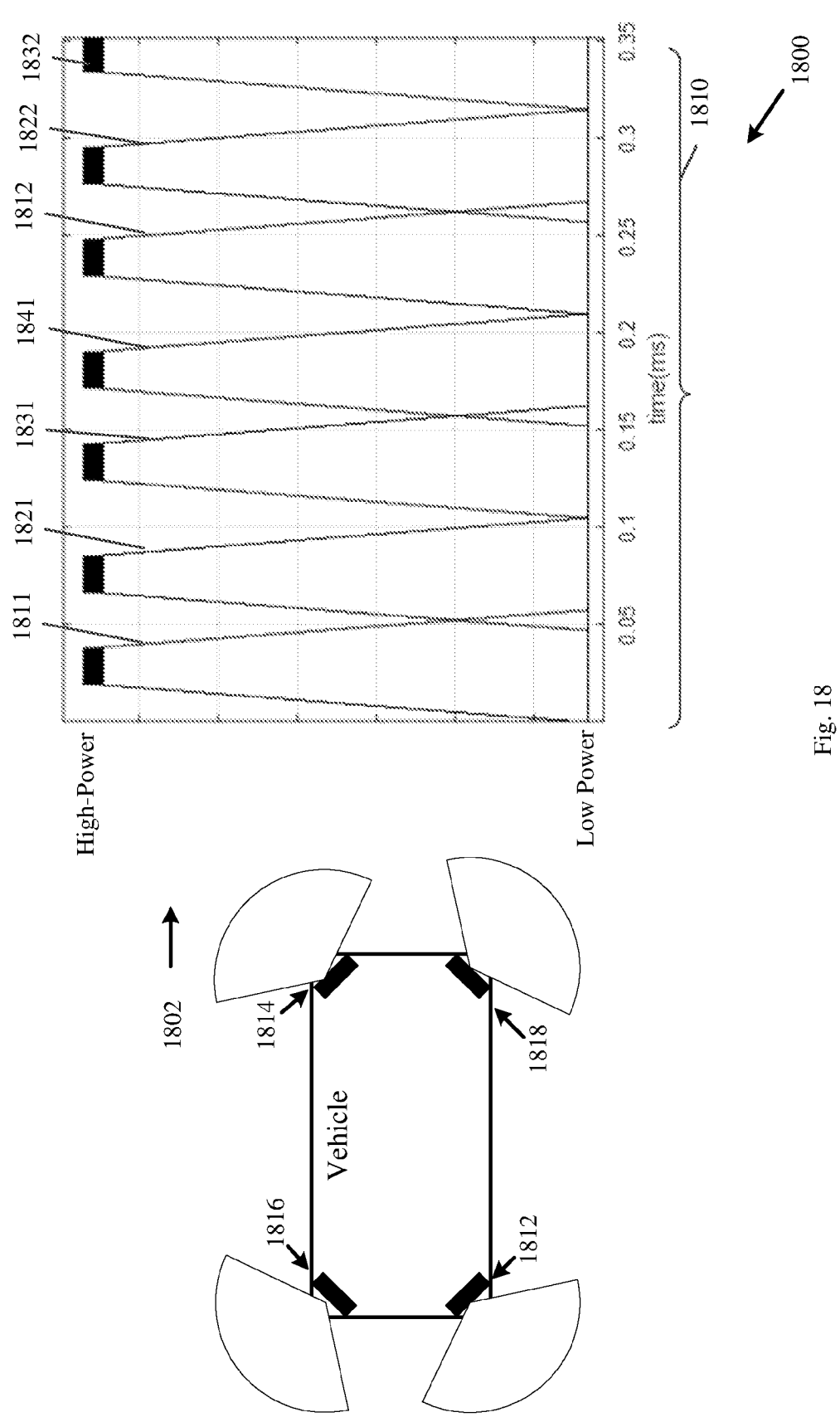
FIG. 18 is a schematic illustration of communications in a common transmission time of a burst scheduling scheme, in accordance with some demonstrative aspects.

Reference is made to FIG. 18, which schematically illustrates communications in a common transmission time 1810 of a burst scheduling scheme 1800, in accordance with some demonstrative aspects.

In some demonstrative aspects, common transmission time 1810 may be scheduled in a radar frame, for example, radar frame 1600 (FIG. 16).

In some demonstrative aspects, a radar frame duration of the radar frame period of radar frame 1600 (FIG. 16) may be more than 25 milliseconds, while a common transmission duration of the common transmission time 1810 may be less than 10 milliseconds.

In some demonstrative aspects, the burst scheduling scheme 1800 may be configured to schedule common transmission time 1810 for radar burst transmissions 1802 by a plurality of radar devices in a vehicle 1809, e.g., as described below.

In some demonstrative aspects, a controller and/or scheduler, e.g., controller 950 (FIG. 9), controller 1050 (FIG. 10), controller 1150 (FIG. 11), and/or scheduler 1190 (FIG. 11), may be configured to schedule radar transmissions by the plurality of radar devices 910 (FIG. 9) during a sequence of radar frame periods, e.g., a sequence of radar frame periods 1600 (FIG. 16), according to burst scheduling scheme 1800, which may schedule transmissions during common transmission time 1810, e.g., as described below.

In some demonstrative aspects, as shown in FIG. 18, burst scheduling scheme 1800 may schedule during the common transmission time 1810 a first radar transmission of a first radar device 1812, e.g., radar device 912 (FIG. 9), including a first sequence of radar bursts, for example, including a radar burst 1811 and a radar burst 1812.

In some demonstrative aspects, as shown in FIG. 18, burst scheduling scheme 1800 may schedule during the common transmission time 1810 a second radar transmission of a second radar device 1814, e.g., radar device 914 (FIG. 9), including a second sequence of radar bursts, for example, including a radar burst 1821 and a radar burst 1822.

In some demonstrative aspects, as shown in FIG. 18, burst scheduling scheme 1800 may schedule during the common transmission time 1810 a third radar transmission of a third radar device 1816, e.g., radar device 916 (FIG. 9), including a third sequence of radar bursts, for example, including a radar burst 1831 and a radar burst 1832.

In some demonstrative aspects, radar bursts in the first sequence of radar bursts, e.g., radar bursts 1811 and 1812, may be separated by a first burst gap, e.g., about 0.15 ms.

In some demonstrative aspects, radar bursts in the second sequence of radar bursts, e.g., radar bursts 1821 and 1822, may be separated by a second burst gap, e.g., about 0.15 ms.

In some demonstrative aspects, radar bursts in the third sequence of radar bursts, e.g., radar bursts 1831 and 1832, may be separated by a third burst gap, e.g., about 0.15 ms.

In some demonstrative aspects, a time offset between the second sequence of radar bursts and the first sequence of radar bursts, e.g., a time offset between radar burst 1811 and radar burst 1821, may be based, for example, on a burst duration of a radar burst in the first sequence of radar bursts, e.g., the burst duration of radar burst 1811, as described below.

In some demonstrative aspects, as shown in FIG. 18, a burst duration of a radar burst of burst transmissions 1802, e.g., radar burst 1811, radar burst 1821, radar burst 1831, radar burst 1841, radar burst 1812, radar burst 1822, and/or radar burst 1832, may be less than 1000 us. In other aspects, any other burst duration may be implemented.

In some demonstrative aspects, as shown in FIG. 18, burst scheduling scheme 1800 may schedule during common transmission time 1810 a fourth radar transmission of a fourth radar device 1818, e.g., radar device 918 (FIG. 9), including a fourth sequence of radar bursts, for example, including a radar burst 1841.

In some demonstrative aspects, as shown in FIG. 18, the burst scheduling scheme 1800 may allow to schedule radar transmissions of four radar devices within a same common transmission time 1810 of a same radar frame, e.g., radar frame 1600 (FIG. 16).

In some demonstrative aspects, the count of the radar devices which may be scheduled for communication within the same common transmission time 1810 may be based, for example, on a level of timing alignment between the plurality of radar devices, and/or an overlap level allowed between radar burst transmissions 1802.

In some demonstrative aspects, as shown in FIG. 18, the overlap level between radar burst transmissions 1802 may allow radar transmission from four different radar devices within the same common transmission time 1810 of a same radar frame, e.g., radar frame 1600 (FIG. 16).

In some demonstrative aspects, as shown in FIG. 18, radar burst transmissions 1802 may be arranged in a comb-like overlapping manner.

In some demonstrative aspects, as shown in FIG. 18, the first sequence of radar bursts transmitted by radar device 1812 may partially overlap the second sequence of radar bursts transmitted by radar device 1814.

In some demonstrative aspects, as shown in FIG. 18, the third sequence of radar bursts transmitted by radar device 1816 may partially overlap the fourth sequence of radar bursts transmitted by radar device 1818.

In some demonstrative aspects, as shown in FIG. 18, a burst end portion of radar burst 1811, e.g., after a peak of the radar burst 1811, may overlap a burst beginning portion of radar burst 1821, e.g., before a peak of the radar burst 1821.

In some demonstrative aspects, as shown in FIG. 18, a burst end portion of radar burst 1831, e.g., after a peak of the radar burst 1831, may overlap a burst beginning portion of radar burst 1841, e.g., before a peak of the radar burst 1841.

In some demonstrative aspects, as shown in FIG. 18, the burst scheduling scheme 1800 may allow to increase a number of transmissions from different radar devices within the same common transmission time 1810 of a same radar frame, e.g., radar frame 1600 (FIG. 16), by allowing overlap of at least some of the radar burst transmissions 1802 for example, based on the positioning and/or interference characteristics of radar devices 1812, 1814, 1816 and/or 1818.

In some demonstrative aspects, as shown in FIG. 18, radar transmissions of radar devices 1812 and 1814 may be directed to opposite directions; and/or radar transmissions of radar devices 1816 and 1818 may be directed to opposite directions. Therefore, there may be reduced, e.g., minimal, mutual interference, e.g., due to overlapped radio resources, between the radar transmissions of radar devices 1812 and 1814, and/or between the radar transmissions of radar devices 1816 and 1818.

In some demonstrative aspects, as shown in FIG. 18, the burst scheduling scheme 1800 may utilize a synchronization level of about 1 us or lower between the radar devices 1812, 1814, 1816 and/or 1818, for example, to synchronize between the radar burst transmissions 1802.

In some demonstrative aspects, the burst scheduling scheme 1800 may support a technical solution to schedule radar transmissions of four radar devices, for example, using spectrum resources of the single time-frequency resource block of FIG. 17, e.g., (N×T_f).

In some demonstrative aspects, the burst scheduling scheme 1800 may support a technical solution to use the single time-frequency resource block of FIG. 17, for four radar devices, for example, even without increasing a peak power of a radar system, and/or while allowing minimal interference, or no interference, between the four radar devices.

Figure 19:
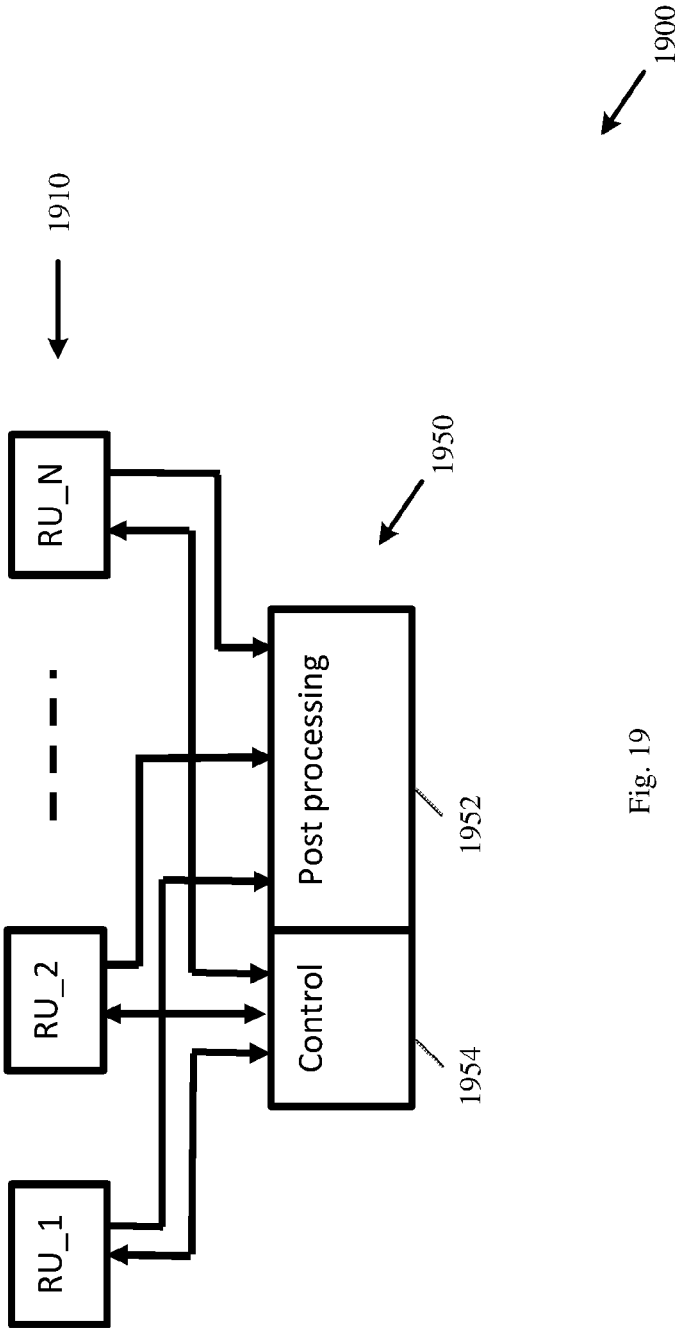
FIG. 19 is a schematic illustration of a radar system architecture of a radar system including plurality of radar devices, in accordance with some demonstrative aspects.

Reference is made to FIG. 19, which schematically illustrates a radar system architecture 1900 of a radar system including plurality of radar devices 1910, in accordance with some demonstrative aspects.

In some demonstrative aspects, a radar device 1910, e.g., each radar device 1910, may be configured to process, e.g., independently process, radar data based on radar signals communicated by the radar device 1910.

In some demonstrative aspects, as shown in FIG. 19, architecture 1900 may include a controller 1950 configured to control the plurality of radar devices 1910. For example, controller 950 (FIG. 9), controller 1050 (FIG. 10), controller 1150 (FIG. 11), and/or scheduler 1190 (FIG. 11), may be configured to perform one or more functionalities of, and/or operations of, controller 1950.

In some demonstrative aspects, as shown in FIG. 19, controller 1950 may include a control interface 1954 configured to interface between controller 1950 and the plurality of radar devices 1910, for example, to allow controller 1950 to control the plurality of radar devices 1910. In one example, control interface may be implemented to interface between controller 950 (FIG. 9), controller 1050 (FIG. 10), controller 1150 (FIG. 11), and/or scheduler 1190 (FIG. 11), and one or more of radar devices 910 (FIG. 9).

In some demonstrative aspects, controller 1950 may be configured to synchronize the plurality of radar devices 1910, e.g., to a common timing reference, for example, via control interface 1954.

In some demonstrative aspects, controller 1950 may be configured to control a radar mode setting, a frame timing setting for radar modes, and/or any other settings, for the plurality of radar devices 1910, for example, via control interface 1954.

In some demonstrative aspects, as shown in FIG. 19, controller 1950 may include a data interface 1952 configured to process and communicate data between controller 1950 and the plurality of radar devices 1910.

In some demonstrative aspects, controller 1950 may be configured to receive radar information from the plurality of radar devices 1910, e.g., via data interface 1952, for example, for post-processing of the radar information.

In one example, controller 1950 may be configured to gather and/or receive e.g., via data interface 1952, Point Cloud (PC) data for post-processing from each of the plurality of radar devices 1910. For example, the post-processing may include multi frame PC tracking, fusing/merging the PC data from the plurality of radar devices

1910, for example, to create a radar coverage map, and/or any other radar processing operations.

Reference is made to FIG. 20, which schematically illustrates a method of processing radar data, in accordance with some demonstrative aspects. For example, one or more of the operations of the method of FIG. 20 may be performed by a radar system, e.g., radar system 901 (FIG. 9), a controller and/or scheduler, e.g., controller 950 (FIG. 9), controller 1050 (FIG. 10), controller 1150 (FIG. 11), and/or scheduler 1190 (FIG. 11), and/or a radar device, e.g., radar device 101 (FIG. 1), radar device 800 (FIG. 8), radar device 910 (FIG. 9), and/or radar device 1110 (FIG. 11).

As indicated at block 2002, the method may include scheduling radar transmissions by a plurality of radar devices during a sequence of radar frame periods according to a burst scheduling scheme configured to schedule in a radar frame period a common transmission time for radar burst transmissions by the plurality of radar devices. For example, controller 950 (FIG. 9) may be configured to schedule the radar transmissions by the plurality of radar devices 910 (FIG. 9) during the sequence of radar frame periods according to the burst scheduling scheme configured to schedule in the radar frame period the common transmission time for radar burst transmissions by the plurality of radar devices 910 (FIG. 9), e.g., as described above.

As indicated at block 2004, scheduling the radar transmissions may include scheduling during the common transmission time a first radar transmission of a first radar device including a first sequence of radar bursts. For example, controller 950 (FIG. 9) may be configured to schedule during the common transmission time the first radar transmission of the first radar device, e.g., radar device 912 (FIG. 9), including the first sequence of radar bursts, e.g., as described above.

As indicated at block 2006, scheduling the radar transmissions may include scheduling during the common transmission time a second radar transmission of a second radar device including a second sequence of radar bursts, wherein a timing of radar bursts in the second sequence of radar bursts is offset relative to a timing of radar bursts in the first sequence of radar bursts. For example, controller 950 (FIG. 9) may be configured to schedule during the common transmission time the second radar transmission of the second radar device, e.g., radar device 914 (FIG. 9), including the first sequence of radar bursts, in which the timing of the radar bursts in the second sequence of radar bursts may be offset relative to the timing of the radar bursts in the first sequence of radar bursts, e.g., as described above.

Referring to FIG. 9, in some demonstrative aspects, radar system 901 may be configured to support processing of radar information of the plurality of radar devices 910 according to one or more processing schemes, e.g., as described below.

In some demonstrative aspects, radar system 901 may be configured to support processing of radar information of the plurality of radar devices 910 according to a distributed processing scheme, e.g., as described below.

In some demonstrative aspects, the distributed processing scheme may be configured to process one or more types of radar information of the plurality of radar devices 910 in a distributed and/or collaborative manner, for example, where a radar device 910 may process radar data generated by one or more other radar devices 910, e.g., as described below.

In some demonstrative aspects, the distributed processing scheme may include a distributed post-processing scheme to support distributed processing of prost-processing radar data, e.g., as described below.

In other aspects, any other additional or alternative processing scheme may be implemented to support distributed and/or collaborative processing of any other type of radar data.

Figure 21:
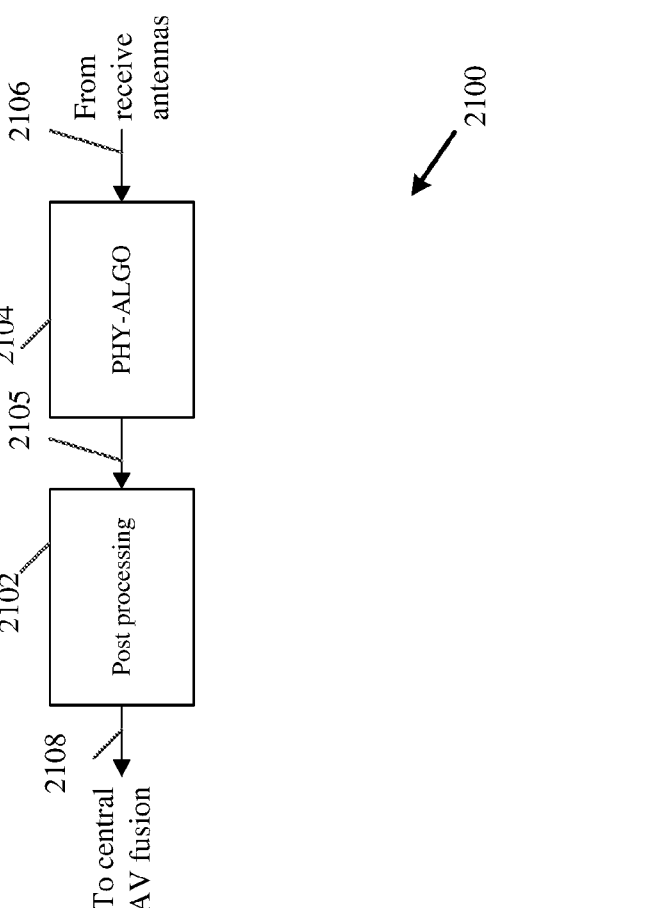
FIG. 21 is a schematic illustration of a radar processing scheme, in accordance with some demonstrative aspects.

Reference is made to FIG. 21, which schematically illustrates a radar processing scheme 2100, in accordance with some demonstrative aspects.

For example, radar system 901 (FIG. 9) may perform one or more operations of radar processing scheme 2100.

In some demonstrative aspects, as shown in FIG. 21, radar processing scheme 2100 may include a first radar processing phase 2104 (also referred to as a "PHY-algorithm (PHY-ALGO) phase"), e.g., as described below.

In some demonstrative aspects, radar processing phase 2104 may be configured to determine radar detection information 2105 of a radar device, based on radar signals 2106 communicated by the radar device, e.g., as described below.

In some demonstrative aspects, the radar processing phase 2104 of radar processing scheme 2100 may be performed, for example, by a radar device, e.g., each radar device, of the radar system. For example, radar device 910 (FIG. 9), e.g., each radar device 910 (FIG. 9), may be configured to perform the first radar processing phase 2104 of radar processing scheme 2100, for example, based on radar signals ("local radar signals") communicated by the radar device 910 (FIG. 9).

In some demonstrative aspects, the radar device may be configured to generate the radar detection information of the radar device, for example, by applying range processing, Doppler processing, AoA processing, and/or target detection processing, e.g., 4D-detector processing, for example, based on the radar signals 2106 communicated by the radar device. In other aspects, the radar detection information may be determined based on any other additional or alternative process and/or procedures.

In some demonstrative aspects, the radar detection information 2105 of the radar device may include a list of detections by the radar device.

In another example, the radar detection information 2105 may include any other additional and/or alternative information.

In some demonstrative aspects, the radar detection information 2105 of the radar device may be based on a radar Field of View (FoV), e.g., a "local" FoV, of the radar device, e.g., as described below.

In some demonstrative aspects, the radar detection information 2105 of a radar device 910 (FIG. 9) may be "locally" generated, for example, by a baseband processor of the radar device, for example, baseband processor 930 (FIG. 9), e.g., as described below.

In some demonstrative aspects, as shown in FIG. 21, processing scheme 2100 may include a second radar processing phase 2102 (also referred to as a "radar Post-Processing (PP) phase"), which may be configured to post process the radar detection information 2105. For example, radar processing phase 2102 may be configured to process the radar detection information 2105 to generate PP radar information 2108. For example, PP radar information 2108 may be generated to include a radar image around a vehicle, for example, vehicle 900 (FIG. 9), e.g., as described below.

In some demonstrative aspects, the radar PP phase 2102 may be performed by radar PP logic, which may be, for example, stateful over time.

In some demonstrative aspects, the radar PP logic may be configured to receive, e.g., via an input, radar detection information, e.g., radar detection information 2105, to evaluate correlated detections in the radar detection information, and/or to output, e.g., via an output, the PP radar information 2108, for example, including the radar image.

In some demonstrative aspects, there may be a need to address one or more technical issues, for example, when performing radar PP in a radar system, e.g., a radar system in a vehicle, including a plurality of radar devices, for example, the plurality of radar devices 910 (FIG. 9), e.g., as described below.

In some demonstrative aspects, for example, in some use cases, scenarios, and/or implementations, there may be one or more disadvantages, inefficiencies, and/or technical problems in an implementation including a central PP processor to post-process radar detection information from a plurality of radar devices in a vehicle, e.g., as described below.

In one example, the central PP processor may have a global 360-degree view, e.g., based on the radar detection information from the plurality of radar devices. Therefore, the central PP processor may provide accurate information, for example, compared to a local PP processor, which may have a local FoV. For example, the central PP processor may allow sharing information between the plurality of radar devices, which may improve an estimated radar image. Accordingly, it may be preferred to perform central post-processing of the radar detection information from a plurality of radar devices, for example, from an algorithmic perspective. However, performing the post-processing by the central PP processor may require an additional, e.g., dedicated, processor, e.g., in addition to the plurality of baseband processors in the plurality of radar devices, e.g., baseband processors 930 (FIG. 9). For example, the additional dedicated central PP processor may increase complexity, cost, and/or power consumption of a radar system, e.g., as the central PP processor may require significant processing power.

In some demonstrative aspects, for example, in some use cases, scenarios, and/or implementations, there may be one or more disadvantages, inefficiencies, and/or technical problems in implementing a "local" PP scheme, in which each radar device performs post-processing of radar detection information locally generated by the radar device, for example, by a baseband processor of the radar device, e.g., as described below.

In some demonstrative aspects, this local PP scheme may not require an additional central PP processor. However, local PP information, which may be generated locally by the baseband processor of the radar device may provide degraded results, e.g., as described below.

In one example, a local PP scheme which uses each radar device to determine its local PP information independently from other radar devices, may not support taking into account correlation and/or overlap of FoV between two or more radar devices. Therefore, the accuracy of the local PP information may be degraded.

In another example, compute power of the radar device for post-processing may not be scalable, for example, when the local PP scheme is implemented. For example, the compute power required by a radar device to determine the radar detection information of a local radar FoV of the radar device may be substantially fixed, while the compute power required by the radar device for post-processing may vary, e.g., depending on surrounding conditions and/or any other criteria.

Referring back to FIG. 9, in some demonstrative aspects, a radar system, e.g., radar system 901, may be configured to perform PP of radar detection information of the plurality of radar devices 910, for example, according to a distributed PP allocation scheme, e.g., as described below.

In some demonstrative aspects, the distributed PP allocation scheme may support a technical solution to treat computing resources of some or all of the plurality of radar devices 910, e.g., computing resources of some or all of the baseband processors 930 of the plurality of radar devices 910, as a global, shared, and/or collaborative computing resource, e.g., as described below.

In some demonstrative aspects, the distributed PP allocation scheme may support a technical solution, in which post-processing of radar detection information from some or all of the plurality of radar devices 910 may be distributed between some or all of the plurality of radar devices 910, e.g., as described below.

In some demonstrative aspects, post-processing of radar detection information from some or all of the plurality of radar devices 910 may be distributed between some or all of the plurality of radar devices 910, for example, according to a plurality of PP allocations, e.g., as described below. In one example, post-processing of radar detection information from some or all of the plurality of radar devices 910 may be distributed in accordance with a distributed architecture for distributed collaborative interference mitigation scheme, e.g., as described above with reference to FIG. 10. In other aspects, the post-processing of radar detection information from some or all of the plurality of radar devices 910 may be distributed independently from, and/or separately from, a distributed collaborative interference mitigation scheme, and/or any other scheme or architecture.

In some demonstrative aspects, a PP allocation may be defined according to a PP "region" (also referred to as "PP FoV"), e.g., as described below.

In some demonstrative aspects, the radar detection information may have a relatively small size. Therefore, communicating the radar detection information between the radar device 910 may be performed with a relatively low BW. This may allow a radar device 910 to run post-processing of another radar device 910. For example, any radar device 910 having sufficient digital signal processing capabilities may be allowed to run post-processing of another device.

In some demonstrative aspects, the distributed PP allocation scheme may support a technical solution, in which a 360-degree FoV around vehicle 900 may be divided into a plurality of PP regions, e.g., as described below.

In some demonstrative aspects, a PP region, e.g., each PP region, may be assigned to a radar device, for example, according to the distributed PP allocation scheme, e.g., as described below.

In some demonstrative aspects, the plurality of PP regions may be configured to be orthogonal to the radar FoVs of the plurality of radars, e.g., as described below.

In some demonstrative aspects, a baseband processor 930 of a radar device 910 may be configured to perform post-processing of a PP region assigned to the radar device 910, e.g., as described below.

In some demonstrative aspects, the distributed PP allocation scheme may support a technical solution, in which a radar device 910 may be responsible for at least one specific PP-region, e.g., as described below.

In some demonstrative aspects, the PP-region assigned to a radar device 910 may be independent and/or completely decoupled from the "local" radar FoV of the radar device 910, e.g., as described below.

In some demonstrative aspects, a division and assignment of the PP-regions may be flexible and/or optimized for load-balancing between the baseband processors 930 of the plurality of radar devices 910, e.g., as described below.

In some demonstrative aspects, the division of the 360-degree FoV around vehicle 900 into the PP-regions may be configured according to one or more overlapping areas, e.g., at edges of the PP-regions, e.g., as described below.

In some demonstrative aspects, the distributed PP allocation scheme may support a technical solution, which may allow a centralized view of post-processing of radar detection information. The centralized view of post-processing may provide improved results, for example, even without paying the cost of an additional central PP processor, e.g., as described below.

In some demonstrative aspects, the distributed PP allocation scheme may support a technical solution, which may allow flexibility in allocation of computing resources of the baseband processors 930. This flexibility in the allocation of computing resources of the baseband processors 930 may support an improved, e.g., optimal, utilization of computational resources of the plurality of radar devices 910. Accordingly, the distributed PP allocation scheme may support a technical solution, which may reduce a power consumption and/or a cost of a radar system.

In some demonstrative aspects, the distributed PP allocation scheme may support a technical solution, which may be configured to balance a processing load between the plurality of radar devices 910, for example, for the first stage/phase, e.g., the ALGO-PHY stage 2104 (FIG. 21), and the second stage/phase, e.g., the post-processing phase 2102 (FIG. 21), of radar processing scheme 2100 (FIG. 21), e.g., as described below.

In some demonstrative aspects, the distributed PP allocation scheme may support a technical solution, in which a global, e.g., 360-degrees, view for post-processing, may be split to multiple 'post-processing FoV' areas, e.g., as described below.

In some demonstrative aspects, a radar device 910, e.g., each of the radar devices 910 or some of the radar devices 910, may be allocated a responsibility on a specific 'post-processing FoV', e.g., as described below.

In some demonstrative aspects, a PP FoV allocated to a radar device 910 may be independent of, e.g., completely decoupled from, a local radar sensor FoV of the radar device 910, e.g., as described below.

In some demonstrative aspects, the distributed PP allocation scheme may support a technical solution, in which the radar device 910 may maintain a state of a specific PP-FoV assigned to the radar device 910, for example, to determine PP radar information of the specific PP-FoV, e.g., as described below. For example, a radar device 910, e.g., each radar device 910, may receive and process the list of detections from radar sensors that their local FoV is included in its specific PP-FoV.

In some demonstrative aspects, the distributed PP allocation scheme may support a technical solution, in which the radar device 910 may receive and process radar detection information from other radar devices 910, which may have a radar FoV that is allocated to, e.g., included in, the specific PP-FoV of the radar device 910, e.g., as described below.

In some demonstrative aspects, division of the 360-degrees to the plurality of PP-FoVs may be fully flexible, and/or may be based on one or more suitable considerations, e.g., as described below.

In some demonstrative aspects, division of the 360-degrees to the plurality of PP-FoVs may be configured to balance a total processing load, e.g., of both the ALGO-PHY and the post-processing phases, between the radar devices, e.g., as described below.

In some demonstrative aspects, a radar device, e.g., a front radar, may have higher processing demands than other radars, and as such may require more compute resources for the ALGO-PHY compute phase. Accordingly, the distributed PP allocation scheme may be configured to move most or all the post-processing logic from this radar device to one or more other radar devices, e.g., as described below.

Figure 22:
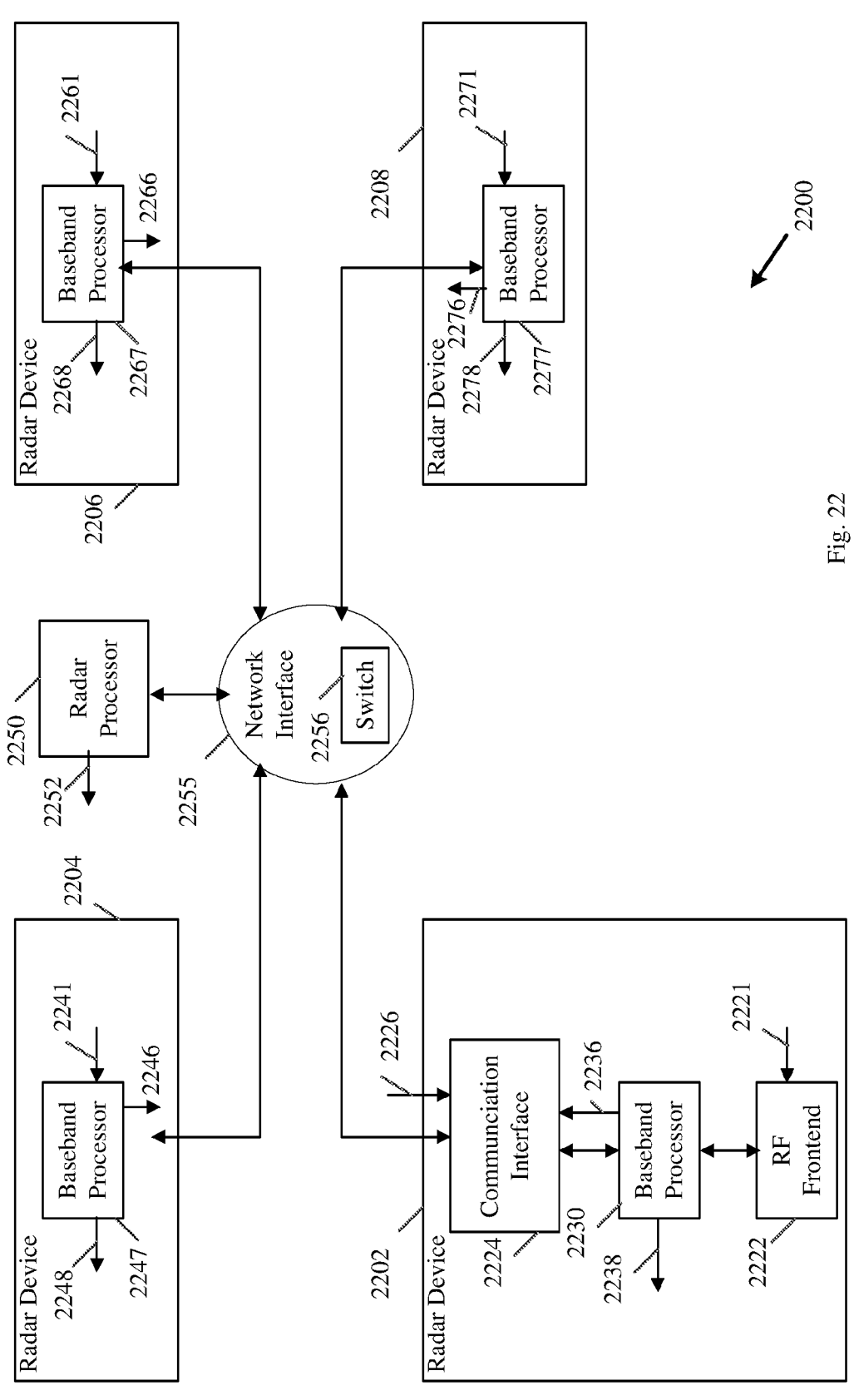
FIG. 22 is a schematic illustration of a radar system including a plurality of radar devices, in accordance with some demonstrative aspects.

Reference is made to FIG. 22, which schematically illustrates a radar system 2200 including a plurality of radar devices, in accordance with some demonstrative aspects. For example, radar system 901 (FIG. 9), radar system 1000 (FIG. 10), and/or radar system 1100 (FIG. 11), may include one or more elements of radar system 2200, and/or may perform one or more operations and/or functionalities of radar system 2200.

In some demonstrative aspects, the plurality of radar devices may include a first radar device 2202, a second radar device 2204, a third radar device 2206, and/or a fourth radar device 2208.

In some demonstrative aspects, the plurality of radar devices may include any other count of radar devices.

In some demonstrative aspects, the plurality of radar devices may be configured to perform Post-Processing (PP) of radar detection information according to a distributed PP allocation scheme, e.g., as described below.

In some demonstrative aspects, the distributed PP allocation scheme may be configured to allocate one or more PP data-provider devices (also referred to as "PP data-allocated devices", "PP source devices", or "PP-allocated devices") to a PP device, e.g., as described below. For example, the PP device may include a device configured to perform post-processing of radar detection information, e.g., as described below. For example, one or more PP data-provider devices may be allocated to provide the radar detection information to be processed by the PP device, e.g., as described below.

In some demonstrative aspects, the PP device may include a first radar device of the plurality of radar devices, e.g., as described below.

In some demonstrative aspects, the one or more PP data-provider devices may include at least one second radar device of the plurality of radar devices, e.g., as described below.

In one example, the PP device may include radar device 2202, and/or the one or more PP allocated devices may include radar device 2204. According to this example, the distributed PP allocation scheme may allocate radar device 2204 to radar device 2202 for the purpose of post processing of radar detection information.

In another example, the PP device may include any other radar device of radar system 2200, and/or the one or more PP allocated devices may include any other alternative or additional radar devices of radar system 2200.

In some demonstrative aspects, a radar device of the plurality of radar devices in radar system 2200 may include an RF frontend configured to communicate radar signals of the radar device, e.g., as described below.

In some demonstrative aspects, as shown in FIG. 22, radar device 2202 may include an RF frontend 2222 configured to communicate radar signals of the radar device 2202, e.g., as described below.

In some demonstrative aspects, a radar device of the plurality of radar devices in radar system 2200 may include a baseband processor configured to generate radar detection information of the radar device, based on radar signals communicated by the radar device, e.g., as described below.

In some demonstrative aspects, radar device 2202 may include a baseband processor 2230 configured to generate radar detection information 2236 of radar device 2202, based on the radar signals 2221 of radar device 2202, e.g., as described below.

In some demonstrative aspects, baseband processor 2230 may be configured to generate the radar detection information 2236 of radar device 2202, for example, by applying range processing, Doppler processing, AoA processing, and/or target detection processing, for example, based on the radar signals 2221 of radar device 2202, e.g., as described below.

In some demonstrative aspects, radar device 2204 may include a baseband processor 2247 configured to generate radar detection information 2246 of radar device 2204, based on the radar signals 2241 of radar device 2204, e.g., as described below.

In some demonstrative aspects, radar device 2206 may include a baseband processor 2267 configured to generate radar detection information 2266 of radar device 2204, based on the radar signals 2261 of radar device 2206, e.g., as described below.

In some demonstrative aspects, radar device 2208 may include a baseband processor 2277 configured to generate radar detection information 2276 of radar device 2208, based on the radar signals 2271 of radar device 2208, e.g., as described below.

In some demonstrative aspects, a radar device of the plurality of radar devices in radar system 2200 may include a communication interface configured to communicate over a communication network, for example, with one or more other radar devices, e.g., as described below.

In some demonstrative aspects, radar device 2202 may include a communication interface 2224 configured to communicate with radar devices 2204, 2206 and/or 2208, e.g., as described below.

In some demonstrative aspects, at least one of the radar devices in radar system 2200 may be configured to perform a role of, and/or one or more functionalities and/or operations of a PP device, which may be configured to perform PP of radar detection information from one or more PP data-provider devices, which may be allocated to the PP device, for example, according to the distributed PP allocation scheme, e.g., as described below.

In some demonstrative aspects, at least one of the radar devices in radar system 2200 may be configured to perform a role of, and/or one or more functionalities and/or operations of a PP data-provider device, which may be configured to provide radar detection information for PP by a PP device, e.g., as described below.

In some demonstrative aspects, radar device 2202 may be configured to perform a role of, and/or one or more functionalities and/or operations of a PP device, which may be configured to perform PP of radar detection information from one or more PP data-provider devices, which may be allocated to the PP device, for example, according to the distributed PP allocation scheme, e.g., as described below.

In some demonstrative aspects, radar device 2204 may be configured to perform a role of, and/or one or more functionalities and/or operations of a PP data-provider device, which may be allocated to the PP device implemented by radar device 2202, e.g., as described below.

In some demonstrative aspects, communication interface 2224 may be configured to receive radar detection information 2226 from the one or more PP data-provider devices, which are allocated to radar device 2202, for example, according to the distributed PP allocation scheme, e.g., as described below.

In one example, radar detection information 2226 may include radar detection information 2246 from radar device 2204. For example, radar device 2204 may be configured to send to radar device 2202 the radar detection information 2246 of radar device 2204.

In another example, radar detection information 2226 may include radar detection information from one or more other additional or alternative radar devices, e.g., radar detection information 2266 from radar device 2206, and/or radar detection information 2276 from radar device 2208.

In some demonstrative aspects, baseband processor 2230 may be configured to generate PP radar information 2238, for example, by processing the radar detection information 2226 from the one or more PP data-provider devices, which are allocated to the radar device 2202 according to the distributed PP allocation scheme.

In some demonstrative aspects, as shown in FIG. 22, baseband processor 2247 may be configured to generate PP radar information 2248, for example, by processing radar detection information from one or more PP data-provider devices, which are allocated to the radar device 2204 according to the distributed PP allocation scheme.

In some demonstrative aspects, as shown in FIG. 22, baseband processor 2267 may be configured to generate PP radar information 2268, for example, by processing radar detection information from one or more PP data-provider devices, which are allocated to the radar device 2206 according to the distributed PP allocation scheme.

In some demonstrative aspects, as shown in FIG. 22, baseband processor 2277 may be configured to generate PP radar information 2278, for example, by processing radar detection information from one or more PP data-provider devices, which are allocated to the radar device 2208 according to the distributed PP allocation scheme.

In some demonstrative aspects, the one or more PP data-provider devices, which are allocated to radar device 2202, may include radar device 2202, e.g., as described below.

In some demonstrative aspects, baseband processor 2230 of radar device 2202 may be configured to generate the PP radar information 2238, for example, by processing the radar detection information 2236 of radar device 2202 and radar detection information 2246 from radar device 2204, e.g., as described below.

In some demonstrative aspects, the one or more PP data-provider devices, which are allocated to radar device 2202, may exclude radar device 2202, e.g., as described below.

In some demonstrative aspects, baseband processor 2230 of radar device 2202 may be configured to generate the PP radar information 2238, for example, based on radar detection information 2246, while not processing the radar detection information 2236 of radar device 2202. For example, the radar detection information 2236 of radar device 2202 may be sent from radar device 2202 for PP by another radar device, e.g., radar device 2208.

In some demonstrative aspects, radar signals 2221 of radar device 2202 may cover a first FoV, e.g., as described below.

In some demonstrative aspects, the one or more PP data-provider devices which are allocated to radar device 2202, may cover a second FoV different from the first radar FoV. For example, radar signals 2241 of radar device 2204 may cover the second FoV.

In some demonstrative aspects, the distributed PP allocation scheme may be configured to allocate the plurality of radar devices of radar system 2200 to a plurality of PP devices, for example, including radar device 2202, e.g., as descried below.

In some demonstrative aspects, the plurality of PP devices may match the plurality of radar devices, respectively, e.g., as described below.

In one example, the plurality of PP devices may include radar devices 2202, 2204, 2206, and/or 2208.

In some demonstrative aspects, the plurality of PP devices may not match the plurality of radar devices in radar system 2200, e.g., as describe below.

In some demonstrative aspects, a count of the plurality of PP devices may be less than a count of the plurality of radar devices in system 2200, e.g., as descried below.

In one example, the plurality of PP devices may include radar devices 2202, 2204, and/or 2206; and/or the plurality of PP devices may not include radar device 2208.

In some demonstrative aspects, the distributed PP allocation scheme may include a FoV based PP allocation scheme, for example, based on radar FoVs of the plurality of radar devices in radar system 2200, e.g., as described below.

In some demonstrative aspects, the FoV based PP allocation scheme may be configured to allocate to the plurality of PP devices a respective plurality of PP FoVs, e.g., as descried below.

In some demonstrative aspects, the plurality of PP FoVs may be based on the radar FoVs of the plurality of radar devices in radar system 2200, e.g., as described below.

In some demonstrative aspects, the plurality of PP FoVs may cover a combined FoV of 360 degrees, e.g., as described below.

In some demonstrative aspects, PP radar information of a PP radar device may correspond to a PP FoV allocated to the PP radar device, e.g., as described below.

In one example, the PP radar information 2238 of the PP radar device implemented by radar device 2202 may correspond to a PP FoV allocated to radar device 2202, e.g., as describe below.

In some demonstrative aspects, the distributed PP allocation scheme may be configured to allocate to radar device 2202 a first PP data-provider device having a first radar FoV, and a second PP data-provider device having a second radar FoV. For example, the second radar FoV may at least partially overlap the first radar FoV, e.g., as described below.

In one example, the distributed PP allocation scheme may allocate to the PP device implemented by radar device 2202 a first PP data-provider device, e.g., the radar device 2204, and a second PP data-provider device, e.g., the radar device 2206. For example, a radar FoV of radar device 2204 may at least partially overlap a radar FoV of radar device 2206, e.g., as described below.

In some demonstrative aspects, as shown in FIG. 22, radar system 2200 may include a network interface 2255 configured to interconnect and/or interface between the plurality of radar devices of radar system 2200, e.g., as described below.

In some demonstrative aspects, network interface 2255 may be configured to communicate and/or pass radar detection information, e.g., in the form of a list of detections and/or any other format, from an originating radar device, e.g., a PP data-provider device, to one or more other devices, e.g., one or more PP devices to which the PP data-provider device may be allocated.

In some demonstrative aspects, the radar detection information communicated between the radar devices of radar system 2200 may have a relatively low data BW.

In one example, radar device 2202 may be configured to receive the radar detection information 2226 from the one or more PP data-provider devices, which are allocated to radar device 2206, for example, via network interface 2255.

In some demonstrative aspects, network interface 2255 may be implemented, for example, according to a switched topology, which may utilize a central switch 2256 to connect between the plurality of radar devices of radar system 2200.

In some demonstrative aspects, network interface 2255 may be implemented, for example, according to a ring topology, e.g., such that the plurality of radar devices of radar system 2200 may communicate as nodes on a same ring.

In some demonstrative aspects, network interface 2255 may include a combined topology including a combination of the ring topology and the switched topology.

In some demonstrative aspects, communication interface 2255 may include a Bus, and/or a communication lane connected to the plurality of devices of radar system 2200.

In some demonstrative aspects, network interface 2255 may include Ethernet cables, e.g., 1 Gbps Ethernet cables, connected via one or more central switches, and/or over dedicated interfaces.

In some demonstrative aspects, network interface 2255 may include any other additional and/or alternative elements and/or components.

In one example, network interface 2255 may be based on an existing networking infrastructure in a vehicle. e.g., vehicle 900 (FIG. 9), for example, as the communication of the radar detection information 2226 may require a low BW, for example, as long as the required BW is provided.

In some demonstrative aspects, network interface 2225 may be configured to communicate broadcast messages between the radar devices of radar system 2200. For example, the broadcast messages may include radar detection information from a PP data-provider device to one or more PP devices.

For example, communication interface 2224 may be configured to communicate broadcast messages between radar device 2202 and one or more PP data-provider devices, e.g., via network interface 2225. For example, interface 2224 may be configured to receive broadcast messages including radar detection information 2246 of radar device 2204.

In some demonstrative aspects, network interface 2225 may be configured to communicate multicast messages between the radar devices of radar system 2200. For example, the multicast messages may include radar detection information from a PP data-provider device to one or more PP devices.

For example, communication interface 2224 may be configured to communicate multicast messages between radar device 2202 and one or more PP data-provider devices, e.g., via network interface 2225. For example, interface 2224 may be configured to receive multicast messages including radar detection information 2246 of radar device 2204.

In some demonstrative aspects, the multicast messages and/or the broadcast messages may be utilized, for example, to send radar detection information, e.g., simultaneously, from a PP data-provider device to one or more PP radar devices, to which the PP data-provider device is allocated.

In some demonstrative aspects, a PP data-provider radar device of radar system 2200, e.g., radar device 2204, may use multicast/broadcast messages to transmit its radar detection information, e.g., in the form of a list of detections and/or any other format, to one or more other radar devices, e.g., radar device 2202.

In some demonstrative aspects, a PP device of radar system 2200, e.g., radar device 2202, may filter received radar detection information, for example, according to the PP data-provider devices allocated to the PP device, e.g., for a PP-FoV being processed by the PP device.

In some demonstrative aspects, the multicast message and/or the broadcast message may be utilized, for example, to reduce a load on network interface 2255.

In some demonstrative aspects, the multicast message and/or the broadcast message may allow a simple management of data transfer, e.g., by network interface 2255.

In other aspects, network interface 2255 may be implemented according to any other additional or alternative topology, architecture, message formats, and/or components configured to support communication between the plurality of radar devices of radar system 2200.

In some demonstrative aspects, radar system 2200 may include a radar processor 2250 configured to control one or more, e.g., some or all, of the plurality of radar devices of radar system 2200. For example, radar system controller 950 (FIG. 9) may include one or more elements of radar processor 2250, and/or may perform one or more operations and/or functionalities of radar processor 2250.

In some demonstrative aspects, the distributed PP allocation scheme may be flexible, e.g., as described below.

In one example, the distributed PP allocation scheme may be pre-defined, e.g., during boot.

In another example, the distributed PP allocation scheme may be dynamic, e.g., changing according to run-time conditions.

In some demonstrative aspects, radar processor 2250 may be configured to determine the distributed PP allocation scheme, for example, based on one or more parameters corresponding to PP capabilities of baseband processors of one or more of the plurality of radar devices of radar system 2200, e.g., as described below.

In one example, radar processor 2250 may be configured to generate, configure, change and/or update the distributed PP allocation scheme, for example, based on one or more parameters corresponding to PP capabilities of baseband processor 2230.

In some demonstrative aspects, radar processor 2250 may be configured to update the distributed PP allocation scheme, for example, based on a change in a processing load for generating detection information by at least one radar device of the plurality of radar devices in radar system 2200, e.g., as described below.

In one example, radar processor 2250 may be configured to update the distributed PP allocation scheme, for example, based on a change in a processing load for generating radar detection information 2236 by baseband processor 2230 of radar device 2202. For example, radar processor 2250 may be configured to update the distributed PP allocation scheme to allocate a larger number of PP data-provider devices to radar device 2202, for example, based on a decrease of the processing load for generating radar detection information 2236 by baseband processor 2230 of radar device 2202. For example, radar processor 2250 may be configured to update the distributed PP allocation scheme to allocate less PP data-provider devices to radar device 2202, for example, based on an increase of the processing load for generating radar detection information 2236 by baseband processor 2230 of radar device 2202.

In one example, radar processor 2250 may be configured to update the distributed PP allocation scheme, for example, based on a change in a processing load for generating detection information 2246 by baseband processor 2247 of radar device 2204. For example, radar processor 2250 may be configured to update the distributed PP allocation scheme to allocate a larger number of PP data-provider devices to radar device 2204, for example, based on a decrease of the processing load for generating radar detection information 2246 by baseband processor 2247 of radar device 2204. For example, radar processor 2250 may be configured to update the distributed PP allocation scheme to allocate less PP data-provider devices to radar device 2204, for example, based on an increase of the processing load for generating radar detection information 2246 by baseband processor 2247 of radar device 2204.

In some demonstrative aspects, allocation of the one or more PP data-provider devices to radar device 2202 may be based on a processing load of the baseband processor 2230 for generating the radar detection information of radar device 2202, e.g., as described below.

In some demonstrative aspects, allocation of radar device 2204 as a PP data-provider device in the one or more PP data-provider devices may be based, for example, on a processing load of baseband processor 2247 of radar device 2204 for generating radar detection information of radar device 2204, e.g., as described below.

In some demonstrative aspects, allocation of radar device 2204 as a PP data-provider device in the one or more PP data-provider devices may be based, for example, on a processing load of baseband processor 2247 of radar device 2204 for performing one or more post-processing operations, e.g., as described below.

In some demonstrative aspects, radar processor 2250 may be configured to process PP radar information from the plurality of PP devices defined according to the distributed PP allocation scheme, e.g., as described below.

In some demonstrative aspects, radar processor 2250 may be configured to process and/or combine PP radar information 2238 from radar device 2202, PP radar information 2248 from radar device 2204, PP radar information 2268 from radar device 2206, and/or PP radar information 2278 from radar device 2208.

In some demonstrative aspects, radar processor 2250 may be configured to generate radar information 2252 based on the PP radar information from the plurality of PP devices, e.g., as described below.

In some demonstrative aspects, radar processor 2250 may be configured to provide radar information 2252 to vehicle controller 108 (FIG. 1). For example, vehicle controller 108 (FIG. 1) may control one or more systems of the vehicle 100 (FIG. 1), for example, based on the radar information 2252 from radar processor 2250.

Figure 23:
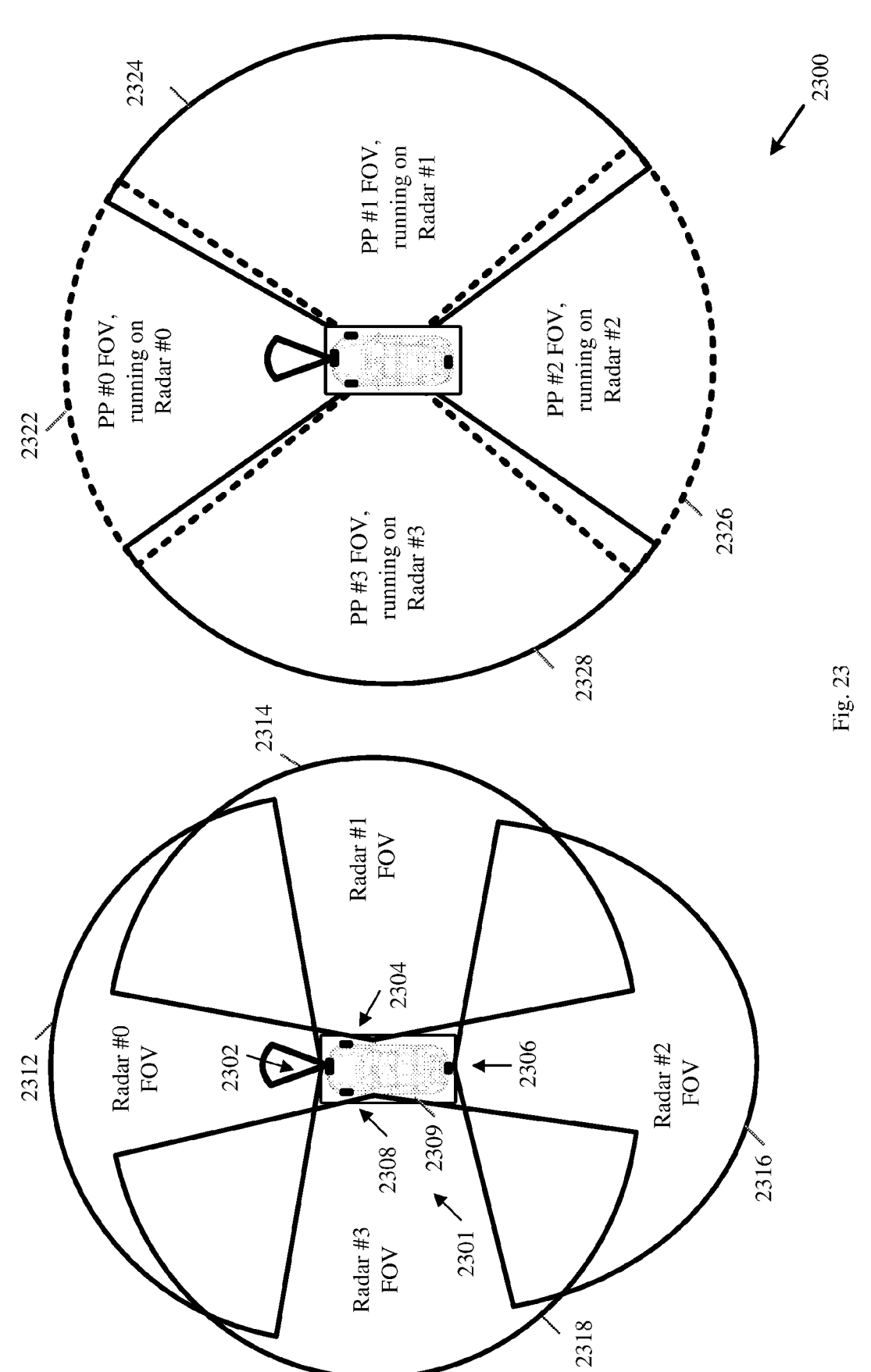
FIG. 23 is a schematic illustration of a distributed Post Processing (PP) allocation scheme to allocate a plurality of PP Field of Views (FoVs) to a plurality of PP devices, in accordance with some demonstrative aspects.

Reference is made to FIG. 23, which schematically illustrates a distributed PP allocation scheme 2300 to allocate a plurality of PP FoVs to a plurality of PP devices, e.g., as described below.

In some demonstrative aspects, distributed PP allocation scheme 2300 may be configured as a FoV based PP allocation scheme, e.g., as described below.

In some demonstrative aspects, as shown in FIG. 23, a vehicle 2309 may include a radar system 2301 including the plurality of radar devices. For example, radar system 2200 (FIG. 22) may include one or more elements of radar system 2301, and/or may perform one or more operations and/or functionalities of radar system 2301.

In some demonstrative aspects, as shown in FIG. 23, radar system 2301 may include a front radar device 2302 having a "local" Radar FoV 2312, denoted "RADAR #0 FOV".

In some demonstrative aspects, as shown in FIG. 23, radar system 2301 may include a first corner radar device 2304 having a "local" Radar FoV 2314, denoted "RADAR #1 FOV".

In some demonstrative aspects, as shown in FIG. 23, radar system 2301 may include a back radar device 2306 having a "local" Radar FoV 2316, denoted "RADAR #2 FOV".

In some demonstrative aspects, as shown in FIG. 23, radar system 2301 may include a second corner radar device 2308 having a "local" Radar FoV 2318, denoted "RADAR #3 FOV".

In one example, radar device 2302, radar device 2304, radar device 2306, and/or radar device 2308 may be configured to perform one or more functionalities of, and/or may include one or more elements of, a radar device of radar system 2200 (FIG. 22), e.g., radar device 2202 (FIG. 22).

In some demonstrative aspects, radar transmissions of radar device 2302, radar device 2304, radar device 2306, and/or radar device 2308 may be scheduled based on the local radar FoV 2312, the local radar FoV 2314, the local radar FoV 2316, and/or the local radar FoV 2318. In one example, radar transmissions of radar device 2302, radar device 2304, radar device 2306, and/or radar device 2308 may be scheduled according to a burst scheduling scheme, e.g., as described above with reference to FIG. 16, FIG. 17, and/or FIG. 18. In other aspects, radar transmissions of radar device 2302, radar device 2304, radar device 2306, and/or radar device 2308 may be scheduled according to any other scheduling scheme.

In some demonstrative aspects, as shown in FIG. 23, radar system 2301 may include four radar devices.

In other aspects, radar system 2301 may include any other count of radar devices.

In some demonstrative aspects, as shown in FIG. 23, distributed PP allocation scheme 2300 may be configured to divide a 360-degrees area surrounding the vehicle 2309 into a plurality of PP-FoVs, e.g., as described below.

In some demonstrative aspects, as shown in FIG. 23, the plurality of PP FoVs may include four PP FoVs.

In other aspects, the plurality of PP FoVs may include any other count of PP FoVs.

In some demonstrative aspects, at least one pair of neighboring PP FoVs may be defined to have some overlap, e.g., a small overlap, at edges between the neighboring PP-FoVs. For example, the small overlap between neighboring PP FoVs may provide a technical solution to increase an accuracy of PP radar information generated based on radar post processing.

In some demonstrative aspects, as shown in FIG. 23, the plurality of PP FoVs may include a first PP FoV 2322, denoted "PP #0 FOV", a second PP FoV 2324, denoted "PP #1 FOV", a third PP FoV 2326, denoted "PP #2 FOV", and/or a fourth PP FoV 2328, denoted "PP #3 FOV".

In some demonstrative aspects, as shown in FIG. 23, distributed PP allocation scheme 2300 may allocate PP FoV 2322 to a first PP device, e.g., the radar device 2302.

In some demonstrative aspects, as shown in FIG. 23, distributed PP allocation scheme 2300 may allocate PP FoV 2324 to a second PP device, e.g., the radar device 2304.

In some demonstrative aspects, as shown in FIG. 23, distributed PP allocation scheme 2300 may allocate PP FoV 2326 to a third PP device, e.g., radar device 2306.

In some demonstrative aspects, as shown in FIG. 23, distributed PP allocation scheme 2300 may allocate PP FoV 2328 to a fourth PP device, e.g., radar device 2308.

In some demonstrative aspects, distributed PP allocation scheme 2300 may allocate one or more PP data-provider devices, e.g., radar devices 2302, 2304, and/or 2308, to the first PP device, e.g., radar device 2302.

For example, the PP FoV 2322, which is allocated to radar device 2302, may at least partially overlap with the local radar FoV 2312 of radar device 2302, the local radar FoV 2314 of radar device 2304, and/or the local radar FoV 2318 of radar device 2308.

In some demonstrative aspects, a baseband processor of radar device 2302 may be configured to perform PP of radar detection information corresponding to the PP FoV 2322.

For example, the baseband processor of radar device 2302 may be configured to generate PP radar information for the PP FoV 2322, for example, by processing radar detection information of the radar FoV 2312, e.g., from radar device 2302, radar detection information of the radar FoV 2314, e.g., from radar device 2304, and/or radar detection information of the radar FoV 2318, e.g., from radar device 2308. For example, the baseband processor of radar device 2302 may be configured to generate PP radar information for the PP FoV 2322, for example, based on a list of detections of radar device 2302, a list of detections of radar device 2304, and/or a list of detections of radar device 2308.

In some demonstrative aspects, distributed PP allocation scheme 2300 may allocate one or more PP data-provider devices, e.g., radar devices 2302, 2304, and/or 2306, to the second PP device, e.g., radar device 2304.

For example, the PP FoV 2324, which is allocated to radar device 2304, may at least partially overlap with the local radar FoV 2312 of radar device 2302, the local radar FoV 2314 of radar device 2304, and/or the local radar FoV 2316 of radar device 2306.

In some demonstrative aspects, a baseband processor of radar device 2304 may be configured to perform PP of radar detection information corresponding to the PP FoV 2324.

For example, the baseband processor of radar device 2304 may be configured to generate PP radar information for the PP FoV 2324, for example, by processing radar detection information of the radar FoV 2312, e.g., from radar device 2302, radar detection information of the radar FoV 2314, e.g., from radar device 2304, and/or radar detection information of the radar FoV 2316, e.g., from radar device 2306. For example, the baseband processor of radar device 2304 may be configured to generate PP radar information for the PP FoV 2324, for example, based on a list of detections of radar device 2302, a list of detections of radar device 2304, and/or a list of detections of radar device 2306.

In some demonstrative aspects, distributed PP allocation scheme 2300 may allocate one or more PP data-provider devices, e.g., radar devices 2304, 2306, and/or 2308, to the third PP device, e.g., radar device 2306.

For example, the PP FoV 2326, which is allocated to radar device 2306, may at least partially overlap with the local radar FoV 2314 of radar device 2304, the local radar FoV 2316 of radar device 2306, and/or the local radar FoV 2318 of radar device 2308.

In some demonstrative aspects, a baseband processor of radar device 2306 may be configured to perform PP of radar detection information corresponding to the PP FoV 2326.

For example, the baseband processor of radar device 2306 may be configured to generate PP radar information for the PP FoV 2326, for example, by processing radar detection information of the radar FoV 2314, e.g., from radar device 2304, radar detection information of the radar FoV 2316, e.g., from radar device 2306, and/or radar detection information of the radar FoV 2318, e.g., from radar device 2308. For example, the baseband processor of radar device 2306 may be configured to generate PP radar information for the PP FoV 2326, for example, based on a list of detections of radar device 2304, a list of detections of radar device 2306, and/or a list of detections of radar device 2308.

In some demonstrative aspects, distributed PP allocation scheme 2300 may allocate one or more PP data-provider devices, e.g., radar devices 2306, 2308, and/or 2302, to the fourth PP device, e.g., radar device 2308.

For example, the PP FoV 2328, which is allocated to radar device 2308, may at least partially overlap with the local radar FoV 2316 of radar device 2306, the local radar FoV 2318 of radar device 2308, and/or the local radar FoV 2312 of radar device 2302.

In some demonstrative aspects, a baseband processor of radar device 2308 may be configured to perform PP of radar detection information corresponding to the PP FoV 2328.

For example, the baseband processor of radar device 2308 may be configured to generate PP radar information for the PP FoV 2328, for example, by processing radar detection information of the radar FoV 2316, e.g., from radar device 2306, radar detection information of the radar FoV 2318, e.g., from radar device 2308, and/or radar detection information of the radar FoV 2312, e.g., from radar device 2302. For example, the baseband processor of radar device 2308 may be configured to generate PP radar information for the PP FoV 2328, for example, based on a list of detections of radar device 2306, a list of detections of radar device 2308, and/or a list of detections of radar device 2302.

In some demonstrative aspects, distributed PP allocation scheme 2300 may allocate PP FoVs of one or more, e.g., different, sizes, e.g., as described below.

In some demonstrative aspects, a size of a PP FoV may be defined, for example, based on a processing power per area unit to be supported by the PP FoV, e.g., as described below.

In some demonstrative aspects, as shown in FIG. 23, PP FoV 2322, which may be assigned to radar device 2302, may be smaller compared to the other PP FoVs. For example, the definition of the "front facing" PP FoV 2322 to cover a smaller FoV, may accommodate more processing power per area unit of PP FoV 2322, e.g., as PP FoV 2322 may be directed to a front facing area, which may be more critical to an AV algorithm.

In some demonstrative aspects, a distributed PP allocation scheme, e.g., distributed PP allocation scheme 2300, may be configured to allocate a plurality of PP FoVs to respective radar devices, e.g., such that each radar device is allocated with a respective PP FoV.

In other aspects, a distributed PP allocation scheme may be configured to allocate a plurality of PP FoVs to a plurality of radar devices according to any other suitable allocation, e.g., as described below.

In some demonstrative aspects, a distributed PP allocation scheme may be configured to decouple between the number radars and the number of PP-FoVs. For example, the number of PP-FoVs may be equal to or different from the number of radar devices, e.g., as described below.

In some demonstrative aspects, the distributed PP allocation scheme may be configured to provide a technical solution to allocate resources in a flexible manner.

Figure 24:
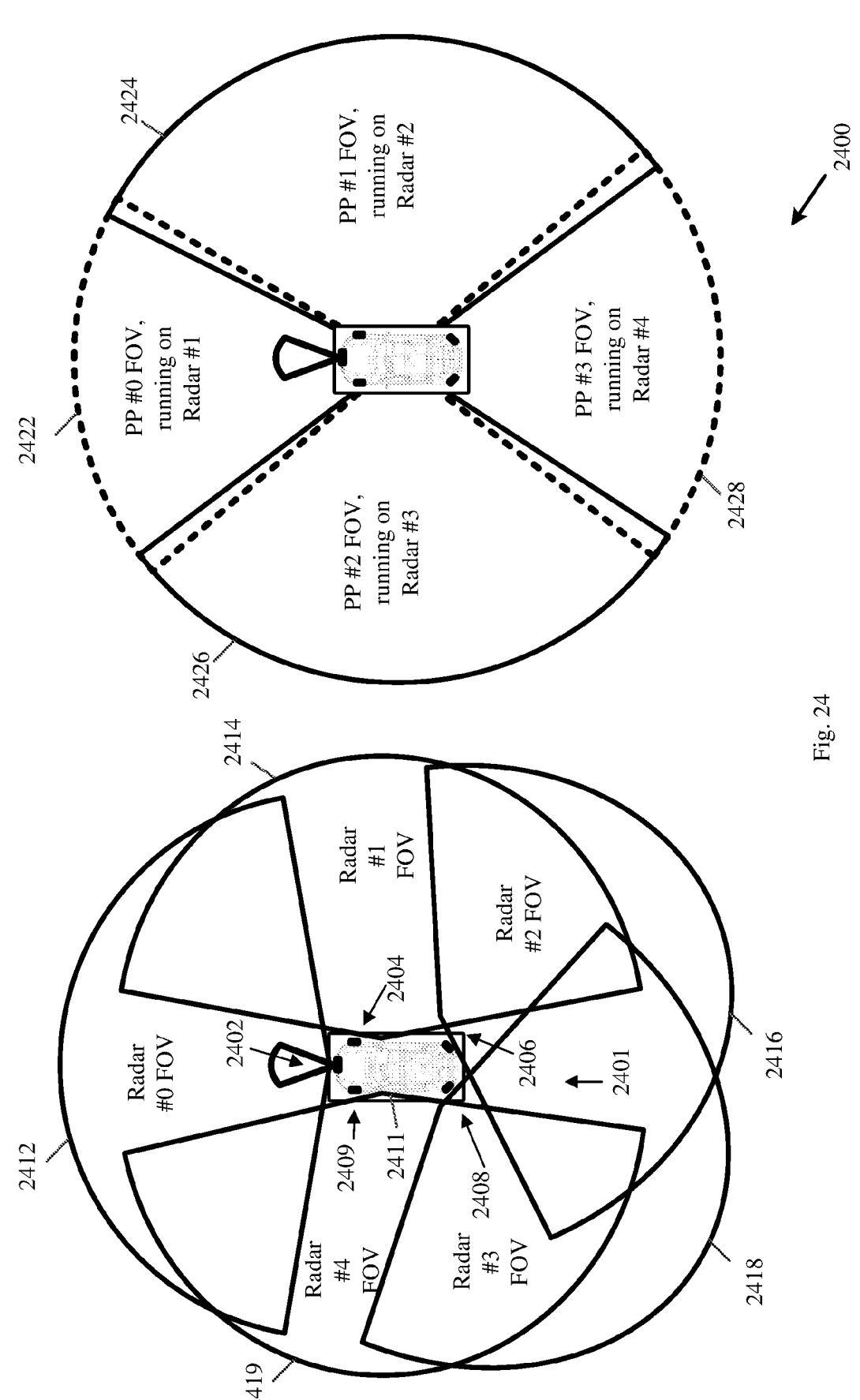
FIG. 24 is a schematic illustration of a distributed PP allocation scheme to allocate a plurality of PP FoVs to a plurality of PP devices, in accordance with some demonstrative aspects.

Reference is made to FIG. 24, which schematically illustrates a distributed PP allocation scheme 2400 to allocate a plurality of PP FoVs to a plurality of PP devices, e.g., as described below.

In some demonstrative aspects, distributed PP allocation scheme 2400 may be configured as a FoV based PP allocation scheme, e.g., as described below.

In some demonstrative aspects, as shown in FIG. 24, a vehicle 2411 may include a radar system 2401 including the plurality of radar devices. For example, radar system 2200 (FIG. 22) may include one or more elements of radar system 2401, and/or may perform one or more operations and/or functionalities of radar system 2401.

In some demonstrative aspects, as shown in FIG. 24, radar system 2401 may include a front radar device 2402 having a "local" Radar FoV 2412, denoted "RADAR #0 FOV".

In some demonstrative aspects, as shown in FIG. 24, radar system 2401 may include a first corner radar device 2404 having a "local" Radar FoV 2414, denoted "RADAR #1 FOV".

In some demonstrative aspects, as shown in FIG. 24, radar system 2401 may include a second corner radar device 2406 having a "local" Radar FoV 2416, denoted "RADAR #2 FOV".

In some demonstrative aspects, as shown in FIG. 24, radar system 2401 may include a third corner radar device 2408 having a "local" Radar FoV 2418, denoted "RADAR #3 FOV".

In some demonstrative aspects, as shown in FIG. 24, radar system 2401 may include a fourth corner radar device 2409 having a "local" Radar FoV 2419, denoted "RADAR #4 FOV".

In one example, radar device 2402, radar device 2404, radar device 2406, radar device 2408, and/or radar device 2409 may be configured to perform one or more functionalities of, and/or may include one or more elements of, a radar device of radar system 2200 (FIG. 22), e.g., radar device 2202 (FIG. 22).

In some demonstrative aspects, as shown in FIG. 24, radar system 2401 may include five radar devices.

In other aspects, radar system 2401 may include any other count of radar devices.

In some demonstrative aspects, radar transmissions of radar device 2402, radar device 2404, radar device 2406, radar device 2408, and/or radar device 2409 may be scheduled based on the local radar FoV 2412, the local radar FoV 2414, the local radar FoV 2416, the local radar FoV 2418, and/or the local radar FoV 2419. In one example, radar transmissions of radar device 2402, radar device 2404, radar device 2406, radar device 2408, and/or radar device 2409 may be scheduled according to a burst scheduling scheme, e.g., as described above with reference to FIG. 16, FIG. 17, and/or FIG. 18. In other aspects, radar transmissions of radar device 2402, radar device 2404, radar device 2406, radar device 2408, and/or radar device 2409 may be scheduled according to any other scheduling scheme.

In some demonstrative aspects, as shown in FIG. 24, distributed PP allocation scheme 2400 may be configured to divide a 360-degrees area surrounding the vehicle 2411 into a plurality of PP-FoVs, e.g., as described below.

In some demonstrative aspects, as shown in FIG. 24, the plurality of PP FoVs may include four PP FoVs.

In some demonstrative aspects, a count of the plurality of PP-FoVs, e.g., four, may be is less than a count of the plurality of radar devices, e.g., five.

In other aspects, the plurality of PP FoVs may include any other count of PP FoVs.

In some demonstrative aspects, at least one pair of neighboring PP FoVs may be defined to have some overlap, e.g., a small overlap, at edges between the neighboring PP-FoVs. For example, the small overlap between neighboring PP FoVs may provide a technical solution to increase an accuracy of PP radar information generated based on radar post processing.

In some demonstrative aspects, as shown in FIG. 24, the plurality of PP FoVs may include a first PP FoV 2422, denoted "PP #0 FOV", a second PP FoV 2424, denoted "PP #1 FOV", a third PP FoV 2428, denoted "PP #2 FOV", and/or a fourth PP FoV 2426, denoted "PP #3 FOV".

In some demonstrative aspects, as shown in FIG. 24, PP allocation scheme 2400 may allocate the plurality of PP FoVs, e.g., four PP FoVs, to a plurality of PP devices, e.g., four PP devices.

In some demonstrative aspects, as shown in FIG. 24, distributed PP allocation scheme 2400 may allocate PP FoV 2422 to a first PP device, e.g., the radar device 2404.

In some demonstrative aspects, as shown in FIG. 24, distributed PP allocation scheme 2400 may allocate PP FoV 2424 to a second PP device, e.g., the radar device 2406.

In some demonstrative aspects, as shown in FIG. 24, distributed PP allocation scheme 2400 may allocate PP FoV 2428 to a third PP device, e.g., radar device 2409.

In some demonstrative aspects, as shown in FIG. 24, distributed PP allocation scheme 2400 may allocate PP FoV 2426 to a fourth PP device, e.g., radar device 2408.

In some demonstrative aspects, as shown in FIG. 24, distributed PP allocation scheme 2400 may not allocate a PP FoV to the radar device 2402.

In some demonstrative aspects, the plurality of PP devices may include radar device 2404, radar device 2406, radar device 2408, and/or radar device 2409. For example, the plurality of PP devices may exclude radar device 2402.

In one example, radar device 2402 may require a relatively large amount computing resources to determine radar detection information of radar FoV 2412. For example, radar device 2402 may determine radar detection information of radar FoV 2412 according to an ALGO-PHY compute phase, e.g., ALGO-PHY compute phase 2104 (FIG. 21). For example, the computing resources for determining the radar detection information of radar FoV 2412 may be relatively high, for example, compared to the computer resources required for determining radar detection information for the local radar FoV at other radar devices, e.g., radar device 2404, radar device 2406, radar device 2408, and/or radar device 2409. Accordingly, a large amount, or even all, of the computing resources of radar device 2402 may be made available for determining the radar detection information of radar FoV 2412, while a small amount, or even no, computing resources of radar device 2402 may be available for post-processing at radar device 2402. For example, post processing of the radar detection information of radar FoV 2412 may be moved to one or more other radar devices, e.g., radar device 2404.

In some demonstrative aspects, distributed PP allocation scheme 2400 may allocate one or more PP data-provider devices, e.g., radar device 2402, to the first PP device, e.g., radar device 2404.

For example, the PP FoV 2422, which is allocated to radar device 2404, may include the local radar FoV 2412 of radar device 2402.

In some demonstrative aspects, a baseband processor of radar device 2404 may be configured to perform PP of radar detection information corresponding to the PP FoV 2422.

For example, the baseband processor of radar device 2404 may be configured to generate PP radar information for the PP FoV 2422, for example, by processing radar detection information of the radar FoV 2412, e.g., from radar device 2402. For example, the baseband processor of radar device 2404 may be configured to generate PP radar information for the PP FoV 2422, for example, based on a list of detections of radar device 2402.

In one example, the baseband processor of radar device 2404 may be configured to generate PP radar information for the PP FoV 2422, for example, by processing radar detection information from one or more other radar devices, e.g., based on an overlap between the PP FoV 2422 and one or more other PP FoVs. For example, the baseband processor of radar device 2404 may be configured to generate PP radar information for the PP FoV 2422, for example, by processing radar detection information of the radar FoV 2412, e.g., from radar device 2402, radar detection information of the radar FoV 2414, e.g., from radar device 2404, and/or radar detection information of the radar FoV 2419, e.g., from radar device 2409.

In some demonstrative aspects, distributed PP allocation scheme 2400 may allocate one or more PP data-provider devices, e.g., radar devices 2402, 2404, and/or 2406, to the second PP device, e.g., radar device 2406.

For example, the PP FoV 2424, which is allocated to radar device 2406, may at least partially overlap with the local radar FoV 2412 of radar device 2402, the local radar FoV 2414 of radar device 2404, and/or the local radar FoV 2416 of radar device 2406.

For example, the PP FoV 2424, which is allocated to radar device 2406, may at least partially overlap with the PP FoV 2422, which is allocated to radar device 2404, and/or the PP FoV 2426, which is allocated to radar device 2408.

In some demonstrative aspects, a baseband processor of radar device 2406 may be configured to perform PP of radar detection information corresponding to the PP FoV 2424.

For example, the baseband processor of radar device 2406 may be configured to generate PP radar information for the PP FoV 2424, for example, by processing radar detection information of the radar FoV 2412, e.g., from radar device 2402, radar detection information of the radar FoV 2414, e.g., from radar device 2404, and/or radar detection information of the radar FoV 2416, e.g., from radar device 2406. For example, the baseband processor of radar device 2406 may be configured to generate PP radar information for the PP FoV 2424, for example, based on a list of detections of radar device 2402, a list of detections of radar device 2404, and/or a list of detections of radar device 2406.

In some demonstrative aspects, distributed PP allocation scheme 2400 may allocate one or more PP data-provider devices, e.g., radar devices 2406 and/or 2408, to the third PP device, e.g., radar device 2409.

For example, the PP FoV 2428, which is allocated to radar device 2409, may at least partially overlap with the PP FoV 2422, which is allocated to radar device 2404, and/or the PP FoV 2426, which is allocated to radar device 2408.

In some demonstrative aspects, a baseband processor of radar device 2409 may be configured to perform PP of radar detection information corresponding to the PP FoV 2428.

For example, the baseband processor of radar device 2409 may be configured to generate PP radar information for the PP FoV 2428, for example, by processing radar detection information of the radar FoV 2416, e.g., from radar device 2406, and/or radar detection information of the radar FoV 2418, e.g., from radar device 2408. For example, the baseband processor of radar device 2409 may be configured to generate PP radar information for the PP FoV 2428, for example, based on a list of detections of radar device 2406, and/or a list of detections of radar device 2408.

In some demonstrative aspects, distributed PP allocation scheme 2400 may allocate one or more PP data-provider devices, e.g., radar devices 2402, 2408, and/or 2409, to the fourth PP device, e.g., radar device 2408.

For example, the PP FoV 2426, which is allocated to radar device 2408, may at least partially overlap with the PP FoV

2424, which is allocated to radar device 2406, and/or the PP FoV 2428, which is allocated to radar device 2409.

In some demonstrative aspects, a baseband processor of radar device 2408 may be configured to perform PP of radar detection information corresponding to the PP FoV 2426.

For example, the baseband processor of radar device 2408 may be configured to generate PP radar information for the PP FoV 2426, for example, by processing radar detection information of the radar FoV 2412, e.g., from radar device 2402, radar detection information of the radar FoV 2418, e.g., from radar device 2408, and/or radar detection information of the radar FoV 2419, e.g., from radar device 2409. For example, the baseband processor of radar device 2408 may be configured to generate PP radar information for the PP FoV 2426, for example, based on a list of detections of radar device 2402, a list of detections of radar device 2408, and/or a list of detections of radar device 2409.

In some demonstrative aspects, as shown in FIG. 24, PP FoV 2422, which may be assigned to radar device 2404, may be smaller compared to the other PP FoVs. For example, the definition of the "front facing" PP FoV 2422 to cover a smaller FoV, may accommodate more processing power per area unit of PP FoV 2422, e.g., as PP FoV 2422 may be directed to a front facing area, which may be more critical to an AV algorithm.

Reference is made to FIG. 25, which schematically illustrates a method of processing radar data, in accordance with some demonstrative aspects. For example, one or more of the operations of the method of FIG. 25 may be performed by a radar device, e.g., radar device 101 (FIG. 1), radar device 800 (FIG. 8), radar device 910 (FIG. 9), radar devices 2202, 2204, 2206, and/or 2208 (FIG. 22), radar devices 2302, 2304, 2306, and/or 2308 (FIG. 23), and/or radar devices 2402, 2404, 2406, 2408, and/or 2409 (FIG. 23); a radar frontend, e.g., radar frontend 2208 (FIG. 22); a communication interface, e.g., communication interface 2224 (FIG. 22); and/or a baseband processor, e.g., baseband processors 2230, 2247, 2267, and/or 2277 (FIG. 22).

As indicated at block 2502, the method may include processing radar data by performing post-processing of radar detection information according to a distributed PP allocation scheme configured to allocate one or more PP data-provider devices to a PP device. For example, the plurality of radar devices 2202, 2204, 2206 and/or 2208 (FIG. 22) may perform post-processing of radar detection information according to the distributed PP allocation scheme, e.g., as described above.

As indicated at block 2504, processing the radar data may include communicating radar signals of the PP device. For example, RF frontend 2222 (FIG. 22) may communicate radar signals 2221 (FIG. 22) of the radar device 2202 (FIG. 22), e.g., as described above.

As indicated at block 2508, processing the radar data may include generating radar detection information of the PP device, based on the radar signals of the PP device. For example, baseband processor 2230 (FIG. 22) may be configured to generate the radar detection information 2236 (FIG. 22) of radar device 2202 (FIG. 22), for example, based on the radar signals 2221 (FIG. 22) of radar device 2202 (FIG. 22), e.g., as described above.

As indicated at block 2506, post-processing the radar detection information according to the distributed PP allocation scheme may include receiving radar detection information from the one or more PP data-provider devices according to the distributed PP allocation scheme. For example, communication interface 2224 (FIG. 22) may receive radar detection information 2226 (FIG. 22) from the one or more PP data-provider devices according to the distributed PP allocation scheme, e.g., as described above.

As indicated at block 2510, post-processing the radar detection information according to the distributed PP allocation scheme may include generating PP radar information by processing the radar detection information from the one or more PP data-provider devices. For example, baseband processor 2230 (FIG. 22) may generate PP radar information 2238 (FIG. 22), for example, by processing the radar detection information 2226 (FIG. 22) from the one or more PP data-provider devices, e.g., as described above.

In some demonstrative aspects, as indicated by arrow 2511, generating the PP radar information by processing the radar detection information from the one or more PP data-provider devices may include generating the PP radar information by processing the radar detection information of the PP device, e.g., if the PP device is allocated as part of the PP data-provider devices for post processing by the PP device. In other aspects, generating the PP radar information by processing the radar detection information from the one or more PP data-provider devices may include generating the PP radar information by excluding the radar detection information of the PP device, e.g., if the PP device is excluded from the PP data-provider devices for post processing by the PP device.

Referring to FIG. 9, in some demonstrative aspects, the plurality of radar devices 910 may be configured according to different Key Performance Indicator (KPI) requirements, e.g., as described below.

In one example, the KPI requirements of a radar device may include a maximal detection range, a maximal velocity, and/or an AoA detection and/or resolution. The KPI requirements of the radar device may include any other additional or alternative KPI requirements.

In some demonstrative aspects, the KPI requirements may be defined for a radar device 910, for example, based on a location and/or position of the radar device, and/or a field of view to be covered by the radar device. In one example, there may be different requirements for the radar devices 910, for example, based on the locations of the radar devices around vehicle 900, based on the field of view to be covered by the radar devices 910, and/or based on any other additional or alternative criteria.

In some demonstrative aspects, one or more first KPI requirements of a first radar device 910, which may be located at a first position on vehicle 900, may be different from one or more second KPI requirements of a second radar device, which may be located at a second position on vehicle 900.

For example, a front radar device, e.g., front radar device 902, may support one or more first KPI requirements, while a corner radar device, e.g., corner radar device 912, may support one or more second KPI requirements, which may be different from the first KPI requirements.

In one example, a front radar device, e.g., front radar device 902, may be required to support a first detection range, e.g., a detection range of up to 210 meters (m) or any other range, while a corner radar device, e.g., corner radar device 912, may be required to support a second detection range, which may be shorter than the first detection range, e.g., a detection range of up to 160 m or any other range.

In some demonstrative aspects, the KPI requirements of a radar device 910 may be based on an application, which may use radar information generated by the radar device 910.

For example, a first radar device 910 configured for a first driver assistance application, e.g., an adaptive cruise control application, may have first KPI requirements, while a second radar device 910 configured for a second diver assistance application, e.g., driving in a dense urban environment, may have second KPI requirements.

In some demonstrative aspects, a radar device may be configured to support higher and/or better KPI requirements, for example, by configuring the radar device to include a larger radar antenna array, e.g., using a larger number of RFICs.

In some demonstrative aspects, a radar device may be configured to support higher and/or better KPI requirements, for example, by configuring the radar device to include a baseband processor with improved capabilities, e.g., using a higher number of compute engines, a higher number of DPSs, a larger memory, and the like.

In some demonstrative aspects, for example, in some use cases, scenarios, and/or implementations, there may be one or more disadvantages, inefficiencies, and/or technical problems in implementing a single baseband processor configuration, which is configured to support preset KPI requirements, as part of radar devices or systems, which may have KPI requirements different from the preset KPI requirements.

In one example, the single baseband processor configuration may be configured to support a preset maximal radar array size.

For example, an implementation of a single baseband processor configuration, which is configured to support high-end KPI requirements, may not be efficient, for example, for radar devices having KPI requirements, which are lower than the high-end KPI requirements.

In one example, it may be inefficient to implement the single baseband processor configuration, which is configured to support high-end KPI requirements, for a "basic" radar device, which is not required to support the high-end KPIs. For example, such an implementation may result in the basic radar device being unnecessarily expensive, and/or having unnecessary high power consumption.

In some demonstrative aspects, for example, in some use cases, scenarios, and/or implementations, there may be one or more disadvantages, inefficiencies, and/or technical problems in implementing a plurality of different preconfigured baseband processors, which may be preconfigured to support different preset KPI requirements, e.g., as described below.

For example, it may be inefficient to implement a "family" of System on Chip (SoC) devices, each including preconfigured baseband processors designed to meet different KPI requirements. For example, such an implementation may result in high development and/or production costs.

Figure 26:
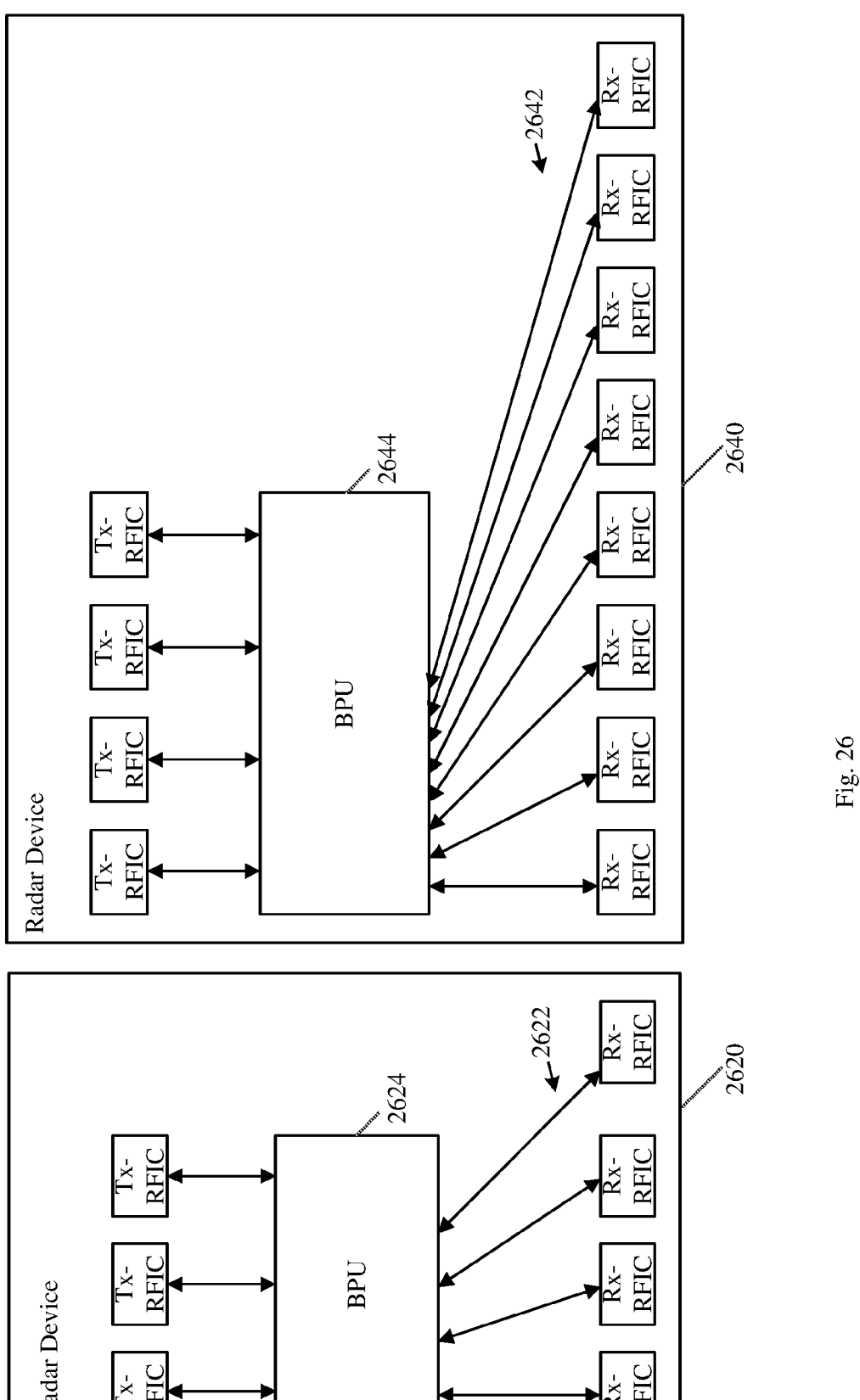
FIG. 26 is a schematic illustration of a first radar device and a second radar device, to demonstrate a technical problem, which may be addressed in accordance with some demonstrative aspects.

Reference is made to FIG. 26, which schematically illustrates a first radar device 2620 and a second radar device 2640, to demonstrate a technical problem, which may be addressed in accordance with some demonstrative aspects.

In one example, the first radar device 2620 may have first KPI requirements, e.g., basic KPI requirements, and the second radar device 2640 may have second KPI requirements, e.g., improved KPI requirements, which may be higher than the basic KPI requirements.

For example, the first radar device 2620 may be configured as a corner radar device, e.g., radar device 912 (FIG. 9), and/or the second radar device 2640 may be configured as a front radar device, e.g., radar device 902 (FIG. 9).

As shown in FIG. 26, radar device 2620 may include a first baseband processor 2624, and a first plurality of RFICs 2622, e.g., including Tx RFICs and Rx RFICs.

As shown in FIG. 26, radar device 2640 may include a second baseband processor 2644, and a second plurality of RFICs 2642, e.g., including Tx RFICs and Rx RFICs.

For example, baseband processor 2644 may have improved capabilities, e.g., compared to the capabilities of baseband processor 2624. For example, baseband processor 2644 may include a higher number of digital processing components, e.g., a higher number of FFT engines, a higher number of DSP engines, and/or the like, for example, to support the improved KPI requirements of radar device 2640.

As shown in FIG. 26, the count of RFICs 2642 may be greater than the count of RFICs 2622, for example, to support a larger antenna array, which may be required to support the improved KPI requirements of radar device 2640.

As shown in FIG. 26, radar device 2620 may include four Rx-RFIC chips and three Tx-RFIC chips, which may form a virtual array of antenna elements, for example, a virtual array of 192 antenna elements for an implementation including 16 Rx channels and 12. Tx channels, e.g., 4 channels per RFIC. Any other count and/or configuration of RFIC chips, Rx channels, Tx channels and/or antenna elements, may be implemented.

As shown in FIG. 26, radar device 2640 may include eight Rx-RFIC chips and four Tx-RFIC chips, which may form a virtual array of antenna elements, e.g., a virtual array of 512 antenna elements for an implementation including 32 Rx channels and 16. Tx channels, e.g., 4 channels per RFIC. Any other count and/or configuration of RFIC chips, Rx channels, Tx channels and/or antenna elements, may be implemented.

For example, implementing different baseband processor configurations, e.g., baseband processors 2624 and 2644, to support different radar devices, e.g., having different KPI requirements, may complicate a manufacturing process of the baseband processors, and/or an implementation of the baseband processors in the radar devices.

In some demonstrative aspects, radar devices 2620 and 2640 may be implemented utilizing a modular radar system architecture, which may allow using a same BPU configuration to support radar devices, e.g., radar devices 2620 and 2640, having different capabilities, for example, according to different KPI requirements, e.g., as described below.

In some demonstrative aspects, radar device 2620 may be configured to implement a first count of BPUs, e.g., one BPU or more than one BPU, and radar device 2640 may be configured to implement a second count of BPUs, e.g., two or more BPUs, e.g., as described below.

Referring back to FIG. 9, vehicle 900 may be configured according to a technical solution of a low-cost and/or a low-power radar system architecture, which may support different radar device configurations and/or capabilities, e.g., having different KPIs, as described below.

In some demonstrative aspects, vehicle 900 may be configured to implement a modular radar system architecture including one or more baseband processors, e.g., of a same configuration, and one or more RFICs, e.g., of a same configuration, in a way which may support different configurations of radar devices, for example, based on different KPI requirements, e.g., as described below.

In some demonstrative aspects, vehicle 900 may include and/or may support a modular radar system architecture, e.g., as described below.

In some demonstrative aspects, the modular radar system architecture may support a technical solution to implement radar devices 910 using a configurable number of baseband processors and/or RFICs, for example, based on KPI requirements of the radar devices 910, e.g., as described below.

In some demonstrative aspects, the modular radar system architecture may support a technical solution to interconnect multiple BPU chips, for example, to achieve a combined higher digital signal processing power, e.g., as described below.

In some demonstrative aspects, the modular radar system architecture may support a technical solution to utilize a BPU chip, e.g., a single "basic" or "modular" BPU chip, which may be suitable for radar devices having relatively low KPI requirements, e.g., "basic KPI requirements", e.g., as described below.

In some demonstrative aspects, the modular radar system architecture may support a technical solution to interconnect multiple BPU chips, e.g., wherein each of the multiple BPU chips may include the basic/modular PBU chip, in order to provide a "combined" BPU configuration to support radar devices having higher KPI requirements, e.g., as described below.

In some demonstrative aspects, the modular radar system architecture may support interconnecting the multiple BPU chips, and/or connecting the multiple BPU chips with multiple RFICs, for example, such that a BPU chip, e.g., each BPU chip, may be able to work mostly independently, e.g., as described below.

In some demonstrative aspects, the modular radar system architecture may support interconnecting the multiple BPU chips, and/or connecting the multiple BPU chips with multiple RFICs, for example, even without involving massive data transfer between the multiple BPU chips, e.g., as described below.

In some demonstrative aspects, the modular radar system architecture may provide a technical solution allowing to instantiate BPU chips with actual required capabilities of a radar device implementing the BPU chips, for example, while using only a required amount of digital signal processing components, memories, and/or RFICs, e.g., as described below.

In some demonstrative aspects, the modular radar system architecture may provide a technical solution to reduce cost, area, and/or power consumption of radar devices and/or sensors with low, e.g., basic, KPI requirements.

In some demonstrative aspects, the ability to utilize BPU chips with the actual required capabilities of a radar device implementing the BPU chips may provide a technical solution to reduce a total cost of a radar system utilizing radar devices with different KPI requirements, e.g., a 360-degrees radar system, as described below.

In some demonstrative aspects, the ability to utilize BPU chips with the actual required capabilities of a radar device implementing the BPU chips may provide a technical solution to support future scaling of a radar device, for example, to an even higher radar sensor performance, using a same chipset, for example, by interconnecting one or more additional BPU chips.

In some demonstrative aspects, the modular radar system architecture may provide a technical solution having minimal effect on development efforts and/or production costs of radar devices.

In some demonstrative aspects, vehicle 900 may implement a radar system architecture including a plurality of radar device utilizing different numbers of BPUs and/or RFICs, e.g., as described below.

In some demonstrative aspects, vehicle 900 may include a first radar device including one or more first baseband processors connected to a first plurality of RFICs, and a second radar device including a plurality of second baseband processors connected to a second plurality of RFICs, e.g., as described below.

In some demonstrative aspects, a count of baseband processors in the second plurality of baseband processors may be different from a count of baseband processors in the one or more first baseband processors, e.g., as described below.

In some demonstrative aspects, vehicle 900 may include a first radar device including a first plurality of baseband processors, connected to a first plurality of RFICs; and/or a second radar device including a second plurality of baseband processors connected to a second plurality of RFICs, e.g., as described below.

In some demonstrative aspects, a count of baseband processors in the second plurality of baseband processors may be different from a count of baseband processors in the first plurality of baseband processors, e.g., as described below.

In one example, the first radar device may include radar device 912, and/or the second radar device may include radar device 902. According to this example, radar device 912 may include one or more first baseband processors connected one or more first RFICs, and/or radar device 902 may include a plurality of second baseband processors. For example, the count of the plurality of second baseband processors of radar device 902 may be greater than the count of the one or more second baseband processors of the radar device 912, and/or the count of the plurality of second RFICs of the radar device 902 may be greater than the count of the one or more second RFICs of the radar device 912.

In one example, radar device 902 may include 3 baseband processors and 12 RFICs, and/or radar device 912 may include 1 baseband processor and 4 RFICs. In other aspects, any other number of baseband processors and/or RFICs may be implemented.

In another example, a vehicle, e.g., vehicle 900, may implement a radar system architecture including two BPUs for a front radar, e.g., front radar 902, and one BPU for a corner radar, e.g., corner radars 912, 914, 916 and/or 918. In one example, the BPUs of the radar devices 902, 912, 914, 916 and/or 918 may be configured to have substantially the same BPU capabilities. For example, each of the BPUs of the radar devices 902, 912, 914, 916 and/or 918 may be configured to have BPU capabilities which are about half of the compute capabilities of a single BPU to support KPI requirements of the radar device 902. According to this example, the corner radar 912 may use a single board, which may reduce the cost, area and/or power consumption, e.g., by ~40%, e.g., compared to an implementation using a fixed-BPU configuration with two boards.

Figure 27:
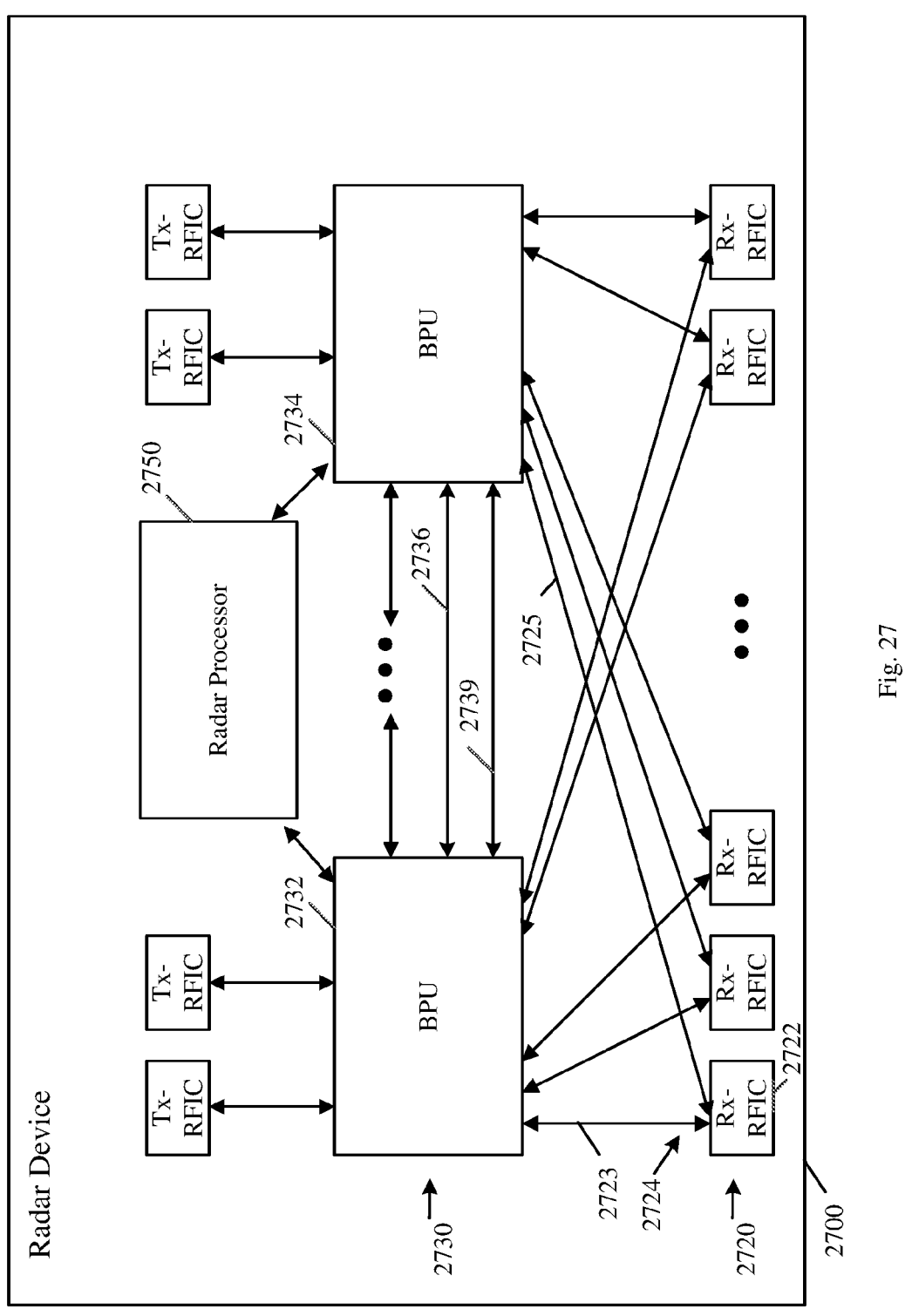
FIG. 27 is a schematic illustration of a radar device, in accordance with some demonstrative aspects.

Reference is made to FIG. 27, which schematically illustrates a radar device 2700, in accordance with some demonstrative aspects. For example, radar device 101 (FIG. 1), radar device 300 (FIG. 3), radar device 400 (FIG. 4), radar device 800 (FIG. 8), radar device 910 (FIG. 9), radar device 1002 (FIG. 10), radar device 1100 (FIG. 11), RU 1910 (FIG. 19), and/or radar device 2202 (FIG. 22), may include one or more elements of radar device 2700, and/or may perform one or more operations and/or functionalities of radar device 2700.

In some demonstrative aspects, as shown in FIG. 27, radar device 2700 may include a plurality of baseband processors 2730, e.g., as described below.

In some demonstrative aspects, as shown in FIG. 27, radar device 2700 may include a plurality of RFICs 2720, e.g., as described below.

In some demonstrative aspects, as shown in FIG. 27, radar device 2700 may include a plurality of Rx-RFIC chips 2720, and a plurality of Tx-RFIC chips.

In some demonstrative aspects, Rx-RFIC chips 2720 may be configured to handle a respective plurality of Rx channels.

In other aspects, some or all of the Rx-RFIC chips 2720 may be implemented by an integrated Rx-RFIC chip which may be configured to handle a plurality of Rx channels. For example, an integrated Rx-RFIC chip may be configured to handle two or more Rx channels. In one example, an integrated Rx-RFIC chip may be configured to handle the entire Rx channel used for communication by the radar device 2700.

In some demonstrative aspects, the Tx-RFIC chips may be configured to handle a respective plurality of Tx channels.

In other aspects, some or all of the Tx-RFIC chips may be implemented by an integrated Tx-RFIC chip which may be configured to handle a plurality of Tx channels.

For example, an integrated Tx-RFIC chip may be configured to handle two or more Tx channels. In one example, an integrated Tx-RFIC chip may be configured to handle the entire Tx channel used for communication by the radar device 2700.

In some demonstrative aspects, as shown in FIG. 27, radar device 2700 may implement separate Rx-RFIC and Tx-RFIC chips.

In other aspects, radar device 2700 may implement an integrated Rx-Tx RFIC chip, which may implement functionality of one or more of the Rx-RFIC chips 2720 and one or more of the Tx-RFIC chips.

In other aspects, radar device 2700 may include any other architecture and/or implementation of the Rx-RFIC chips 2720 and/or Tx-RFIC chips.

In some demonstrative aspects, the plurality of RFICs 2720 may be configured to generate radar data corresponding to a plurality of range-bins, e.g., as described below. For example, the radar data corresponding to the plurality of range-bins may include RFIC processed data processed by the RFICs, e.g., according to any suitable range processing and/or any other RFIC processing. For example, the radar data corresponding to the plurality of range-bins may include post-range-processing data (also referred to as "RFIC processed data", "range-processed data" or "range-based data") generated according to the range processing.

In some demonstrative aspects, the plurality of RFICs 2720 may be configured to communicate the radar data to the plurality of baseband processors 2730, for example, according to a range-based processor allocation scheme (also referred to as "per-processor-range-based allocation scheme"), e.g., as described below.

In some demonstrative aspects, the range-based processor allocation scheme may be configured to allocate the plurality of range-bins to the plurality of baseband processors 2730, e.g., as described below.

In some demonstrative aspects, the range-based processor allocation scheme may include, for example, an equal allocation of the plurality of range-bins between the plurality of baseband processors 2730, e.g., as described below.

In other aspects, the range-based processor allocation scheme may include any other allocation scheme, e.g., an allocation scheme including an unequal allocation of the plurality of range-bins between the plurality of baseband processors 2730.

In some demonstrative aspects, an RFIC of the plurality of RFICs 2720 may be configured to generate radar data of the RFIC corresponding to the plurality of range-bins, for example, based on radar signals processed by the RFIC, e.g., as described below.

In some demonstrative aspects, the RFIC of the plurality of RFICs 2720 may be configured to provide the radar data of the RFIC to the plurality of baseband processors 2730 according to the range-based processor allocation scheme, for example, by providing to a baseband processor of the plurality of baseband processors, radar data corresponding to range-bins allocated to the baseband processor, e.g., as described below.

In some demonstrative aspects, an RFIC 2722 may be configured to provide radar data of RFIC 2722 to the plurality of baseband processors 2730 according to the range-based processor allocation scheme, for example, by providing to a baseband processor 2732 of the plurality of baseband processors 2730 radar data corresponding to range-bins allocated to the baseband processor 2732, e.g., as described below.

In some demonstrative aspects, each RFIC of the plurality of RFICs 2720 may be configured to provide to the baseband processor 2732 radar data corresponding to the range-bins allocated to the baseband processor 2732, e.g., as described below.

In some demonstrative aspects, the RFIC 2722 may be connected to a plurality of Rx antenna elements.

In some demonstrative aspects, the RFIC 2722 may generate the radar data of RFIC 2722, for example, based on radar signals received via the plurality of Rx antennas.

For example, the RFIC 2722 may be connected to the plurality of Rx antenna elements 816 (FIG. 8), and RFIC 2722 may generate the radar data of the RFIC 2722, for example, based on the radar signals received via the plurality of Rx antennas 816 (FIG. 8).

In some demonstrative aspects, the RFIC 2722 may include a plurality of outputs 2724 connected to the plurality of baseband processors 2730, respectively, e.g., as described below.

In some demonstrative aspects, the plurality of baseband processors 2730 may include a first baseband processor and a second baseband processor. For example, the plurality of baseband processors 2730 may include a first baseband processor 2732 and a second baseband processor 2734.

In some demonstrative aspects, the plurality of baseband processors 2730 may include two baseband processors, e.g., as shown in FIG. 27. In other aspects, the plurality of baseband processors 2730 may include any other number of baseband processors, e.g., three, four, or even more baseband processors.

In some demonstrative aspects, RFIC 2722 may be configured to provide to baseband processor 2732 first radar data 2723 corresponding to a first plurality of range-bins allocated to baseband processor 2732, e.g., as described below.

In some demonstrative aspects, RFIC 2722 may be configured to provide to baseband processor 2734 second radar data 2725 corresponding to a second plurality of range-bins allocated to baseband processor 2734, e.g., as described below.

In some demonstrative aspects, the second plurality of range-bins may be different from the first plurality of range-bins, e.g., as described below.

In some demonstrative aspects, the plurality of range-bins implemented by radar device 2700 may be equally divided between the baseband processors 2732 and 2734, e.g., as described below.

In some demonstrative aspects, a count of range-bins in the first plurality of range-bins may be equal to a count of range-bins in the second plurality of range-bins, e.g., as described below.

In other aspects, the count of range-bins in the first plurality of range-bins may not be equal to the count of range-bins in the second plurality of range-bins.

In some demonstrative aspects, the first plurality of range-bins may include even numbered range-bins, and/or the second plurality of range-bins may include odd-numbered range-bins, e.g., as described below.

In some demonstrative aspects, the first plurality of range-bins may include a first sequence of consecutive range-bins, and/or the second plurality of range-bins may include a second sequence of consecutive range-bins, e.g., as described below.

In other aspects, any other allocation scheme may be applied, for example, to allocate the plurality of range-bins between baseband processors 2732 and 2734.

In some demonstrative aspects, a baseband processor of the plurality of baseband processors 2730, e.g., each of the baseband processors 2730, may be configured to receive from the plurality of RFICs 2720 radar data corresponding to range-bins allocated to the baseband processor, e.g., as described below.

In some demonstrative aspects, baseband processor 2732 may be configured to receive from the plurality of RFICs 2720 radar data corresponding to range-bins allocated to the baseband processor 2732. For example, baseband processor 2732 may receive from RFIC 2722 radar data corresponding to range-bins allocated to the baseband processor 2732, for example, via a first output of the plurality of outputs 2724.

In some demonstrative aspects, baseband processor 2734 may be configured to receive from the plurality of RFICs 2720 radar data corresponding to range-bins allocated to the baseband processor 2734. For example, baseband processor 2734 may receive from RFIC 2722 radar data corresponding to range-bins allocated to the baseband processor 2734, for example, via a second output of the plurality of outputs 2724.

In some demonstrative aspects, baseband processor 2732 may be configured to generate a target detection list, for example, based on the radar data from the plurality of RFICs 2720 corresponding to the range-bins allocated to the baseband processor 2732, e.g., as described below.

In some demonstrative aspects, baseband processor 2734 may be configured to generate a target detection list, for example, based on the radar data from the plurality of RFICs 2720 corresponding to the range-bins allocated to the baseband processor 2734, e.g., as described below.

In some demonstrative aspects, the plurality of baseband processors 2730 may be configured to exchange detection assistance information corresponding to range-bins allocated to the baseband processors 2730, e.g., as described below. The detection assistance information may include, for example, information to be used in, and/or to assist in, generating one or more radar detections. In one example, the detection assistance information corresponding to one or more range-bins may include information on detected energy corresponding to the one or more range-bins.

In some demonstrative aspects, baseband processor 2732 may be configured to receive from another baseband processor of the plurality of baseband processors 2730, e.g., a baseband processor 2734, detection assistance information corresponding to range-bins allocated to the other baseband processor, e.g., as described below.

In some demonstrative aspects, baseband processor 2732 may be configured to generate the target detection list corresponding to the range-bins allocated to the baseband processor 2732, for example, based on the detection assistance information from the other baseband processor, for example, baseband processor 2734, e.g., as described below.

In some demonstrative aspects, baseband processor 2732 may be configured to determine the target detection list corresponding to the range-bins allocated to the baseband processor 2732, for example, by applying Doppler processing, AoA processing, target detection processing, and/or any other processing, to the radar data from the plurality of RFICs 2720 corresponding to the range-bins allocated to the baseband processor 2732, e.g., as described below.

In some demonstrative aspects, baseband processor 2732 may be configured to determine one or more first target detections corresponding to the first plurality of range-bins, for example, based on radar data 2723 corresponding to the first plurality of range-bins from the plurality of RFICs 2720, e.g., as described below.

In some demonstrative aspects, baseband processor 2734 may be configured determine one or more second target detections corresponding to the second plurality of range-bins, for example, based on radar data 2725 corresponding to the second plurality of range-bins from the plurality of RFICs 2720, e.g., as described below.

In some demonstrative aspects, baseband processor 2732 may be configured to send to baseband processor 2734 detection assistance information 2736 corresponding to the first plurality of range-bins, e.g., as described below.

In some demonstrative aspects, baseband processor 2734 may be configured to determine the one or more second target detections, for example, based on the detection assistance information 2736 from baseband processor 2732 corresponding to the first plurality of range-bins, e.g., as described below.

In some demonstrative aspects, radar device 2700 may include a radar processor 2750 configured to generate a target detection list corresponding to the plurality of range-bins implemented by device 2700, for example, based on the one or more first target detections from baseband processor 2732 and/or the one or more second target detections from baseband processor 2734, e.g., as described below. For example, radar processor 834 (FIG. 8), controller 950 (FIG. 9), controller 1050 (FIG. 1), controller 1150 (FIG. 11), controller 1950 (FIG. 19), and/or radar processor 2250 (FIG. 22), may include one or more elements of radar processor 2750, and/or may perform one or more operations and/or functionalities of radar processor 2750.

In some demonstrative aspects, radar processor 2750 may be configured to determine and/or update the range-based processor allocation scheme, e.g., as descried below.

In some demonstrative aspects, radar processor 2750 may be configured to determine and/or update the range-based processor allocation scheme, for example, based on the radar data corresponding to the plurality of range-bins.

In some demonstrative aspects, radar processor 2750 may be configured to process detection information from the plurality of baseband processors 2730.

In some demonstrative aspects, radar processor 2750 may be configured to generate radar information based on the detection information from the plurality of baseband processors 2730.

In some demonstrative aspects, radar processor 2750 may be configured to perform post-processing (PP) of the detection information from the plurality of baseband processors 2730. In one example, radar processor 2750 may be configured to perform the PP of the detection information from the plurality of baseband processors 2730, for example, according to a distributed PP allocation scheme, e.g., as described above with reference to FIGS. 21, 22, 23, 24, and/or 25.

In other aspects, radar processor 2750 may be configured to perform the PP of the detection information from the plurality of baseband processors 2730 according to any other PP scheme.

In some demonstrative aspects, baseband processors 2730 may be configured to exchange Tx synchronization and/or scheduling information 2739, for example, to assist baseband processors 2730 in synchronizing and/or scheduling radar transmissions to be performed by the Tx-RFIC chips associated with the baseband processors 2730.

In one example, the Tx synchronization and/or scheduling information 2739 may include Tx waveform information of one or more Tx waveforms to be communicated by the Tx-RFIC chips associated with the baseband processors 2730.

In another example, the Tx synchronization and/or scheduling information 2739 may include radio resource information of a radio resource allocation for Tx radar signals to be communicated by the Tx-RFIC chips associated with the baseband processors 2730.

In another example, the Tx synchronization and/or scheduling information 2739 may include time synchronization (syn) information to synchronize a time of the Tx radar signals to be communicated by the Tx-RFIC chips associated with the baseband processors 2730.

In other aspects, the Tx synchronization and/or scheduling information 2739 may include any other additional or alternative information to assist in coordination and/or synchronization of the Tx radar signals to be communicated by the Tx-RFIC chips associated with the baseband processors 2730.

In other aspects, radar processor 2750 may be configured to perform coordination and/or synchronization of the Tx radar signals to be communicated by the Tx-RFIC chips associated with the baseband processors 2730.

In some demonstrative aspects, a radar device may include RFICs interconnected to two baseband processors, e.g., as described above. In other aspects, any other number of BPUs and/or RFICs may be used. For example, a BPU, e.g., each BPU, may be connected either to a maximal number of RFICs supported by its HW, or to less RFICs. This implementation may allow a modular, scalable, power-optimized and cost-optimized solution for the radar device.

Figure 28:
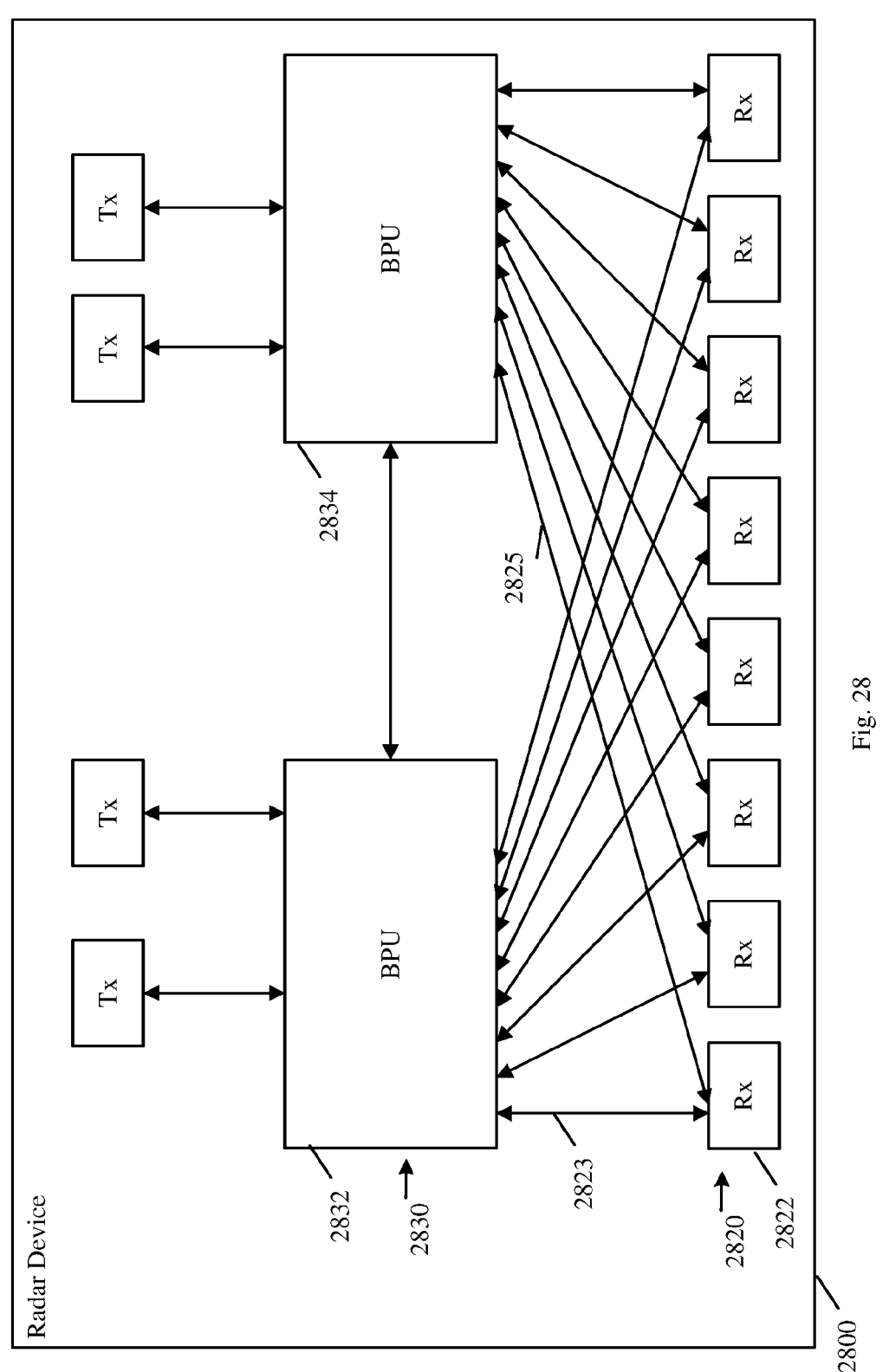
FIG. 28 is a schematic illustration of a radar device including a plurality of baseband processors, in accordance with some demonstrative aspects.

Reference is made to FIG. 28, which schematically illustrates a radar device 2800 including a plurality of baseband processors 2830, in accordance with some demonstrative aspects. For example, radar device 101 (FIG. 1), radar device 300 (FIG. 3), radar device 400 (FIG. 4), radar device 800 (FIG. 8), and/or radar device 910 (FIG. 9) may include one or more elements of radar device 2800, and/or may perform one or more operations and/or functionalities of radar device 2800.

In some demonstrative aspects, as shown in FIG. 28, radar device 2800 may include a plurality of RFICs 2820.

In some demonstrative aspects, as shown in FIG. 28, the plurality of baseband processors 2830 may include a first baseband processor 2832 and a second baseband processor 2834.

In some demonstrative aspects, an RFIC 2822, e.g., each RFIC, of the plurality of RFICs 2820 may be configured to provide to baseband processor 2832 first radar data 2823 corresponding to a first plurality of range-bins allocated to baseband processor 2832.

In some demonstrative aspects, RFIC 2822, e.g., each RFIC, may be configured to provide to baseband processor 2834 second radar data 2825 corresponding to a second plurality of range-bins allocated to baseband processor 2834.

In some demonstrative aspects, baseband processor 2832 may be configured to determine one or more first target detections corresponding to the first plurality of range-bins, for example, based on radar data 2823 corresponding to the first plurality of range-bins from the plurality of RFICs 2820.

In some demonstrative aspects, baseband processor 2834 may be configured determine one or more second target detections corresponding to the second plurality of range-bins, for example, based on radar data 2825 corresponding to the second plurality of range-bins from the plurality of RFICs 2820, e.g., as described below.

In some demonstrative aspects, baseband processor 2832 may be configured to send to baseband processor 2834 detection assistance information corresponding to the first plurality of range-bins allocated to baseband processor 2832.

In some demonstrative aspects, baseband processor 2834 may be configured to determine the one or more second target detections corresponding to the second plurality of range-bins allocated to baseband processor 2834, for example, based on the detection assistance information from baseband processor 2832 corresponding to the first plurality of range-bins allocated to baseband processor 2832.

In some demonstrative aspects, baseband processor 2834 may be configured to send to baseband processor 2832 detection assistance information corresponding to the second plurality of range-bins allocated to baseband processor 2834.

In some demonstrative aspects, baseband processor 2832 may be configured to determine the one or more first target detections corresponding to the first plurality of range-bins allocated to baseband processor 2832, for example, based on the detection assistance information from baseband processor 2834 corresponding to the second plurality of range-bins allocated to baseband processor 2834.

In some demonstrative aspects, as shown in FIG. 28, radar device 2800 may include eight Rx-RFIC chips and four Tx-RFIC chips, which may form a virtual array of 512 elements, e.g., when implementing 32 Rx channels×16 Tx channels.

In some demonstrative aspects, radar device 2800 may have capabilities similar to the capabilities of radar device 2640 (FIG. 26). However, radar device 2800 may utilize two baseband processors, e.g., baseband processor 2832 and 2834, which may be implemented as "basic", "modular", or low-complexity baseband processors. This is in contrast to radar device 2640 (FIG. 26), which may utilize a single "high-end" baseband processor, e.g., baseband processor 2642 (FIG. 26).

In some demonstrative aspects, a radar system, e.g., the radar system of vehicle 900 (FIG. 9), may be configured according to a modular architecture, which may reuse a same type and/or configuration of BPUs to support different KPI requirements.

In some demonstrative aspects, vehicle 900 (FIG. 9) may include a first radar device, e.g., radar device 902 (FIG. 2), which may implement the radar device 2800 including two BPUs, e.g., BPUs 2832 and 2834. In one example, BPUs 2832 and 2834 may each have a same BPU configuration, which may be configured to support a first level of KPI requirements. For example, the integration of the two BPUs 2832 and 2834 may provide a radar device to support a second level of KPI requirements, e.g., which may be suitable for the radar device 902 (FIG. 2).

In some demonstrative aspects, vehicle 900 (FIG. 9) may include a second radar device, e.g., radar device 912 (FIG. 2), which may implement a radar device including one BPU, e.g., similar to the radar device implementation 2620 (FIG. 26). In one example, the BPU of the radar device 912 (FIG. 9) may have the same BPU configuration as BPUs 2832 and 2834, which may be configured to support the first level of KPI requirements. For example, the first level of KPI requirements may be suitable for the radar device 912 (FIG. 2).

For example, the modular architecture of radar device 2800 may support a technical solution to implement two radar devices, for example, including one radar device, e.g., radar device 912 (FIG. 9), with lower KPIs, and another radar device, e.g., radar device 902 (FIG. 9), with higher KPIs, for example, while using the same type and/or configuration of BPU and/or RFIC chips, but with different quantities.

In one example, each RFIC may include four Rx/Tx channels.

For example, a corner radar, e.g., radar device 912 (FIG. 9), may uses a single BPU, with four Rx-RFIC chips and three Tx-RFIC chips, forming a virtual array of 192 elements (16 Rx channels×12 Tx channels).

For example, a front radar, e.g., radar device 902 (FIG. 9), may use two BPUs, eight Rx-RFIC chips and four Tx-RFIC chips, forming a virtual array of 512 elements (32 Rx channels×16 Tx channels).

Figure 29:
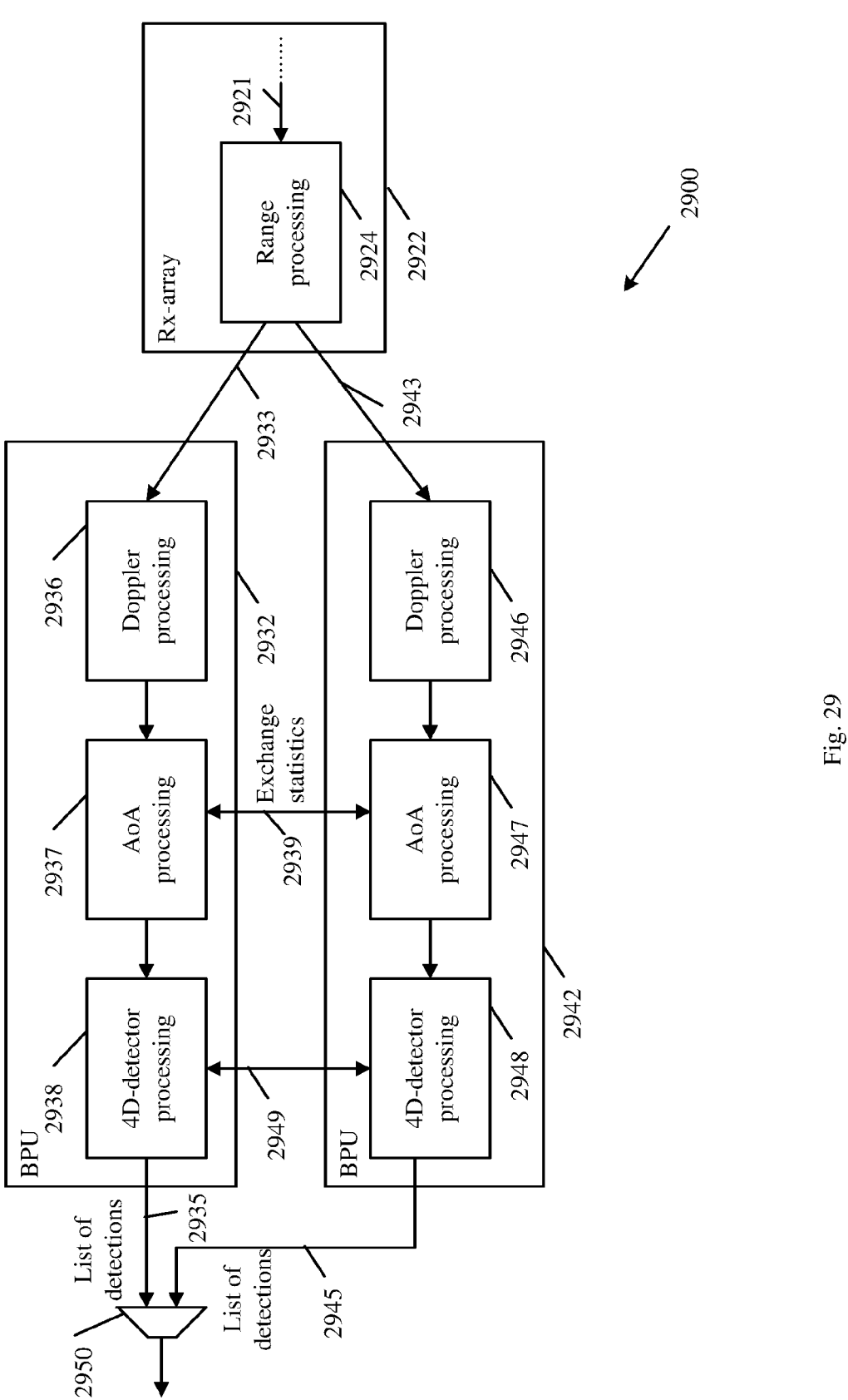
FIG. 29 is a schematic illustration of a processing scheme to process radar data corresponding to a plurality of range-bins, in accordance with some demonstrative aspects.

Reference is made to FIG. 29, which schematically illustrates a processing scheme 2900 to process radar data corresponding to a plurality of range-bins, in accordance with some demonstrative aspects.

In some demonstrative aspects, a radar device, e.g., radar device 800 (FIG. 8), radar device 910 (FIG. 9), radar device 2700 (FIG. 27), and/or radar device 2800 (FIG. 28), may perform one or more operations of processing scheme 2900, for example, to process the radar data corresponding to the plurality of range-bins.

In some demonstrative aspects, as shown in FIG. 29, an RFIC 2922 may generate RFIC radar data, for example, based on radar data of radar signals 2921 received via a plurality of Rx antennas.

In some demonstrative aspects, as shown in FIG. 29, the RFIC 2922 may generate the RFIC radar data, for example, by performing range processing 2924.

In some demonstrative aspects, as shown in FIG. 29, RFIC 2922 may be configured to provide to a first baseband processor 2932 first radar data 2933 corresponding to a first plurality of range-bins allocated to baseband processor 2932, e.g., as described below.

In some demonstrative aspects, as shown in FIG. 29, RFIC 2922 may be configured to provide to a second baseband processor 2942 second radar data 2943 corresponding to a second plurality of range-bins allocated to baseband processor 2942, e.g., as described below.

In some demonstrative aspects, the plurality of range-bins supported by the processing scheme 2900 may be divided, e.g., equally divided or unequally divided, into the first plurality of range-bins allocated to baseband processor 2932, and the second plurality of range-bins allocated to baseband processor 2942.

In some demonstrative aspects, as shown in FIG. 29, first baseband processor 2932 may be configured to determine a target detection list 2935 corresponding to the first plurality of range-bins, e.g., based on the radar data 2933.

In some demonstrative aspects, as shown in FIG. 29, second baseband processor 2942 may be configured to determine a target detection list 2945 corresponding to the second plurality of range-bins, e.g., based on the radar data 2943.

In some demonstrative aspects, as shown in FIG. 29, baseband processor 2932 may determine the target detection list 2935, for example, by applying one or more processing mechanisms, e.g., Doppler processing 2936, AoA processing 2937, and/or target detection processing 2938, to the radar data 2933.

In some demonstrative aspects, as shown in FIG. 29, baseband processor 2942 may determine the target detection list 2945, for example, by applying one or more processing mechanisms, e.g., Doppler processing 2946, AoA processing 2947, and/or target detection processing 2948, to the radar data 2943.

In some demonstrative aspects, as shown in FIG. 29, baseband processor 2942 may send to baseband processor 2932 detection assistance information 2949 corresponding to the radar data 2943. For example, detection assistance information 2949 may include an indication of detected energies corresponding to range neighbors of the ranges detected in the target detection list 2945.

In some demonstrative aspects, baseband processor 2932 may determine the target detection list 2935, for example, based on the detection assistance information 2949.

In some demonstrative aspects, as shown in FIG. 29, baseband processor 2942 may send to baseband processor 2932 statistical information 2939 corresponding to the radar data 2943, and baseband processor 2932 may determine the target detection list 2935, for example, based on the statistical information 2939.

In some demonstrative aspects, as shown in FIG. 29, baseband processor 2932 may send to baseband processor 2942 detection assistance information 2949 corresponding to the radar data 2933. For example, detection assistance information 2949 may include an indication of detected energies of one or more range neighbors of the ranges detected in the target detection list 2935.

In some demonstrative aspects, baseband processor 2942 may determine the target detection list 2945, for example, based on the detection assistance information 2949.

In some demonstrative aspects, as shown in FIG. 29, baseband processor 2932 may send to baseband processor 2942 statistical information 2939 corresponding to the radar data 2933, and baseband processor 2942 may determine the target detection list 2945, for example, based on the statistical information 2939.

In some demonstrative aspects, as shown in FIG. 29, processing scheme 2900 may include a target detector 2950 configured to generate a target detection list 2952 corresponding to the plurality of range-bins, for example, based on target detection list 2945 and target detection list 2935. For example, radar processor 2750 (FIG. 27) may include one or more elements of target detector 2950, and/or may perform one or more operations and/or functionalities of target detector 2950.

In some demonstrative aspects, target detector 2950 may be configured to perform PP of the target detection list 2945 and target detection list 2935. In one example, target detector 2950 may be configured to perform the PP of the target detection list 2945 and target detection list 2935, for example, according to a distributed PP allocation scheme, e.g., as described above with reference to FIGS. 21, 22, 23, 24, and/or 25.

In other aspects, target detector 2950 may be configured to process the target detection list 2945 and target detection list 2935 according to any other processing scheme.

In some demonstrative aspects, some digital processing stages, e.g., the Range processing and/or the Doppler processing, e.g., range processing 2924, Doppler processing 2936 and/or Doppler processing 2946, may be performed on the radar data, e.g., independently, for example, for the different Rx channels. However, some digital processing stages, e.g., the AoA processing, e.g., AoA processing 2937 and/or AoA processing 2947, may be applied on full Range-Doppler maps, e.g., maps of samples from all Rx channels and all Tx channels belonging to a same Range-Doppler bin. Therefore, connecting an RFIC, e.g., each RFIC, to a single BPU may not be efficient, since such a solution may require massive data exchange between the BPUs, e.g., before the AoA processing.

In some demonstrative aspects, as shown in FIG. 29, an RFIC, e.g., each RFIC 2922, may be connected to all the BPUs, e.g., baseband processors 2932 and 2942, and may split data between the BPUs, for example, such that each BPU gets all the samples belonging to specific range-bins, e.g., on all Dopplers, Rx channels and Tx channels.

In some demonstrative aspects, the plurality of range-bins may be divided between baseband processors 2932 and 2942 in an interleaved manner, e.g., as follows:

Each (n*M) range-bin to BPU #0, (n*M+1) range-bin to BPU #1, (n*M+2) range-bin to BPU #2, and so on, wherein n denotes an integer starting from '0'.

In some demonstrative aspects, this interleaved splitting of the rang-bins may provide a best load balancing between the baseband processors 2932 and 2942.

In some demonstrative aspects, the plurality of range-bins may be divided between baseband processors 2932 and 2942 according to an allocation scheme (adjacent-bin allocation scheme), for example, such that each BPU may receive adjacent samples of adjacent range-bins, e.g., as follows:

With MAX_RANGES range-bins, send the first range of (MAX_RANGES/M) range-bins to BPU #0, the second range of (MAX_RANGES/M) range-bins to BPU #1, the third range of (MAX_RANGES/M) range-bins to BPU #2, and so on.

In some demonstrative aspects, an allocation of the range-bins according to the adjacent-bin allocation scheme may support, for example, reduced, e.g., minimal, data exchange between the baseband processors 2932 and 2942, e.g., of detection assistance information, e.g., of information 2939 and/or 2949, for example, as most of the 'neighbor' range-bins may be in a same range processor.

In some demonstrative aspects, the range processing 2924 may be performed at RFIC 2922, for example, to allow to split the RFIC radar data between the baseband processors, for example, according to an allocation of the range-bins.

In one example, performing the range processing at an RFIC, e.g., RFIC 2922, may be applicable for an analog de-chirp implementation at the RFIC, and/or for a digital de-chirp implementation at the RFIC. However, the output of the RFIC may be digital. Therefore, when using the analog de-chirp implementation, the output of the RFIC may be provided after applying a range FFT, for example, to be able to identify a range corresponding to a sample.

In some demonstrative aspects, RFIC 2922 may be configured to generate the radar data 2933 and/or the radar data 2943, for example, based on the range processing 2924, while the baseband processor 2932 may perform the Doppler processing 2936 on the radar data 2933, and/the baseband processor 2942 may perform the Doppler processing 2946, e.g., as described above.

In other aspects, the Doppler processing may be performed at RFIC 2922. For example, RFIC 2922 may be configured to perform the range processing 2924 and the Doppler processing, and to provide the radar data 2933 and/or the radar data 2943 based on the Doppler processing. According to this example, the baseband processor 2932 may perform the AoA processing 2937 on the radar data 2933, and/the baseband processor 2942 may perform the AoA processing 2947.

In some demonstrative aspects, outputs of an RFIC, e.g., RFIC 2922, may be configured to support communication of data, e.g., the RFIC radar data, to a single BPU, or to a plurality of BPUs, for example, according to the range-based processor allocation scheme.

In some demonstrative aspects, a BW of an interface between an RFIC and a BPU, e.g., a BW of an interface between RFIC 2922 and BPU 2932, may be determined, for example, by dividing a total received data BW of the RFIC divided by the number of BPUs connected to the RFIC.

In some demonstrative aspects, the interface between the RFIC and the BPU may utilize any suitable media and/or topology. For example, the interface between the RFIC and the BPU may include on-board Serdes lanes, direct cables, and/or any other networking media interface.

In some demonstrative aspects, an interface between BPUs, e.g., to communicate detection assistance information 2949 and/or statistical information 2939, may utilize any suitable media and/or topology. For example, the interface between the BPUs 2932 and 2942 may include an any-to-any topology, a ring-based topology, and/or any other topology.

In some demonstrative aspects, a BW of the interface between the BPUs, e.g., to communicate detection assistance information 2949 and/or statistical information 2939, may be allowed to be relatively low, for example, as the amount of data passed between the BPUs may be relatively low. For example, data passed between the BPUs 2932 and 2942 may include control data and/or detection data, e.g., after several stages of filtering.

Reference is made to FIG. 30, which schematically illustrates a method of processing radar data, in accordance with some demonstrative aspects. For example, one or more of the operations of the method of FIG. 30 may be performed by a radar device, e.g., radar device 101 (FIG. 1), radar device 800 (FIG. 8), radar device 910 (FIG. 9), radar device 2700 (FIG. 27), and/or radar device 2800 (FIG. 28), an RFIC, e.g., RFIC 2722 (FIG. 27), RFIC 2822 (FIG. 28), and/or RFIC 2922 (FIG. 29), and/or a baseband processor, e.g., baseband processors 2730 (FIG. 27), baseband processors 2830 (FIG. 28), and/or baseband processors 2932 and/or 2942 (FIG. 29).

As indicated at block 3002, the method may include generating at a plurality of RFICs radar data corresponding to a plurality of range-bins. For example, RFICs 2720 (FIG. 27) may generate the radar data corresponding to the plurality of range-bins, e.g., as described above.

As indicated at block 3004, generating the radar data may include generating radar data corresponding to the plurality of range-bins at an RFIC of the plurality of RFICs, for example, based on radar signals processed by the RFIC. For example, RFIC 2720 (FIG. 27) may generate the radar data of RFIC 2720 (FIG. 27) corresponding to the plurality of range-bins based on radar signals processed by RFIC 2720 (FIG. 27), e.g., as described above.

As indicated at block 3006, the method may include communicating the radar data to a plurality of baseband processors according to a range-based processor allocation scheme, the range-based processor allocation scheme to allocate the plurality of range-bins to the plurality of baseband processors. For example, RFICs 2720 (FIG. 27) may communicate the radar data to the plurality of baseband processors 2730 (FIG. 27) according to the range-based processor allocation scheme to allocate the plurality of range-bins to the plurality of baseband processors 1130 (FIG. 27), e.g., as described above.

As indicated at block 3008, communicating the radar data to the plurality of baseband processors may include providing the radar data of the RFIC by providing to a baseband processor of the plurality of baseband processors radar data corresponding to range-bins allocated to the baseband processor. For example, RFIC 2722 (FIG. 27) may provide the radar data of RFIC 2722 (FIG. 27) to the plurality of baseband processors 2730 (FIG. 27) according to the range-based processor allocation scheme, for example, by providing to baseband processor 2732 (FIG. 27) radar data corresponding to range-bins allocated to baseband processors 2732 (FIG. 27), e.g., as described above.

Figure 31:
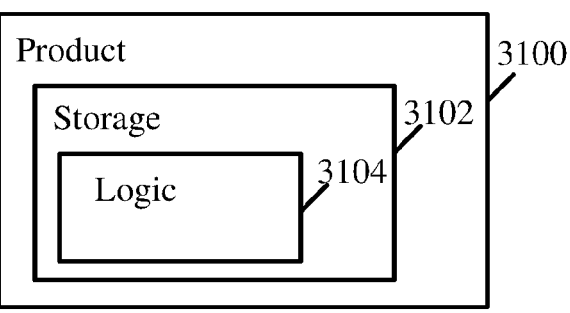
FIG. 31 is a schematic illustration of a product of manufacture, in accordance with some demonstrative aspects.

Reference is made to FIG. 31, which schematically illustrates a product of manufacture 3100, in accordance with some demonstrative aspects. Product 3100 may include one or more tangible computer-readable ("machine-readable") non-transitory storage media 3102, which may include computer-executable instructions, e.g., implemented by logic 3104, operable to, when executed by at least one computer processor, enable the at least one computer processor to implement one or more operations and/or functionalities described with reference to the FIGS. 1, 2, 3, 4, 5, 6, 7, 8, 9, 10, 11, 12, 13, 14, 15, 16, 17, 18, 19, 20, 21, 22, 23, 24, 25, 26, 27, 28, 29 and/or 30, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 3100 and/or storage media 3102 may include one or more types of computer-readable storage media capable of storing data, including volatile memory, non-volatile memory, removable or non-removable memory, erasable or non-erasable memory, writeable or re-writeable memory, and the like. For example, storage media 3102 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 3104 may include instructions, data, and/or code, which, if executed by a machine, may cause the machine to perform a method, process, and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 3104 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner, or syntax, for instructing a processor to perform a certain function. The instructions may be implemented using any suitable high-level, low-level, object-oriented, visual, compiled and/or interpreted programming language.

EXAMPLES

The following examples pertain to further aspects.

Example 1 includes a radar system comprising a plurality of radar devices configured to mitigate interference in an environment of the radar system according to a collaborative interference mitigation scheme, wherein a first radar device of the plurality of radar devices comprises a communication interface to receive first interference-based information, the first interference-based information based on interference detected by at least one second radar device of the plurality of radar devices; and a processor configured to control the first radar device to communicate radar signals of the first radar device based on the first interference-based information, and to cause the communication interface to output second interference-based information, the second interference-based information based on the radar signals of the first radar device.

Example 2 includes the subject matter of Example 1, and optionally, comprising a controller configured to receive interference information from the plurality of radar devices, and to control the plurality of radar devices according to the collaborative interference mitigation scheme based on the interference information from the plurality of radar devices.

Example 3 includes the subject matter of Example 2, and optionally, wherein the controller is configured to receive third interference-based information from the second radar device, to determine the first interference-based information based on the third interference-based information, and to provide the first interference-based information to the first radar device.

Example 4 includes the subject matter of Example 3, and optionally, wherein the controller is configured to receive the second interference-based information from the first radar device, to determine fourth interference-based information based on the second interference-based information, and to provide the fourth interference-based information to at least one third radar device.

Example 5 includes the subject matter of Example 4, and optionally, wherein the at least one third radar device comprises the second radar device.

Example 6 includes the subject matter of Example 4, and optionally, wherein the at least one third radar device is different from the second radar device.

Example 7 includes the subject matter of any one of Examples 2-6, and optionally, wherein the controller is configured to dynamically update an interference map of the environment of the radar system based on the interference information from the plurality of radar devices, and to generate the first interference-based information based on the interference map.

Example 8 includes the subject matter of Example 7, and optionally, wherein the controller is configured to determine a plurality of radar communication resources for the plurality of radar devices based on the interference map.

Example 9 includes the subject matter of Example 8, and optionally, wherein the plurality of radar communication resources comprises a radar communication resource for the first radar device and an out-of-band measurement resource for the first radar device, wherein a level of interference according to the interference map in the radar communication resource is less than a level of interference according to the interference map in the out-of-band measurement resource.

Example 10 includes the subject matter of any one of Examples 2-9, and optionally, wherein the controller is configured to track one or more interferers in the environment of the radar system based on the interference information from the plurality of radar devices, and to configure the first interference-based information based on one or more parameters of the interferers.

Example 11 includes the subject matter of any one of Examples 2-10, and optionally, wherein the controller is configured to determine the first interference-based information based on sensing state information corresponding to a state of the environment of the radar system.

Example 12 includes the subject matter of Example 11, and optionally, wherein the sensing state information comprises interferer state information of a state of an interferer in the environment of the radar system.

Example 13 includes the subject matter of Example 11 or 12, and optionally, wherein the sensing state information comprises object information of one or more objects in the environment of the radar system.

Example 14 includes the subject matter of any one of Examples 2-13, and optionally, wherein the controller is configured to determine the first interference-based information based on map information corresponding to a map of the environment of the radar system.

Example 15 includes the subject matter of any one of Examples 2-14, and optionally, wherein the controller is configured to determine the first interference-based information based on driving trajectory information corresponding to planned driving trajectory of a vehicle comprising the radar system.

Example 16 includes the subject matter of any one of Examples 2-15, and optionally, wherein the controller is configured to generate the first interference-based information to comprise interference measurement configuration information to configure interference measurements to be performed by the first radar device.

Example 17 includes the subject matter of Example 16, and optionally, wherein the interference measurement configuration information is to configure an in-band interference measurement to be performed by the first radar device during a radar frame for communication of the radar signals of the first radar device.

Example 18 includes the subject matter of Example 16 or 17, and optionally, wherein the interference measurement configuration information is to configure an out-of-band interference measurement to be performed by the first radar device in a listening mode between radar frames for communication of the radar signals of the first radar device.

Example 19 includes the subject matter of any one of Examples 2-18, and optionally, wherein the controller is configured to generate the first interference-based information to comprise one or more radar transmit (Tx) parameters to configure radar transmissions by the first radar device.

Example 20 includes the subject matter of Example 19, and optionally, wherein the one or more radar Tx parameters comprises at least one of a Tx power, a Tx spatial beam shape, a Tx time, a Tx frequency, a Tx polarization, a Tx waveform, a Tx resource Unit (RU), or a Tx code.

Example 21 includes the subject matter of any one of Examples 2-20, and optionally, wherein the controller is configured to generate the first interference-based information to comprise one or more radar Receive (Rx) parameters to configure processing of radar Rx signals received by the first radar device.

Example 22 includes the subject matter of Example 21, and optionally, wherein the one or more radar Rx parameters comprises at least one of an Rx threshold for radar detection, or a parameter of an interference mitigation mechanism utilized by the first radar device.

Example 23 includes the subject matter of any one of Examples 2-22, and optionally, wherein the controller is configured to generate the first interference-based information to comprise interference information of one or more interferers to be mitigated by the first radar device.

Example 24 includes the subject matter of any one of Examples 2-23, and optionally, wherein the controller is configured to provide feedback information to a system controller of a system comprising the radar system, the feedback information based on the interference information from the plurality of radar devices.

Example 25 includes the subject matter of any one of Examples 2-24, and optionally, wherein the controller is configured to determine the first interference-based information based on expected interference information representing expected interference in the environment of the radar system.

Example 26 includes the subject matter of any one of Examples 2-25, and optionally, wherein the controller is configured to control radar communications by the plurality of radar devices according to one or more predefined radar control limitations of at least one radar standard or specification.

Example 27 includes the subject matter of Example 1, and optionally, wherein the collaborative interference mitigation scheme comprises a distributed collaborative interference mitigation scheme, wherein the communication interface is to receive the first interference-based information from the at least one second radar device, the first interference-based information comprises first interference information to identify interference detected by the at least one second radar device, wherein the communication interface is to provide the second interference-based information to other radar devices, the second interference information to identify interference detected by the first radar device.

Example 28 includes the subject matter of any one of Examples 1-27, and optionally, wherein the first interference-based information comprises interference information of one or more interferers to be mitigated by the first radar device.

Example 29 includes the subject matter of any one of Examples 1-28, and optionally, wherein the first interference-based information comprises an expected interference map of one or more expected interferers to be mitigated by the first radar device.

Example 30 includes the subject matter of any one of Examples 1-29, and optionally, comprising a radar processor configured to generate radar information based on radar data from the plurality of radar devices.

Example 31 includes the subject matter of Example 30, and optionally, comprising a vehicle, the vehicle comprising a system controller to control one or more systems of the vehicle based on the radar information.

Example 32 includes a radar system comprising a plurality of radar devices; and a controller configured to schedule radar transmissions by the plurality of radar devices during a sequence of radar frame periods according to a burst scheduling scheme, the burst scheduling scheme configured to schedule in a radar frame period a common transmission time for radar burst transmissions by the plurality of radar devices, wherein the burst scheduling scheme is configured to schedule during the common transmission time a first radar transmission of a first radar device comprising a first sequence of radar bursts, and a second radar transmission of a second radar device comprising a second sequence of radar bursts, wherein a timing of radar bursts in the second sequence of radar bursts is offset relative to a timing of radar bursts in the first sequence of radar bursts.

In one example, the radar system of Example 32 may include, for example, one or more additional elements, and/or may perform one or more additional operations and/or functionalities, for example, as described with respect to Examples 1, 49, 68, 88, and/or 99.

Example 33 includes the subject matter of Example 32, and optionally, wherein the burst scheduling scheme is configured to schedule the first sequence of radar bursts to partially overlap the second sequence of radar bursts.

Example 34 includes the subject matter of Example 33, and optionally, wherein a burst end portion of a radar burst in the first sequence of radar bursts overlaps a burst beginning portion of a radar burst in the second sequence of radar bursts, the burst end portion is after a peak of the radar burst in the first sequence of radar bursts, the burst beginning portion is before a peak of the radar burst in the second sequence of radar bursts.

Example 35 includes the subject matter of Example 32, and optionally, wherein the burst scheduling scheme is configured to schedule the second sequence of radar bursts to be non-overlapping with the first sequence of radar bursts.

Example 36 includes the subject matter of any one of Examples 32-35, and optionally, wherein the burst scheduling scheme is configured to schedule partially overlapping sequences of radar bursts for two radar devices having non-overlapping radar Fields of View (FoVs).

Example 37 includes the subject matter of any one of Examples 32-36, and optionally, wherein the burst scheduling scheme is configured to schedule partially overlapping sequences of radar bursts for two radar devices based on a criterion corresponding to an interference between the two radar devices.

Example 38 includes the subject matter of any one of Examples 32-37, and optionally, wherein the burst scheduling scheme is configured to schedule non-overlapping sequences of radar bursts for two radar devices based on an interference between the two radar devices.

Example 39 includes the subject matter of any one of Examples 32-38, and optionally, wherein the burst scheduling scheme is configured to schedule during the common transmission time a third radar transmission of a third radar device comprising a third sequence of radar bursts, wherein a timing of radar bursts in the third sequence of radar bursts is offset relative to the timing of radar bursts in the first sequence of radar bursts and relative to the timing of radar bursts in the second sequence of radar bursts.

Example 40 includes the subject matter of any one of Examples 32-39, and optionally, wherein consecutive radar bursts in the first sequence of radar bursts are separated by a first burst gap, and consecutive radar bursts in the second sequence of radar bursts are separated by a second burst gap, the second burst gap is based on the first burst gap.

Example 41 includes the subject matter of any one of Examples 32-40, and optionally, wherein a time offset between the second sequence of radar bursts and the first sequence of radar bursts is based on a burst duration of a radar burst in the first sequence of radar bursts.

Example 42 includes the subject matter of any one of Examples 32-41, and optionally, wherein the controller is configured to synchronize between clocks of the plurality of radar.

Example 43 includes the subject matter of any one of Examples 32-42, and optionally, wherein a radar frame duration of the radar frame period is more than 25 millisec-onds, and a common transmission duration of the common transmission time is less than 10 milliseconds.

Example 44 includes the subject matter of any one of Examples 32-43, and optionally, wherein a radar burst in the first sequence of radar bursts has a first burst duration, and a radar burst in the second sequence of radar bursts has a second burst duration, wherein each of the first burst dura-tion and the second burst duration is less than 1000 micro-seconds.

Example 45 includes the subject matter of Example 44, and optionally, wherein the first burst duration is equal to the second burst duration.

Example 46 includes the subject matter of any one of Examples 32-45, and optionally, wherein the radar burst transmissions are configured according to a comb-like struc-ture defining a repetitive sequence of identical radar bursts separated by a constant burst gap.

Example 47 includes the subject matter of any one of Examples 32-46, and optionally, comprising a radar proces-sor configured to generate radar information based on radar data from the plurality of radar devices.

Example 48 includes the subject matter of Example 47, and optionally, comprising a vehicle, the vehicle comprising a system controller to control one or more systems of the vehicle based on the radar information.

Example 49 includes a radar system comprising a plural-ity of radar devices configured to perform Post-Processing (PP) of radar detection information according to a distrib-uted PP allocation scheme, the distributed PP allocation scheme configured to allocate one or more PP data-provider devices to a PP device, the PP device comprising a first radar device of the plurality of radar devices, the one or more PP data-provider devices comprising at least one second radar device of the plurality of radar devices, wherein the first radar device comprises a Radio Frequency (RF) frontend configured to communicate radar signals of the first radar device; a communication interface to receive radar detection information from the one or more PP data-provider devices according to the distributed PP allocation scheme; and a baseband processor configured to generate radar detection information of the first radar device, based on the radar signals of the first radar device, and to generate PP radar information by processing the radar detection information from the one or more PP data-provider devices.

In one example, the radar system of Example 49 may include, for example, one or more additional elements, and/or may perform one or more additional operations and/or functionalities, for example, as described with respect to Examples 1, 32, 68, 88, and/or 99.

Example 50 includes the subject matter of Example 49, and optionally, wherein the distributed PP allocation scheme comprises a Field of View (FoV) based PP allocation scheme based on radar FoVs of the plurality of radar devices.

Example 51 includes the subject matter of Example 50, and optionally, wherein the FoV based PP allocation scheme is configured to allocate to the PP device a first PP data-provider device having a first radar FoV, and a second PP data-provider device having a second radar FoV, the second radar FoV at least partially overlapping the first radar FoV.

Example 52 includes the subject matter of Example 50 or 51, and optionally, wherein the distributed PP allocation scheme is configured to allocate the plurality of radar devices to a plurality of PP devices, and wherein the FoV based PP allocation scheme is configured to allocate to the plurality of PP devices a respective plurality of PP FoVs, the plurality of PP FoVs is based on the radar FoVs of the plurality of radar devices.

Example 53 includes the subject matter of Example 52, and optionally, wherein the PP radar information corre-sponds to a PP FoV corresponding to the PP device.

Example 54 includes the subject matter of Example 52 or 53, and optionally, wherein the plurality of PP FoVs covers a combined FoV of 360 degrees.

Example 55 includes the subject matter of any one of Example 49-54, and optionally, wherein the distributed PP allocation scheme is configured to allocate the plurality of radar devices to a plurality of PP devices, a count of the plurality of PP devices is less than a count of the plurality of radar devices.

Example 56 includes the subject matter of any one of Examples 49-55, and optionally, wherein the radar signals of the first radar device cover a first radar Field of View (FoV), and wherein the one or more PP data-provider devices cover a second FoV different from the first radar FoV.

Example 57 includes the subject matter of any one of Examples 49-56, and optionally, wherein allocation of the one or more PP data-provider devices to the first radar device is based on a processing load of the baseband processor of the first radar device for generating the radar detection information of the first radar device.

Example 58 includes the subject matter of any one of Examples 49-57, and optionally, wherein allocation of the at least one second device to the one or more PP data-provider devices is based on a processing load of a baseband pro-cessor of the second radar device for generating radar detection information of the second radar device.

Example 59 includes the subject matter of any one of Examples 49-58, and optionally, wherein the one or more PP data-provider devices comprise the first radar device, the baseband processor of the first radar device configured to generate the PP radar information by processing the radar detection information of the first radar device and radar detection information from the at least one second radar device.

Example 60 includes the subject matter of any one of Examples 49-58, and optionally, wherein the one or more PP data-provider devices exclude the first radar device.

Example 61 includes the subject matter of any one of Examples 49-60, and optionally, wherein the communication interface is to process a multicast message from a PP data-provider device of the one or more PP data-provider devices, the multicast message comprising radar detection information of the PP data-provider device.

Example 62 includes the subject matter of any one of Examples 49-61, and optionally, wherein the communication interface is to process a broadcast message from a PP allocated device of the one or more PP data-provider devices, the broadcast message comprising radar detection information of the PP allocated device.

Example 63 includes the subject matter of any one of Examples 49-62, and optionally, wherein the baseband processor is configured to generate the radar detection information of the first radar device by applying range processing, Doppler processing, Angle of Arrival (AoA) processing, and target detection processing based on the radar signals of the first radar device.

Example 64 includes the subject matter of any one of Examples 49-63, and optionally, comprising a controller configured to determine the distributed PP allocation scheme based on one or more parameters corresponding to PP capabilities of baseband processors of one or more of the plurality of radar devices.

Example 65 includes the subject matter of Example 64, and optionally, wherein the controller is configured to update the distributed PP allocation scheme based on a change in a processing load for generating detection information by at least one radar device of the plurality of radar devices.

Example 66 includes the subject matter of any one of Examples 49-65, and optionally, comprising a radar processor configured to process PP radar information from a plurality of PP devices comprising the PP device, and to generate radar information based on the PP radar information from the plurality of PP devices.

Example 67 includes the subject matter of Example 66, and optionally, comprising a vehicle, the vehicle comprising a system controller to control one or more systems of the vehicle based on the radar information.

Example 68 includes a radar system comprising a plurality of baseband processors; and a plurality of Radio Frequency Integrated Chips (RFICs) configured to generate radar data corresponding to a plurality of range-bins, and to communicate the radar data to the plurality of baseband processors according to a range-based processor allocation scheme, the range-based processor allocation scheme to allocate the plurality of range-bins to the plurality of baseband processors, wherein an RFIC of the plurality of RFICs is configured to generate radar data of the RFIC corresponding to the plurality of range-bins based on radar signals processed by the RFIC, and to provide the radar data of the RFIC to the plurality of baseband processors according to the range-based processor allocation scheme by providing to a baseband processor of the plurality of baseband processors radar data corresponding to range-bins allocated to the baseband processor.

In one example, the radar system of Example 68 may include, for example, one or more additional elements, and/or may perform one or more additional operations and/or functionalities, for example, as described with respect to Examples 1, 32, 49, 88, and/or 99.

Example 69 includes the subject matter of Example 68, and optionally, wherein the plurality of baseband processors comprises a first baseband processor and a second baseband processor, wherein the RFIC is configured to provide to the first baseband processor first radar data corresponding to a first plurality of range-bins allocated to the first baseband processor, and to provide to the second baseband processor second radar data corresponding to a second plurality of range-bins allocated to the second baseband processor, the second plurality of range-bins is different from the first plurality of range-bins.

Example 70 includes the subject matter of Example 69, and optionally, wherein the first baseband processor is configured to determine one or more first target detections corresponding to the first plurality of range-bins based on radar data corresponding to the first plurality of range-bins from the plurality of RFICs, and wherein the second baseband processor is configured determine one or more second target detections corresponding to the second plurality of range-bins based on radar data corresponding to the second plurality of range-bins from the plurality of RFICs.

Example 71 includes the subject matter of Example 70, and optionally, wherein the first baseband processor is configured to send to the second baseband processor detection assistance information corresponding to the first plurality of range-bins, and wherein the second baseband processor is configured to determine the one or more second target detections based on the detection assistance information corresponding to the first plurality of range-bins.

Example 72 includes the subject matter of Example 70 or 71, and optionally, comprising a radar processor configured to generate a target detection list corresponding to the plurality of range-bins based on the one or more first target detections and the one or more second target detections.

Example 73 includes the subject matter of any one of Examples 69-72, and optionally, wherein a count of range-bins in the first plurality of range-bins is equal to a count of range-bins in the second plurality of range-bins.

Example 74 includes the subject matter of any one of Examples 69-73, and optionally, wherein the first plurality of range-bins comprises even numbered range-bins, and the second plurality of range-bins comprises odd-numbered range-bins.

Example 75 includes the subject matter of any one of Examples 69-74, and optionally, wherein the first plurality of range-bins comprises a first sequence of consecutive range-bins, and the second plurality of range-bins comprises a second sequence of consecutive range-bins.

Example 76 includes the subject matter of any one of Examples 68-75, and optionally, wherein the range-based processor allocation scheme comprises an equal allocation of the plurality of range-bins between the plurality of baseband processors.

Example 77 includes the subject matter of any one of Examples 68-76, and optionally, wherein each RFIC of the plurality of RFICs is to provide to the baseband processor radar data corresponding to the range-bins allocated to the baseband processor.

Example 78 includes the subject matter of any one of Examples 68-77, and optionally, wherein the baseband processor is configured to receive from the plurality of RFICs radar data corresponding to range-bins allocated to the baseband processor.

Example 79 includes the subject matter of Example 78, and optionally, wherein the baseband processor is configured to generate a target detection list based on the radar data from the plurality of RFICs corresponding to the range-bins allocated to the baseband processor.

Example 80 includes the subject matter of Example 79, and optionally, wherein the baseband processor is configured to receive from another baseband processor detection assistance information corresponding to range-bins allocated to the another baseband processor, and to generate the target detection list based on the detection assistance information from the another baseband processor.

Example 81 includes the subject matter of Example 79 or 80, and optionally, wherein the baseband processor is to determine the target detection list by applying Doppler processing, Angle of Arrival (AoA) processing, and target detection processing to the radar data from the plurality of RFICs corresponding to the range-bins allocated to the baseband processor.

Example 82 includes the subject matter of any one of Examples 68-81, and optionally, wherein the RFIC comprises a plurality of outputs connected to the plurality of baseband processors, respectively.

Example 83 includes the subject matter of any one of Examples 68-82, and optionally, wherein the RFIC is connected to a plurality of receive (Rx) antenna elements, the RFIC to generate the radar data of the RFIC based on radar signals received via the plurality of Rx antennas.

Example 84 includes the subject matter of any one of Examples 68-83, and optionally, comprising a first radar device and a second radar device, the first radar device comprising one or more first baseband processors connected to a first plurality of RFICs, and the second radar device comprising a plurality of second baseband processors connected to a second plurality of RFICs, wherein a count of baseband processors in the second plurality of baseband processors is different from a count of baseband processors in the one or more first baseband processors.

Example 85 includes the subject matter of any one of Examples 68-84, and optionally, comprising a controller configured to update the range-based processor allocation scheme based on the radar data corresponding to the plurality of range-bins.

Example 86 includes the subject matter of any one of Examples 68-85, and optionally, comprising a radar processor configured to process detection information from the plurality of baseband processors, and to generate radar information based on the detection information from the plurality of baseband processors.

Example 87 includes the subject matter of Example 86, and optionally, comprising a vehicle, the vehicle comprising a system controller to control one or more systems of the vehicle based on the radar information.

Example 88 includes a radar device comprising a communication interface; and a processor configured to collaborate with one or more other radar devices in a radar system to mitigate interference in an environment of the radar system, the processor to cause the radar device to communicate radar signals of the radar device based on first interference-based information received by the communication interface, the first interference-based information based on interference detected by at least one other radar device in the radar system, the processor to cause the communication interface to output second interference-based information, the second interference-based information based on the radar signals of the radar device.

In one example, the radar device of Example 88 may include, for example, one or more additional elements, and/or may perform one or more additional operations and/or functionalities, for example, as described with respect to Examples 1, 32, 49, 68, and/or 99.

Example 89 includes the subject matter of Example 88, and optionally, wherein the first interference-based information is from a controller of the radar system.

Example 90 includes the subject matter of Example 89, and optionally, wherein the processor is configured to cause the communication interface to send the second interference-based information to the controller of the radar system.

Example 91 includes the subject matter of Example 88, and optionally, wherein the communication interface is to receive the first interference-based information from the other radar device, the first interference-based information to identify interference detected by the other radar device, wherein the second interference-based information is to identify interference detected by the radar device.

Example 92 includes the subject matter of any one of Examples 88-91, and optionally, wherein the first interference-based information comprises interference measurement configuration information to configure interference measurements to be performed by the radar device, the processor configured to cause the radar device to perform the interference measurements based on the interference measurement configuration information.

Example 93 includes the subject matter of Example 92, and optionally, wherein the interference measurement configuration information is to configure an in-band interference measurement to be performed by the radar device during a radar frame for communication of the radar signals of the radar device.

Example 94 includes the subject matter of Example 92 or 93, and optionally, wherein the interference measurement configuration information is to configure an out-of-band interference measurement to be performed by the radar device in a listening mode between radar frames for communication of the radar signals of the radar device.

Example 95 includes the subject matter of any one of Examples 88-94, and optionally, wherein the first interference-based information comprises one or more radar transmit (Tx) parameters, the processor to configure radar transmissions by the radar device based on the one or more radar Tx parameters.

Example 96 includes the subject matter of any one of Examples 88-95, and optionally, wherein the first interference-based information comprises one or more radar Receive (Rx) parameters, the processor to configure processing of radar Rx signals received by the radar device based on the one or more radar Rx parameters.

Example 97 includes the subject matter of any one of Examples 88-96, and optionally, wherein the first interference-based information comprises interference information of one or more interferers to be mitigated by the radar device.

Example 98 includes the subject matter of any one of Examples 88-97, and optionally, wherein the first interference-based information comprises an expected interference map of one or more expected interferers to be mitigated by the radar device.

Example 99 includes an apparatus comprising a controller configured to control a plurality of radar devices in a radar system to mitigate interference in an environment of the radar system according to a collaborative interference mitigation scheme, the controller comprising a processor configured to process interference information from the plurality of radar devices and to control the plurality of radar devices according to the collaborative interference mitigation scheme based on the interference information from the plurality of radar devices, wherein the processor is configured to determine first interference-based information for a first radar device of the plurality of radar devices based on second interference-based information from at least one second radar device of the plurality of radar devices, and to send the first interference-based information to the first radar device; and a memory to store information processed by the processor.

In one example, the apparatus of Example 99 may include, for example, one or more additional elements, and/or may perform one or more additional operations and/or functionalities, for example, as described with respect to Examples 1, 32, 49, 68, and/or 88.

Example 100 includes the subject matter of Example 99, and optionally, wherein the controller is configured to dynamically update an interference map of the environment of the radar system based on the interference information from the plurality of radar devices, and to generate the first interference-based information based on the interference map.

Example 101 includes the subject matter of Example 100, and optionally, wherein the controller is configured to determine a plurality of radar communication resources for the plurality of radar devices based on the interference map.

Example 102 includes the subject matter of Example 101, and optionally, wherein the plurality of radar communication resources comprises a radar communication resource for the first radar device and an out-of-band measurement resource for the first radar device, wherein a level of interference according to the interference map in the radar communication resource is less than a level of interference according to the interference map in the out-of-band measurement resource.

Example 103 includes the subject matter of any one of Examples 99-102, and optionally, wherein the controller is configured to track one or more interferers in the environment of the radar system based on the interference information from the plurality of radar devices, and to configure the first interference-based information based on one or more parameters of the interferers.

Example 104 includes the subject matter of any one of Examples 99-103, and optionally, wherein the controller is configured to determine the first interference-based information based on state information corresponding to a state of the environment of the radar system.

Example 105 includes the subject matter of Example 104, and optionally, wherein the state information comprises interferer state information of a state of an interferer in the environment of the radar system.

Example 106 includes the subject matter of any one of Examples 99-105, and optionally, wherein the controller is configured to determine the first interference-based information based on map information corresponding to a map of the environment of the radar system.

Example 107 includes the subject matter of any one of Examples 99-106, and optionally, wherein the controller is configured to determine the first interference-based information based on driving trajectory information corresponding to planned driving trajectory of a vehicle comprising the radar system.

Example 108 includes the subject matter of any one of Examples 99-107, and optionally, wherein the controller is configured to generate the first interference-based information to comprise interference measurement configuration information to configure interference measurements to be performed by the first radar device.

Example 109 includes the subject matter of Example 108, and optionally, wherein the interference measurement configuration information is to configure an in-band interference measurement to be performed by the first radar device during a radar frame for communication of the radar signals of the first radar device.

Example 110 includes the subject matter of Example 108 or 109, and optionally, wherein the interference measurement configuration information is to configure an out-of-band interference measurement to be performed by the first radar device in a listening mode between radar frames for communication of the radar signals of the first radar device.

Example 111 includes the subject matter of any one of Examples 99-110, and optionally, wherein the controller is configured to generate the first interference-based information to comprise one or more radar transmit (Tx) parameters to configure radar transmissions by the first radar device.

Example 112 includes the subject matter of any one of Examples 99-111, and optionally, wherein the controller is configured to generate the first interference-based information to comprise one or more radar Receive (Rx) parameters to configure processing of radar Rx signals received by the first radar device.

Example 113 includes the subject matter of any one of Examples 99-112, and optionally, wherein the controller is configured to provide feedback information to a system controller of a system comprising the radar system, the feedback information based on the interference information from the plurality of radar devices.

Example 114 includes the subject matter of any one of Examples 99-113, and optionally, wherein the controller is configured to control radar communications by the plurality of radar devices according to at least one radar standard or specification.

Example 115 includes a radar device comprising one or more of the apparatuses of Examples 1-114.

Example 116 includes a vehicle comprising one or more of the apparatuses of Examples 1-114.

Example 117 includes an apparatus comprising means for executing any of the described operations of Examples 1-117.

Example 118 includes a machine-readable medium that stores instructions for execution by a processor to perform any of the described operations of Examples 1-114.

Example 119 includes an apparatus comprising a memory; and processing circuitry configured to perform any of the described operations of Examples 1-114.

Example 120 includes a method including any of the described operations of Examples 1-114.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A radar device comprising:
a communication interface; and
a processor configured to collaborate with one or more other radar devices in a radar system to mitigate interference in an environment of the radar system, the processor configured to cause the radar device to communicate radar signals of the radar device based on first interference-based information received by the communication interface, the first interference-based information is based on interference detected by at least one other radar device in the radar system, wherein the processor is configured to cause the communication interface to output second interference-based information, the second interference-based information is based on the radar signals of the radar device.

2. The radar device of claim 1, wherein the first interference-based information is from a controller of the radar system.

3. The radar device of claim 2, wherein the processor is configured to cause the communication interface to send the second interference-based information to the controller of the radar system.

4. The radar device of claim 1, wherein the communication interface is to receive the first interference-based information from the other radar device, wherein the processor is configured to process the first interference-based information to identify interference detected by the other radar device, and to generate the second interference-based information to identify interference detected by the radar device.

5. The radar device of claim 1, wherein the first interference-based information comprises interference measurement configuration information to configure interference measurements to be performed by the radar device, the processor configured to cause the radar device to perform the interference measurements based on the interference measurement configuration information.

6. The radar device of claim 5, wherein the interference measurement configuration information is to configure an in-band interference measurement to be performed by the radar device during a radar frame for communication of the radar signals of the radar device.

7. The radar device of claim 5, wherein the interference measurement configuration information is to configure an out-of-band interference measurement to be performed by the radar device in a listening mode between radar frames for communication of the radar signals of the radar device.

8. The radar device of claim 1, wherein the first interference-based information comprises one or more radar transmit (Tx) parameters, the processor to configure radar transmissions by the radar device based on the one or more radar Tx parameters.

9. The radar device of claim 1, wherein the first interference-based information comprises one or more radar Receive (Rx) parameters, the processor to configure processing of radar Rx signals received by the radar device based on the one or more radar Rx parameters.

10. An apparatus comprising:
a controller configured to control a plurality of radar devices in a radar system to mitigate interference in an environment of the radar system according to a collaborative interference mitigation scheme, the controller comprising:
a processor configured to process interference information from the plurality of radar devices and to control the plurality of radar devices according to the collaborative interference mitigation scheme based on the interference information from the plurality of radar devices, wherein the processor is configured to determine first interference-based information for a first radar device of the plurality of radar devices based on second interference-based information from at least one second radar device of the plurality of radar devices, and to send the first interference-based information to the first radar device; and a memory to store information processed by the processor.

11. The apparatus of claim 10, wherein the controller is configured to update an interference map of the environment of the radar system based on the interference information from the plurality of radar devices, and to generate the first interference-based information based on the interference map.

12. The apparatus of claim 11, wherein the controller is configured to determine a plurality of radar communication resources for the plurality of radar devices based on the interference map.

13. The apparatus of claim 12, wherein the plurality of radar communication resources comprises a radar communication resource for the first radar device and an out-of-band measurement resource for the first radar device, wherein a level of interference according to the interference map in the radar communication resource is less than a level of interference according to the interference map in the out-of-band measurement resource.

14. The apparatus of claim 10, wherein the controller is configured to track one or more interferers in the environment of the radar system based on the interference information from the plurality of radar devices, and to configure the first interference-based information based on one or more parameters of the interferers.

15. The apparatus of claim 10, wherein the controller is configured to determine the first interference-based information based on state information corresponding to a state of the environment of the radar system.

16. The apparatus of claim 10, wherein the controller is configured to determine the first interference-based information based on map information corresponding to a map of the environment of the radar system.

17. The apparatus of claim 10, wherein the controller is configured to determine the first interference-based information based on driving trajectory information corresponding to a planned driving trajectory of a vehicle comprising the radar system.

18. The apparatus of claim 10, wherein the controller is configured to generate the first interference-based information to comprise interference measurement configuration information to configure interference measurements to be performed by the first radar device.

19. The apparatus of claim 18, wherein the interference measurement configuration information is to configure at least one of an in-band interference measurement or an out-of-band interference measurement, wherein the in-band interference measurement is to be performed by the first radar device during a radar frame of the first radar device, wherein the out-of-band interference measurement is to be performed by the first radar device in a listening mode between radar frames of the first radar device.

20. The apparatus of claim 10, wherein the controller is configured to generate the first interference-based information to comprise at least one of one or more radar transmit (Tx) parameters to configure radar transmissions by the first radar device, or one or more radar Receive (Rx) parameters to configure processing of radar Rx signals received by the first radar device.

21. The apparatus of claim 10, wherein the controller is configured to provide feedback information to a system controller of a system comprising the radar system, the feedback information based on the interference information from the plurality of radar devices.

22. A radar system comprising:
a plurality of radar devices configured to mitigate interference in an environment of the radar system according to a collaborative interference mitigation scheme, wherein a first radar device of the plurality of radar devices comprises:
  a communication interface to receive first interference-based information, the first interference-based information based on interference detected by at least one second radar device of the plurality of radar devices; and
  a processor configured to control the first radar device to communicate radar signals of the first radar device based on the first interference-based information, and to cause the communication interface to output second interference-based information, the second interference-based information based on the radar signals of the first radar device.

23. The radar system of claim 22 comprising a controller configured to receive interference information from the plurality of radar devices, and to control the plurality of radar devices according to the collaborative interference mitigation scheme based on the interference information from the plurality of radar devices.

24. The radar system of claim 23, wherein the controller is configured to receive third interference-based information from the second radar device, to determine the first interference-based information based on the third interference-based information, and to provide the first interference-based information to the first radar device.

25. The radar system of claim 22, wherein the collaborative interference mitigation scheme comprises a distributed collaborative interference mitigation scheme, wherein the communication interface is to receive the first interference-based information from the at least one second radar device, the first interference-based information comprises first interference information to identify interference detected by the at least one second radar device, wherein the communication interface is to provide the second interference-based information to one or more other radar devices, the second interference-based information to identify interference detected by the first radar device.

26. A vehicle comprising:
a system controller configured to control one or more vehicular systems of the vehicle based on radar information; and
a radar system configured to generate the radar information, the radar system comprising:
  a plurality of radar devices configured to mitigate interference in an environment of the radar system according to a collaborative interference mitigation scheme, wherein a first radar device of the plurality of radar devices comprises:
  a communication interface to receive first interference-based information, the first interference-based information based on interference detected by at least one second radar device of the plurality of radar devices; and
  a processor configured to control the first radar device to communicate radar signals of the first radar device based on the first interference-based information, and to cause the communication interface to output second interference-based information, the second interference-based information based on the radar signals of the first radar device; and
a radar processor configured to generate the radar information based on radar data from the plurality of radar devices.

27. The vehicle of claim 26, wherein the radar system comprises a controller configured to receive interference information from the plurality of radar devices, and to control the plurality of radar devices according to the collaborative interference mitigation scheme based on the interference information from the plurality of radar devices.

28. A product comprising one or more tangible computer-readable non-transitory storage media comprising instructions operable to, when executed by at least one processor, enable the at least one processor to cause a controller of a radar system to:
  process interference information from a plurality of radar devices in the radar system; and
  control the plurality of radar devices based on the interference information from the plurality of radar devices to mitigate interference in an environment of the radar system according to a collaborative interference mitigation scheme, wherein controlling the plurality of radar devices comprises:
    determining first interference-based information for a first radar device of the plurality of radar devices based on second interference-based information from at least one second radar device of the plurality of radar devices; and
    sending the first interference-based information to the first radar device.

29. The product of claim 28, wherein the instructions, when executed, cause the controller to update an interference map of the environment of the radar system based on the interference information from the plurality of radar devices, and to generate the first interference-based information based on the interference map.

* * * * *